US007085072B2

(12) United States Patent
Kuba

(10) Patent No.: US 7,085,072 B2

(45) Date of Patent: Aug. 1, 2006

(54) OPTICAL PATH BENDING OPTICAL SYSTEM AND ELECTRONIC APPARATUS USING THE SAME

(75) Inventor: Keiichi Kuba, Koganei (JP)

(73) Assignee: Olympus Corporation, Tokyo (JP)

( * ) Notice: Subject to any disclaimer, the term of this patent is extended or adjusted under 35 U.S.C. 154(b) by 65 days.

(21) Appl. No.: 10/852,607

(22) Filed: May 25, 2004

(65) Prior Publication Data

US 2005/0018313 A1 Jan. 27, 2005

(30) Foreign Application Priority Data

May 26, 2003 (JP) ............................ 2003-148086

(51) Int. Cl.
*G02B 15/14* (2006.01)
*G02B 17/08* (2006.01)

(52) U.S. Cl. ...................... 359/689; 359/686; 359/726; 359/727

(58) Field of Classification Search ................ 359/676, 359/686, 689, 726, 727

See application file for complete search history.

(56) References Cited

U.S. PATENT DOCUMENTS 4,249,798 A * 2/1981 Moskovich ................. 359/683
6,728,482 B1 * 4/2004 Hagimori et al. ............. 396/72
6,754,446 B1 * 6/2004 Hagimori et al. ............. 396/72
6,771,432 B1 * 8/2004 Mihara ....................... 359/687
6,934,095 B1 * 8/2005 Mihara ....................... 359/726
2004/0051960 A1 * 3/2004 Mihara ....................... 359/686

FOREIGN PATENT DOCUMENTS

JP 09-211287 8/1997
JP 10-020191 1/1998

* cited by examiner

*Primary Examiner*—Scott J. Sugarman

(74) *Attorney, Agent, or Firm*—Kenyon & Kenyon LLP

(57) ABSTRACT

An optical path bending optical system includes, in order from the object side, a first lens unit, a second lens unit with negative power, and at least one lens unit with positive power. When the magnification of the optical system is changed in the range from a wide-angle position to a telephoto position, the lens unit with positive power is moved along the optical axis. The first lens unit is constructed with a prism including a reflecting surface for bending the optical path, an entrance surface, and an exit surface, and has negative power. The entrance surface of the prism is configured as a curved surface with negative power which is rotationally symmetrical with respect to the optical axis.

30 Claims, 20 Drawing Sheets

T/W CHANGE OVER
U-TURNE GROUP
SIMPLE MOVEMENT GROUP
WIDE END
TELE END
POSITION WHERE U-TURNE GROUP IS TO BE FIXED

G1 G2 G3 P1 L21 L22 S L31 L32 F IM P P2 P3

CONVENTIONAL OPTICAL SYSTEM

OPTICAL PATH BENDING OPTICAL SYSTEM BY OPTICAL PATH BENDING ELEMENT

OPTICAL PATH BENDING OPTICAL SYSTEM BY OPTICAL PATH BENDING PRISM

T/W CHANGE OVER

OPTICAL PATH BENDING OPTICAL SYSTEM AND ELECTRONIC APPARATUS USING THE SAME

BACKGROUND OF THE INVENTION

1. Field of the Invention

This invention relates to a zoom optical system whose optical axis is bent, and in particular, to an optical path bending zoom optical system in which an optical path bending element is used in order to achieve a slim design with respect to the depth direction of a digital camera, a personal digital assistant, or a mobile phone, mounting a zoom optical system.

2. Description of Related Art

In imaging optical systems incorporated in compact cameras, personal digital assistants, and mobile phones which use electronic image sensors such as CCDs, the need for compact design, notably slim design, is emphasized.

As the prior art of the optical system of this type, for example, there is a four-lens-unit zoom optical system whose optical path is bent. This optical system has an optical member including a plano-convex lens and a rectangular prism which are cemented to each other in a third lens unit.

Further, for example, there is an optical system designed to impart optical power to an optical path bending prism.

SUMMARY OF THE INVENTION

The optical path bending optical system of the present invention comprises, in order from the object side, a first lens unit, a second lens unit with negative power, and at least one lens unit with positive power, placed on the image side of the second lens unit. When the magnification of the optical system is changed in the range from a wide-angle position to a telephoto position, the lens unit with positive power is moved along the optical axis, and the first lens unit includes an optical path bending element for bending the optical path.

In the optical path bending optical system of the present invention, the first lens unit has negative power in the above arrangement.

In the optical path bending optical system of the present invention, the first lens unit has negative power in the above arrangement, and the optical path bending element is constructed as a prism including at least one reflecting surface, an entrance surface, and an exit surface so that at least one of the entrance surface and the exit surface of the prism is configured as a curved surface which is rotationally symmetrical with respect to the optical axis.

The electronic apparatus of the present invention includes the optical path bending optical system and an image sensor placed at the image plane of the optical system.

Also, in the following description, ‘optical path bending’ is referred to as “path bending”.

These and other features and advantages of the present invention will become apparent from the following detailed description of the preferred embodiments when taken in conjunction with the accompanying drawings.

DETAILED DESCRIPTION OF THE PREFERRED EMBODIMENTS

Before undertaking the description of the embodiments, the function and effect of the present invention will be explained.

In the present invention, the optical system comprises the first lens unit including a path bending element, a second lens unit with negative power, and at least one lens unit with positive power, located on the image side of the second lens unit. The magnification of the optical system is changed by this lens unit with positive power.

Figure 1A:
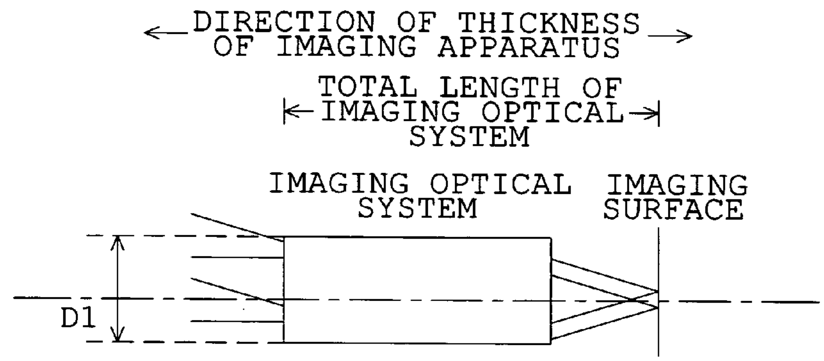
FIGS. 1A, 1B, and 1C are conceptual views for explaining the structure, function, and effect of the present invention, showing a conventional optical system, a path bending optical system using a reflective plate as a path bending element, and a path bending optical system using a path bending prism as a path bending element in the present invention, respectively.

When the optical path from object side of the imaging optical system to the imaging surface, like the conventional optical system, runs in a straight line, the thickness of the imaging apparatus becomes larger than the total length of the imaging optical system (refer to FIG. 1A).

Figure 1B:
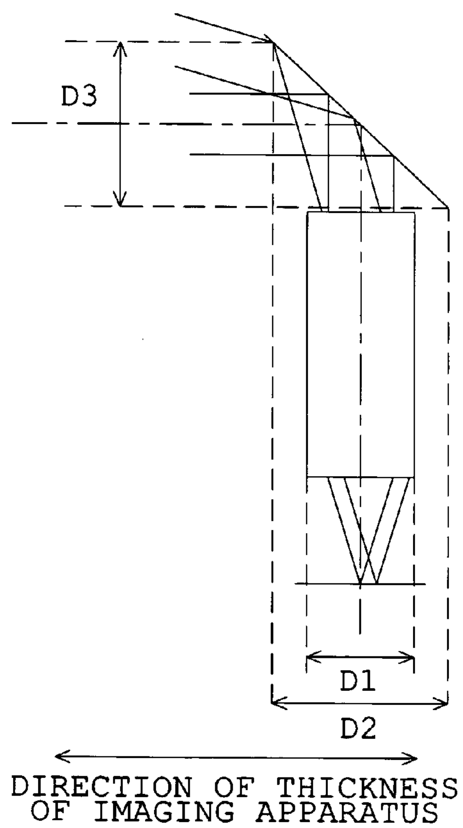

In contrast to this, when the path bending element is used like the optical system of the present invention, the optical path of the imaging optical system can be bent. The thickness of the imaging apparatus can thus be reduced (refer to FIGS. 1B and 1C).

When the optical system is constructed so that the path bending element is contained in the first lens unit, the optical path can be bent on the object side as far as possible, and therefore the depth dimension of the optical system can be further reduced. Consequently, the thickness of the imaging apparatus can be made smaller.

In this optical system, the lens unit with positive power located on the image side of the second lens unit with negative power is moved when the magnification is changed. Also, in the following description, the lens unit with positive power located on the image side of the second lens unit with negative power is simply referred to as a lens unit X. Thus, when the magnification is changed in the range from the wide-angle position to the telephoto position, the lens unit X is moved toward the object side while narrowing spacing between the second lens unit and the lens unit X, and thereby the optical system can be designed to have a long focal length.

Since the second lens unit has the negative power and the lens unit X has the positive power, the optical system of a retrofocus type can be constructed. As a result, even at the wide-angle position where the focal length is shortest, a back focal distance can be sufficiently increased. Hence, space for low-pass filters is easily ensured. In addition, image-side telecentricity is easily obtained. When the optical system is of the retrofocus type, its wide angle of view and high magnification can be attained, but negative distortion at the wide-angle position is increased. However, in an optical system constructed so that image distortion is electronically corrected, the design of the wide angle of view and high magnification is facilitated.

In the optical system, the path bending element is constructed with a prism including at least one reflecting surface for bending the optical path, an entrance surface, and an exit surface. It is desirable that at lest one of the entrance surface and the exit surface of the prism is configured as a curved surface which is rotationally symmetrical with respect to the optical axis.

When the reflecting surface for bending the optical path is constructed as the reflecting surface of the prism, an equivalent-air medium length is increased even in the same optical path length because light passes through a medium whose refractive index is more than 1. Consequently, for example, a depth dimension D2' and an effective diameter D3' of an object-side surface in the optical system of FIG. 1C can be made smaller than a depth dimension D2 and an effective diameter D3 of the object-side surface in the optical system of FIG. 1B.

In this case, when at least one of the entrance surface and the exit surface of the path bending prism is constructed to have the power, it becomes possible to improve the performance of the optical system and to reduce the number of lenses, thus heightening the effect of compactness.

Also, in this case, when the first lens unit is constructed with only the path bending prism with power, the number of optical members constituting the optical system can be made smaller and the effect of compactness is heightened.

In this optical system, as mentioned above, it is desirable that the first lens unit has the negative power.

When the negative power is imparted to the first lens unit, the position of the entrance pupil is shifted to the object side. Hence, the effective diameter of the optical system can be reduced, and the size of the path bending element and the effective diameter of the lens unit located behind the second lens unit can be made small. As a result, the slim design of the imaging apparatus can be achieved. Moreover, by imparting the negative power to the first lens unit, the negative power of a retro-focus optical system with negative and positive powers can be shared between the first and second lens units. Consequently, the ability to correct aberration is improved and a compact design can be further achieved. When the magnification is changed in the range from the wide-angle position to the telephoto position, the first lens unit can be fixed.

In the optical system, the path bending element is constructed as a prism including at least one reflecting surface for bending the optical path, an entrance surface, and an exit surface. It is desirable that at lest one of the entrance surface and the exit surface of the prism is configured as a curved surface with negative power which is rotationally symmetrical with respect to the optical axis.

When the path bending element is designed to have the negative power, the effective diameters of the lens units located on the image side of the path bending element can be decreased. Consequently, the slim design of the imaging apparatus can be further achieved. The negative power of the first lens unit is shared by the path bending element. Thus, the ability of the first lens unit to correct aberration is improved, the number of lenses of the first lens unit can be lessened, and the optical system can be rendered smaller. When the magnification is changed in the range from the wide-angle position to the telephoto position, the first lens unit can be fixed. When the path bending element is constructed with a prism member, the effect of compactness is heightened.

In the optical system, it is desirable that at least two lens units, each with positive power, are located on the image side of the second lens unit. Specifically, it is good practice, in addition to the lens unit X, to provide another lens unit with positive power.

In an optical system using the image sensor such as a CCD, when off-axis light is obliquely incident on the CCD, the shortage of the amount of light is caused. In order to eliminate the shortage of the amount of light, it is necessary to separate the exit pupil of the optical system from the image plane (ideally, to construct a telecentric system on the CCD side). Thus, like the above optical system, when at least two lens units, each with positive power, is located on the image side of the second lens unit, the image-side telecentricity can be easily ensured.

When the optical system is designed to impart the negative power to the second lens unit, the positive power to the third lens unit, and the positive power to the fourth lens unit and the magnification is changed in the range from the wide-angle position to the telephoto position, spacing between the second lens unit and the third lens unit is narrowed and spacing between the third lens unit and the fourth lens unit is narrowed after being once widened so that the third lens unit is moved toward the object side, and thereby a higher magnification can be ensured.

When the optical system is designed so that one of the two lens units, each with positive power, is moved along the optical axis, correction for the shift of the position of the image plane due to a magnification change, or focusing can be effectively performed. The movement of the fourth lens unit with positive power along the optical axis is more effective.

In this case, when at least one of the lens units movable in the magnification change or focusing is constructed with a single lens, lens weight is lessened and the load of a lens driving mechanism is lightened, which is favorable. On the image side of the second lens unit, at least two lens units, each with positive power, are provided. Thus, in the magnification change or focusing, when one lens unit with positive power is fixed, a mechanical mechanism is simplified, which is favorable.

In the optical system, it is desirable that the lens units located on the image side of the path bending element are moved along the optical axis to thereby perform the magnification change or focusing. Also, the magnification change or focusing may be performed by a part of lenses of the lens units located on the image side of the path bending element.

For example, when a lens unit is located on the object side of the path bending element to perform the magnification change or focusing, it is necessary to ensure the moving area of the lens unit on the object side before the optical path is bent. In doing so, the thickness of the imaging apparatus is increased. When the magnification change or focusing is performed by both the lens unit located on the object side of the path bending element and the lens unit on the image side, the mechanical mechanism for moving the lens units is complicated and the imaging apparatus becomes oversized. However, like the present invention, when the lens units located on the image side of the path bending element are moved along the optical axis to thereby carry out the magnification change or focusing, the optical system can be further simplified and downsized. Even when a part of lenses of the lens units located on the image side of the path bending element is moved, the same effect can be secured.

In the optical system, it is desirable that when the magnification is changed in the range from the wide-angle position to the telephoto position, the first lens unit remains fixed.

In the case where the optical system is designed to move another lens of the first lens unit along the optical axis while fixing the path bending element in changing the magnification in the range from the wide-angle position to the telephoto position, if the lens unit located on the object side of the path bending element is moved along the optical axis, the thickness of the imaging apparatus will be increased. If the magnification change or focusing is performed by both the lens unit located on the object side of the path bending element and the lens unit on the image side, the mechanical mechanism for moving the lens units will be complicated and the imaging apparatus becomes oversized. If only the lens of the first lens unit located on the image side of the path bending element is moved along the optical axis when the magnification is changed in the range from the wide-angle position to the telephoto position, a lens moving mechanism will be required. Consequently, the effect of ensuring the magnification is small for oversizing of the optical system.

Figure 1C:
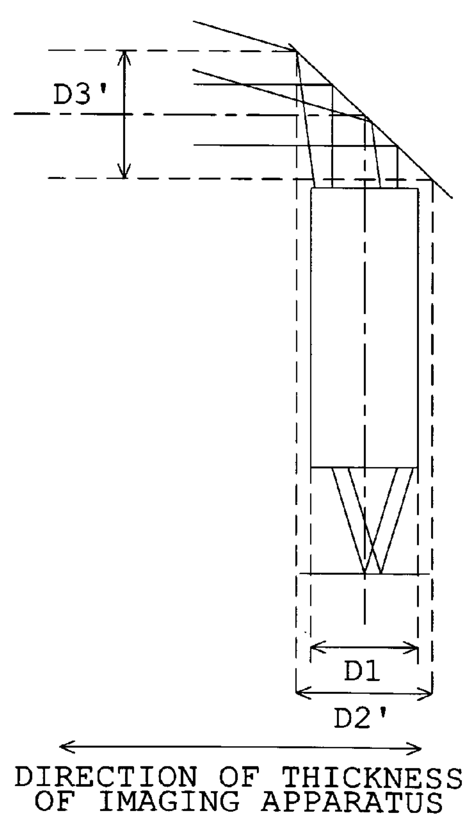

The first lens unit, which has a large effective diameter, is heavy in weight. Thus, the operation that the whole of the first lens unit including the path bending element is moved along the optical axis when the magnification is changed imposes a load on the mechanical mechanism. This problem is particularly prominent in the case where the path bending element is the path bending prism. In the arrangement of FIG. 1C, it is necessary that the whole of the first lens unit including the path bending element is moved in a vertical or lateral direction. Such movement is unfavorable because the mechanical mechanism and the exterior of a camera are complicated.

In contrast to this, when the first lens unit is fixed, the slim design of the imaging apparatus can be achieved without the mechanical mechanism, for example, of a collapsible mount type. The mechanical mechanism is simplified and the durability of the imaging apparatus is increased. Additionally, a waterproof structure is facilitated. In the optical system, it is thus favorable to carry out the magnification change or focusing while fixing the first lens unit including the path bending element.

In the optical system, it is desirable that the lens unit (or a lens) with negative power is located on the object side as far as possible. By doing so, the effective diameter of the optical system can be reduced and the optical system can be down-sized. Therefore, in the optical system of the present invention, it is desirable that the entrance surface of the path bending prism is configured as a concave surface directed toward the object side, having negative power. In this case, it is more desirable that the exit surface of the path bending prism is configured as a convex surface directed toward the image side, having positive power.

Each of the most object-side lens unit and the most image-side lens unit has a considerable ray height of off-axis light. Thus, when the optical system is constructed as mentioned above, chromatic aberration of magnification and off-axis aberration can be effectively corrected. When the image-side telecentric system is constructed, the position of a light beam passing through the most image-side lens unit is not considerably shifted by the magnification change. In contrast to this, the position of the light beam passing through the most object-side lens unit is considerably shifted by the magnification change. Consequently, chromatic aberration of magnification produced in the most object-side lens unit is markedly varied by the magnification change. Therefore, when the first lens unit located at the most object-side position is constructed to include lenses with positive and negative powers, the production of off-axis aberration or chromatic aberration and the fluctuation of chromatic aberration produced by the magnification change can be suppressed. As a result, in the entire optical system, the production of off-axis aberration or chromatic aberration and the fluctuation of chromatic aberration produced by the magnification change can be suppressed. In this case, when the entrance surface of the path bending prism included in the first lens unit is configured as a concave surface directed toward the object side, having negative power, and the exit surface of the path bending prism is configured as a convex surface directed toward the image side, having positive power, chromatic aberration of magnification and off-axis aberration can be effectively corrected without increasing the number of lenses. Since the first lens unit has, in order from the object side, the negative power and the positive power, the effective diameter of each lens located behind the second lens unit can be decreased. Moreover, the position of the principal point of the first lens unit is shifted to the side of the second lens unit. Consequently, a distance between the principal points of the first and second lens units can be diminished, with the result that the overall length of the optical system is reduced.

In the optical system, it is desirable that the first lens unit includes at least one aspherical surface. The first lens unit located at the most object-side position is of considerable ray height. Thus, when the first lens unit is designed to include at least one aspherical surface, off-axis aberrations, such as distortion, astigmatism, and coma, can be effectively corrected. In this case, when the most object-side surface of the first lens unit is configured to be aspherical, aberrations can be more effectively corrected.

In order to further achieve the design of the wide angle of view and high magnification or the compact design of the optical system, there is a technique that image distortion is corrected not in the optical system, but electronically. In this case, when the first lens unit is designed to have an aspherical surface, it is possible to effectively produce image distortion that can be electronically corrected.

In the optical system, it is desirable that at least one of the entrance surface and the exit surface of the path bending prism is configured as an aspherical surface.

It is desirable that the path bending prism, as mentioned above, is placed on the object side of all lenses that are movable in the magnification change or focusing. In this case, the path bending prism is located on the object side. At this position, the prism is of considerable ray height. Thus, when at least one of the entrance surface and the exit surface of the path bending prism is configured as an aspherical surface, the ability of the aspherical surface to correct aberrations can be sufficiently exhibited. Specifically, considerable effects are brought about in correction for off-axis aberrations, such as distortion, astigmatism, and coma, When the path bending prism is molded, there is little difference between difficulty and ease in fabrication with respect to the spherical surface and the aspherical surface. When the path bending prism is thus designed to have an aspherical function, it becomes easy to provide the first lens unit with the aspherical function.

In the case where the entrance surface of the path bending prism is the concave surface facing the object side, it is important that this surface is configured as the aspherical surface. In order to correct aberrations, it is desirable that the negative lens originally placed on the object side of the first lens unit is configured into a meniscus shape, with a convex surface facing the object side. However, in order to downsize the path bending optical system, it is desirable that the entrance surface of the path bending prism has the negative power. For this, the entrance surface must be configured as a concave surface facing the object side. If the concave surface is directed toward the object side, however, considerable aberration will be produced. When the entrance surface is thus configured as the aspherical surface, the amount of production of aberration of the entrance surface can be suppressed. In this case, it is desirable, in view of correction for aberration, that the entrance surface of the path bending prism has the aspherical function that paraxial power is weakened progressively in going from the optical axis to the periphery.

The path bending optical system preferably satisfies the following condition:

$$-1000<f1/\sqrt{(fW\times fT)}<-0.2 \quad (1)$$

where $f1$ is the focal length of the first lens unit, $fW$ is the focal length of the entire system in focusing of an infinite object point at the wide-angle position, and $fT$ is the focal length of the entire system in focusing of the infinite object point at the telephoto position.

Beyond the upper limit of Condition (1), the negative power of the first lens unit becomes too strong. Hence, aberrations, such as distortion and notably negative distortion at the wide-angle position, are increased and correction becomes difficult. Below the lower limit of Condition (1), the negative power of the first lens unit becomes too weak.

Hence, the effective diameter of the optical system located behind the first lens unit is increased and the optical system becomes bulky.

Further, in order to downsize the optical system while favorably holding optical performance, it is more desirable to satisfy the following condition:

$$-6<f1/\sqrt{(fW\times fT)}<-0.5 \quad (1\text{-}2)$$

Still further, in order to downsize the optical system while favorably holding optical performance, it is much more desirable to satisfy the following condition:

$$-3<f1/\sqrt{(fW\times fT)}<-1 \quad (1\text{-}3)$$

The path bending optical system preferably satisfies the following condition:

$$0.2<fp/f1<7 \quad (2)$$

where fp is the focal length of the path bending element.

Beyond the upper limit of Condition (2), the negative power of the path bending element becomes too weak. Consequently, the effective diameter of the optical system located behind the path bending element is increased. Below the lower limit of Condition (2), the negative power of the path bending element becomes too strong. Consequently, correction for chromatic aberration of magnification, coma, or astigmatism becomes difficult.

Further, in order to downsize the optical system while favorably holding optical performance, it is more desirable to satisfy the following condition:

$$0.2<fp/f1<5 \quad (2\text{-}2)$$

Still further, in order to downsize the optical system while favorably holding optical performance, it is much more desirable to satisfy the following condition:

$$0.3<fp/f1\leqq 1 \quad (2\text{-}3)$$

In the path bending optical system, it is desirable that the second lens unit includes a lens with positive power and a lens with negative power.

The optical system is designed so that when the magnification is changed in the range from the wide-angle position to the telephoto position, the lens unit X is moved toward the object side while narrowing spacing between the second lens unit with negative power and the lens unit X. By doing so, a long focal length is obtained. In this case, when the second lens unit includes the lens with positive power and the lens with negative power, the fluctuation of aberration, such as chromatic aberration, produced by the magnification change can be suppressed. As a result, the fluctuation of aberration, such as chromatic aberration, produced by the magnification change in the entire optical system can be suppressed.

In this case, the lenses constituting the second lens unit have, in order from the object side, negative power and positive power. This is favorable because the effective diameter of the optical system located on the image side of the second lens unit can be reduced. Since the position of the principal point of the second lens unit is shifted to the side of the lens unit X, a distance between the principal points of the second lens unit and the lens unit X (for example, the third lens unit) can be diminished. Consequently, the overall length of the optical system can be reduced.

When the second lens unit is constructed with a cemented doublet of the lens with positive power and the lens with negative power, decentering and spacing errors are hard to occur and the mechanical structure is simplified, which is favorable. In this case, the cemented doublet is constructed as a meniscus lens with a concave surface facing the object side. By doing so, the position of the principal point is shifted to the side of the first lens unit, and thus a distance between the principal points of the first and second lens units can be diminished. This leads to a reduction of the overall length of the lens system, which is favorable.

The optical system preferably satisfies the following condition:

$$-20<f2/\sqrt{(fW\times fT)}<-0.2 \quad (3)$$

where f2 is the focal length of the second lens unit.

Beyond the upper limit of Condition (3), the negative power of the second lens unit becomes too strong, and hence aberrations, such as distortion and notably negative distortion at the wide-angle position, are increased. Below the lower limit of Condition (3), the negative power of the first lens unit becomes too weak, and hence the effective diameter is increased to cause oversizing of the optical system.

Further, in order to downsize the optical system while favorably holding optical performance, it is more desirable to satisfy the following condition:

$$-10<f2/\sqrt{(fW\times fT)}<-0.5 \quad (3\text{-}2)$$

Still further, in order to downsize the optical system while favorably holding optical performance, it is much more desirable to satisfy the following condition:

$$-7<f2/\sqrt{(fW\times fT)}<-1 \quad (3\text{-}3)$$

The path bending optical system preferably satisfies the following condition:

$$0.1<f1/f2<50 \quad (4)$$

Beyond the upper limit of Condition (4), the negative power of the first lens unit becomes too weak, and thus the effective diameter is increased to cause oversizing of the optical system. Below the lower limit of Condition (4), the negative power of the first lens unit becomes too strong, and thus aberrations, such as distortion and notably negative distortion at the wide-angle position, are increased.

Further, in order to downsize the optical system while favorably holding optical performance, it is more desirable to satisfy the following condition:

$$0.2<f1/f2<2 \quad (4\text{-}2)$$

Still further, in order to downsize the optical system while favorably holding optical performance, it is much more desirable to satisfy the following condition:

$$0.3<f1/f2<1.4 \quad (4\text{-}3)$$

In this optical system, it is desirable that the lens unit X includes a lens with positive power and a lens with negative power.

When the magnification is changed in the range from the wide-angle position to the telephoto position, the lens unit X is moved toward the object side while narrowing spacing between the second lens unit with negative power and the lens unit X, and thereby the design of the long focal length is achieved. In this case, when the lens unit X includes the lens with positive power and the lens with negative power, the fluctuations of aberrations, such as chromatic aberration, caused by the magnification change can be suppressed. Consequently, the fluctuations of aberrations, such as chromatic aberration, caused by the magnification change in the entire optical system can be suppressed.

There is the need to provide the lens unit X with the function of converging divergent light from the second lens unit with negative power. The lens unit X is thus placed on the image side of the second lens unit. It is favorable that the object side of the lens unit X is constructed with a positive lens.

When the lenses constituting the lens unit X are arranged to have, in order from the object side, the positive power and the negative power, the position of the principal point is shifted to the side of the second lens unit. Whereby, a distance between the principal points of the second lens unit and the lens unit X can be diminished, and thus the overall lens length is reduced. Since the magnification of the lens unit X can be increased, the amount of movement of the lens unit X caused by the magnification change can be decreased.

Here, in the lens unit X, the configuration of two lens elements of a positive lens and a negative lens (two lens components) is compared with that of one lens element of a positive lens alone (one lens component). When both have the same focal length, the configuration of the two lens elements is such that the position of the principal point is shifted to the side of the second lens unit. Thus, the spacing between the second lens unit and the lens unit X is widened. When the magnification is changed, therefore, that the spacing between the second lens unit and the lens unit X is ensured is hard to become a restricted condition.

In the optical system, it is desirable that the lens unit X includes at least two positive lenses and one negative lens. There is the need to provide the lens unit X with the function of converging divergent light from the second lens unit with negative power. In order to ensure good performance, it is desirable to include at least two positive lenses.

It is also desirable that the lens unit X includes, in order from the object side, a positive lens, a positive lens, and a negative lens. Alternatively, the lens unit X may include, in order from the object side, a positive lens and a cemented doublet of a positive lens and a negative lens. By doing so, decentering and spacing errors are hard to occur and the mechanical structure is simplified, which is favorable. In this case, the cemented doublet includes, in order from the object side, a biconvex lens and a biconcave lens. Specifically, when the cemented doublet is designed to be a meniscus lens with a concave surface facing the image side, as a whole, the position of the principal point of the lens unit X is shifted to the side of the second lens unit. As a consequence of the foregoing, the distance between the principal points of the second lens unit and the lens unit X can be diminished, thus leading to a reduction of the entire lens length. Since the magnification of the lens unit X can be increased, the amount of movement of the lens unit X caused by the magnification change can be decreased. Moreover, since the negative power can be strengthened, chromatic aberration produced in the lens unit X can be favorably corrected, and the fluctuation of chromatic aberration caused by the magnification change can be suppressed.

The lens unit X produces aberration such as to cancel aberration produced in the second lens unit. For example, at the wide-angle position, outer coma is liable to occur in the second lens unit. Thus, when the last surface of the lens unit X is configured into the shape of a concave surface facing the image side, inner coma is produced and aberration of the entire lens system can be favorably corrected.

In the optical system, it is desirable that the lens unit X has at least one aspherical surface.

A light beam incident on the second lens unit with negative power is such that its beam diameter is increased here. As such, the beam diameter of the lens unit X is enlarged. When at least one aspherical surface is provided in the lens unit X, spherical aberration can be favorably corrected.

In this case, when the most object-side surface or a surface facing an aperture stop in the lens unit X is configured as an aspherical surface, spherical aberration can be effectively corrected, which is favorable. It is desirable that the aspherical surface is designed to have the aspherical function that paraxial power is weakened progressively in going from the optical axis to the periphery because positive spherical aberration produced in the lens unit X can be suppressed.

When the most image-side surface of the lens unit X is configured as the aspherical surface, off-axis aberrations, such as astigmatism and coma, can be effectively corrected, which is favorable. When the last surface of the second lens unit is configured as a concave surface facing the image side, high-order aberration is liable to occur. Thus, when the last surface is configured as an aspherical surface, the production of the high-order aberration can be suppressed. In this case, it is further desirable that the aspherical surface has the function that paraxial power is strengthened progressively in going from the optical axis to the periphery. It is also desirable that the aspherical surface is designed so that the paraxial power is strengthened progressively in going from the optical axis and is reversed in the periphery of the effective diameter, when occasion demands.

It is more desirable that both the most object-side surface and the most image-side surface in the lens unit X are configured to be aspherical. By doing so, the ability to correct aberration is significantly improved. Consequently, the fluctuation of spherical aberration produced in the lens unit X by the magnification change is suppressed and astigmatism can be corrected. It is particularly desirable that the lens unit X includes, in order from the object side, a positive lens and a cemented doublet of a positive lens and a negative lens. When the lens unit X is constructed as mentioned above, the image-side aspherical surface of the negative lens has the effect of canceling all aberrations (spherical aberration, coma, astigmatism, and distortion) produced by the spherical effect of the most object-side surface of the second lens unit. In this case, when both the most object-side surface and the most image-side surface in the lens unit X are made aspherical, the production of all aberrations in the second lens unit can be effectively suppressed.

In the optical system, it is desirable that the most image-side lens unit includes at least one aspherical surface.

The most image-side lens unit has a considerable ray height. Thus, it is good practice to include at least one aspherical surface in the most image-side lens unit. By doing so, off-axis aberrations, such as distortion, astigmatism, and coma, and pupil aberration can be effectively corrected. In particular, the optical system of a retrofocus type is liable to produce negative distortion. It is thus desirable that the aspherical surface has the aspherical function of making the power weaker than the paraxial power progressively in going from the optical axis to the periphery.

The optical system preferably satisfies the following condition:

$$0.2 < M3/M2 < 15 \quad (5)$$

where M2 is the range of movement of the second lens unit with negative power and M3 is the range of movement of the lens unit with positive power (the lens unit X) located on the image side of the second lens unit.

When the magnification is changed in the range from the wide-angle position to the telephoto position, the lens unit with positive power is moved toward the object side while narrowing progressively the spacing between the second lens unit with negative power and the lens unit X.

Beyond the upper limit of Condition (5), the range of movement of the lens unit X that originally has an appreciable amount of movement is considerably enlarged. Consequently, it becomes difficult to ensure the spacing between the second lens unit and the lens unit X at the telephoto position. The overall length of the optical system is thus increased. Below the lower limit of Condition (5), the range of movement of the lens unit X is extremely narrowed to make it difficult to ensure the magnification.

Further, in order to downsize the optical system while favorably holding optical performance, it is more desirable to satisfy the following condition:

$$0.3<M3/M2<12 \quad (5\text{-}2)$$

Still further, in order to downsize the optical system while favorably holding optical performance, it is much more desirable to satisfy the following condition:

$$0.5<M3/M2<5 \quad (5\text{-}3)$$

The optical system preferably satisfies the following condition:

$$1.1<f3/\sqrt{(fW \times fT)}<10 \quad (6)$$

where f3 is the focal length of the lens unit with positive power (the lens unit X) located on the image side of the second lens unit. When the lens unit X is made up of a plurality of lens components and spacings between them are varied by the magnification change, f3 denotes a combined focal length at the middle position.

Beyond the upper limit of Condition (6), the positive power of the lens unit with positive power (the lens unit X) located on the image side of the second lens unit is extremely weakened. Hence, it becomes difficult to correct aberrations, such as distortion produced in the second lens unit and notably negative distortion at the wide-angle position. Since the effect of converging divergent light from the second lens unit is impaired, oversizing of the optical system is caused. Below the lower limit of Condition (6), the positive power of the lens unit X becomes too strong. Therefore, aberration produced in the lens unit X is increased, and it becomes difficult to ensure the image-side telecentricity.

Further, in order to downsize the optical system while favorably holding optical performance, it is more desirable to satisfy the following condition:

$$1.2<f3/\sqrt{(fW \times fT)}<5 \quad (6\text{-}2)$$

Still further, in order to downsize the optical system while favorably holding optical performance, it is much more desirable to satisfy the following condition:

$$1.3<f3/\sqrt{(fW \times fT)}<2 \quad (6\text{-}3)$$

In the case where the optical system has at least two lens units, each with positive power, on the image side of the second lens unit, it is desirable to satisfy the following condition:

$$0.5<f4/\sqrt{(fW \times fT)}<7 \quad (7)$$

where f4 is the focal length of the most image-side lens unit.

Below the lower limit of Condition (7), the power of the most image-side lens unit becomes too strong. As a result, the number of lenses for suppressing the production of aberration in the most image-side lens unit is swollen, and the overall length of the optical system is increased. In addition, telecentricity at the telephoto position is deteriorated.

Beyond the upper limit of Condition (7), the power of the most image-side lens unit becomes too weak. Consequently, the overall length of the optical system is increased, and the production of outer coma in the most image-side lens unit becomes pronounced. Moreover, telecentricity at the wide-angle position is deteriorated.

Further, in order to downsize the optical system while favorably holding optical performance, it is more desirable to satisfy the following condition:

$$1<f4/\sqrt{(fW \times fT)}<5 \quad (7\text{-}2)$$

Still further, in order to downsize the optical system while favorably holding optical performance, it is much more desirable to satisfy the following condition:

$$1.2<f4/\sqrt{(fW \times fT)}<3.8 \quad (7\text{-}3)$$

In order to reduce the overall length of the lens system, there is the practice that the fourth lens unit chiefly controls a pupil position. In this case, there is no need to construct the fourth lens unit with so many lenses. When the fourth lens unit is constructed, for example, with a single lens, the effect of controlling the pupil position with the minimum number of lenses is brought about. In this case, to correct aberration, it is desirable that the positive lens is biconvex.

The optical system can be designed to have at least two lens units, each with positive power, on the image side of the second lens unit. In this case, it is desirable that the optical system includes the second lens unit with negative power, the third lens unit with positive power, and the fourth lens unit with positive power, and has a stop before or behind the third lens unit.

When the magnification is changed in the range from the wide-angle position to the telephoto position, the design of the long focal length of the optical system can be achieved by the procedure outlined below. The fourth lens unit is moved toward the object side while narrowing spacings between the second lens unit and the third lens unit and between the third lens unit and the fourth lens unit. At this time, when the stop is placed before or behind the third lens unit, it is easy to fix the stop and the third lens unit in the magnification change. It is favorable to fix the stop and the third lens unit in the magnification change because the mechanical mechanism is simplified.

The power of the first lens unit including the path bending element can be weakened. By doing so, the restricted condition of the path bending element is moderated, and thus the number of degrees of layout freedom is increased.

In the optical system, it is desirable that the optical axis is bent parallel to the short side of the imaging surface of the image sensor.

When the imaging surface is rectangular like a CCD, the thickness of the imaging apparatus can be reduced by bending the optical axis to be parallel to the short side of the imaging surface (for example, when it is assumed that a lateral direction in the plane of the page of FIG. 1C is the direction of the short side of the imaging surface and a direction perpendicular to the plane of the page is the direction of the long side of the imaging surface, the depth dimension D1 of the prism and the depth dimension D2' of the optical system can be reduced). In this case, the effective diameter of a lens surface in the proximity of the imaging surface is particularly similar in shape to the imaging surface. Thus, when the lens contour is shaped not into a circle, with the optical axis as a center, but into a rectangle, the compact design of the imaging optical system can be achieved.

In this optical system, it is desirable to include a U-turn lens unit and a simple (monotonic) moving lens unit. Here, while the magnification is changed from the wide-angle position through the telephoto position, the U-turn lens unit, after being moved toward the image side, is moved back toward the object side and the simple moving lens unit is simply moved toward the object side. It is desirable that the optical system is constructed to perform a magnification change between the wide-angle end and the telephoto end by moving only the simple moving lens unit while keeping the U-turn lens unit fixed either at its position for the wide-angle end state or that for the telephoto end state. For the magnification change between the wide-angle end and the telephoto end, if the arrangement is made so that the positions of the U-turn lens unit for both the end states coincide, it is only necessary to fix the U-turn lens unit at this position of coincidence. By doing so, the number of moving lens units is reduced, so that the mechanical mechanism is simplified and the compact design of the optical system can be achieved. A manual operation may be performed to move the moving lens unit to a position for the wide-angle end state or the telephoto end state. This is favorable because an actuator becomes unnecessary (see FIG. 2 ).

An arrangement may be made such that when the magnification is changed from the wide-angle position through the telephoto position, the U-turn lens unit is not completely returned to the object side. In this arrangement, the positions of the U-turn lens unit for the wide-angle and telephoto end states do not coincide. In this case, the U-turn lens unit may be fixed at the position for the telephoto end state so that only the simple moving lens unit is moved. When the optical system is constructed as mentioned above, the use of the optical system at the wide-angle position is somewhat sacrificed. However, since the number of moving lens units is reduced, the mechanical mechanism is simplified and compactness of the optical system can be obtained.

In this optical system, it is desirable to electronically correct image distortion.

If an attempt is made to favorably correct distortion in the optical system, the number of lenses will be increased to cause oversizing of the optical system. Thus, when distortion that cannot be completely corrected in the optical system is electronically corrected, further compactness of the optical system can be achieved. In this case, it is desirable that distortion in the optical system is corrected to be less than 20% because the quality of an image after distortion has been electronically corrected can be favorably maintained.

The optical system is of a retrofocus type. Therefore, considerable negative distortion is produced at the wide-angle position. Thus, it is desirable that image distortion is electronically corrected because the optical system can be downsized and at the same time, the wide angle of view and high magnification of the optical system are easily obtained.

An information processing apparatus according to the present invention includes the path bending zoom optical system mentioned above, an electronic image sensor located at the position where an object image formed by the path bending zoom optical system is received, a processing means processing an electronic signal photoelectrically converted by the electronic image sensor, an input section for inputting an information signal into the processing means by an operator, a display element displaying an output from the processing means, and a recording medium recording the output from the processing means. The processing means is constructed so that the object image received on the electronic image sensor by the path bending zoom optical system is displayed on the display element.

In the information processing apparatus, it is desirable that the input section is constructed with a keyboard, and the path bending zoom optical system and the electronic image sensor are incorporated in the periphery of the display element or of the keyboard.

A telephone apparatus according to the present invention includes the path bending zoom optical system mentioned above, an electronic image sensor located at the position where an object image formed by the path bending zoom optical system is received, an antenna for transmitting and receiving a telephone signal, an input section for inputting signals such as telephone numbers, and a signal processing section converting the object image received by the electronic image sensor into a transmittable signal.

An electronic camera apparatus according to the present invention includes the path bending zoom optical system mentioned above, an electronic image sensor located at the position where an object image formed by the path bending zoom optical system is received, a processing means processing an electronic signal photoelectrically converted by the electronic image sensor, and a display element displaying the object image received by the electronic image sensor so that it can be observed. A recording medium for recording the image information of the object image received by the electronic image sensor can be incorporated or removed, and the processing means has a record processing function of recording the object image received by the electronic image sensor in the recording medium.

In accordance with the drawings, the embodiments of the present invention will be described below.

First Embodiment

Figure 3A:
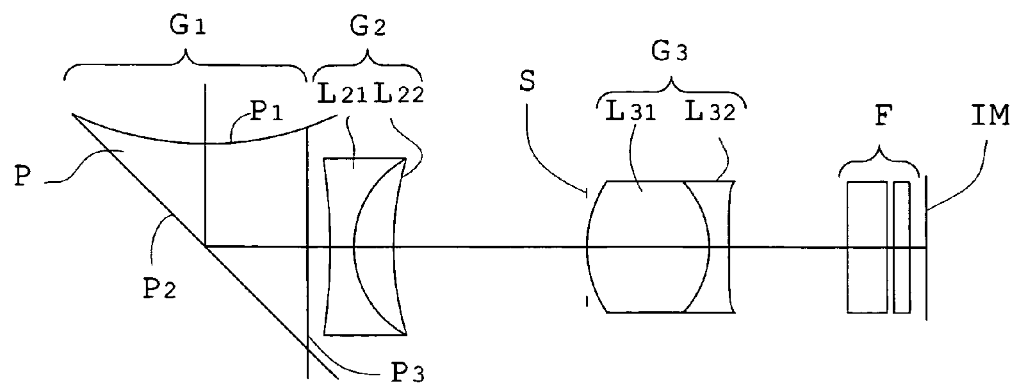
FIGS. 3A, 3B, and 3C are sectional views showing optical arrangements, developed along the optical axis, at wide-angle, middle, and telephoto positions, respectively, in focusing of an infinite object point, of a first embodiment of the path bending optical system according to the present invention.
Figure 3B:
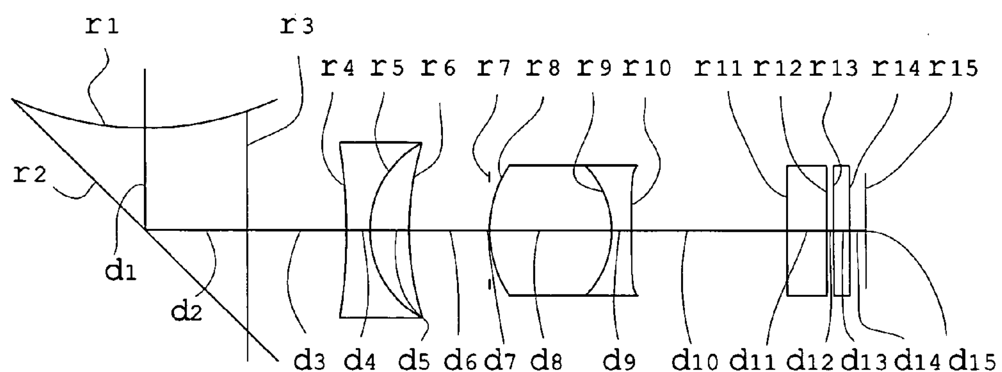
Figure 3C:
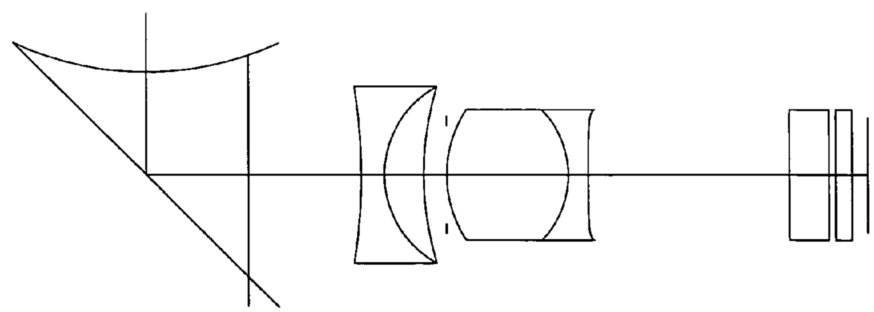

FIGS. 3A, 3B, and 3C show optical arrangements, developed along the optical axis, at wide-angle, middle, and telephoto positions, respectively, in focusing of an infinite object point, of the first embodiment of the path bending optical system according to the present invention.

The path bending optical system of the first embodiment includes, in order from the object side, a first lens unit $G_1$, a second lens unit $G_2$, an aperture stop S, and a third lens unit $G_3$. Also, in FIG. 3A, reference symbol F represents plane-parallel plates such as a near-infrared cutoff filter, a low-pass filter, and the cover glass of a CCD which is the electronic image sensor, and IM represents an imaging surface.

The first lens unit $G_1$ is constructed with only a path bending prism P and has negative power as s whole. The path bending prism P includes an entrance surface $P_1$, a reflecting surface $P_2$ for bending the optical path, and an exit surface $P_3$. The entrance surface $P_1$ is configured as a curved surface with negative power which is rotationally symmetrical about the optical axis.

The second lens unit $G_2$ is constructed with a cemented doublet including, in order from the object side, a biconcave lens $L_{21}$ and a positive meniscus lens $L_{22}$ with a convex surface facing the object side, and has negative power as a whole.

The third lens unit $G_3$ is constructed with a cemented doublet including, in order from the object side, a biconvex lens $L_{31}$ and a negative lens $L_{32}$, and has positive power as a whole.

In the path bending optical system, when the magnification is changed in the range from the wide-angle position to the telephoto position, the first lens unit $G_1$ remains fixed. The second lens unit $G_2$ is moved toward the image side, and the third lens unit $G_3$ is moved toward the object side, together with the aperture stop S. At this time, the third lens unit $G_3$ is moved while narrowing spacing between the second lens unit $G_2$ and the third lens unit $G_3$. When the magnification is changed, the third lens unit $G_3$ and the aperture stop S are integrally moved, thereby reducing the fluctuation of aberration caused by the magnification change.

According to the path bending optical system, the first lens unit $G_1$ has the negative power, and thus the ray height of the lens unit located behind the second lens unit can be lowered. As a result, the lens diameter can be reduced. When the optical path of the imaging optical system is bent by the path bending element P, the slim design of the imaging apparatus can be achieved.

The third lens unit $G_3$ is such that divergent light from the first lens unit $G_1$ with negative power is converged by the biconvex lens $L_{31}$. In order to obtain a short focal length while maintaining good performance, it is desirable that the third lens unit $G_3$ is designed to have at least two lenses, each with positive power.

The third lens unit $G_3$ is moved along the optical axis when the magnification is changed in the range from the wide-angle position to the telephoto position. Thus, the fluctuations of aberrations including chromatic aberration caused by the magnification change are suppressed by the negative meniscus lens $L_{32}$ with a concave surface facing the object side.

In the path bending optical system, the third lens unit $G_3$ is the lens unit with positive power located on the image side of the second lens unit $G_2$, and therefore corresponds to the lens unit X.

Here, in the third lens unit $G_3$, constituent lenses have, in order from the object side, positive power and negative power. Hence, the position of the principal point is shifted to the side of the second lens unit $G_2$. Consequently, the distance between the principal points of the second and third lens units can be diminished. This leads to a reduction of the overall length of the lens system. Since the magnification of the third lens unit $G_3$ can be increased, the amount of movement of the third lens unit $G_3$ caused by the magnification change can be reduced. In the case where the third lens unit $G_3$ has the same focal length as the second lens unit $G_2$, the spacing between the second lens unit $G_2$ and the third lens unit $G_3$ is widened. As such, that the spacing between the second lens unit $G_2$ and the third lens unit $G_3$ is ensured is hard to become the restricted condition in the magnification change.

In the path bending optical system, the ratio of the focal length at the telephoto position to the focal length at the wide-angle position is 1.8. However, negative image distortion is produced at the wide-angle position and the ratio of the angle of view at the wide-angle position to the angle of view at the telephoto position is set to 2 to increase the magnification so that the image distortion is electronically corrected through an electronic correcting means, not shown.

In the path bending optical system, the second lens unit $G_2$ and the third lens unit $G_3$ constitutes the optical system of a retrofocus type so that the wide angle of view and high magnification can be easily obtained. When the optical system is of the retrofocus type, the back focal distance can be sufficiently ensured even at the wide-angle position where the focal length is shortest. In addition, the image-side telecentricity is easily ensured. When the negative distortion is produced at the wide-angle position and the image distortion is electronically corrected, the design of the wide angle of view is facilitated.

In the path bending optical system, the optical system of the retrofocus type is constructed by a pan-focus design, with a hyper-focal distance h in each of states (such as wide-angle, middle, and telephoto positions) as the position of the object point in each state. In this case, the distance of h/2 (the near point) from infinity (the far point) is within the depth of focus. The hyper-focal distance h can be expressed by $$\text{Hyper-focal distance } h=f^2/(FNO\times\delta')$$

where f is a focal length, FNO is an F-number, and Δ' is the diameter of allowable blurring.

The path bending optical system of the first embodiment is provided with five aspherical surfaces: the entrance surface $P_1$ of the path bending prism P in the first lens unit $G_1$, the most object-side surface and the most image-side surface in the second lens unit $G_2$, and the most object-side surface and the most image-side surface in the third lens unit $G_3$.

When the most object-side surface of the third lens unit $G_3$ is configured as the aspherical surface, spherical aberration can be effectively corrected. This aspherical surface is designed to have an aspherical function that paraxial power is weakened progressively in going from the optical axis to the periphery. By doing so, positive spherical aberration produced in the third lens unit $G_3$ can be suppressed.

When the most image-side surface of the third lens unit $G_3$ is configured as the aspherical surface, off-axis aberrations, such as astigmatism and coma, can be effectively corrected.

The most image-side surface of the third lens unit $G_3$ is liable to produce high-order aberration. This surface is thus configured as the aspherical surface, and thereby the production of high-order aberration can be suppressed.

In the entrance surface $P_1$ of the path bending prism P, it is more desirable, in view of correction for aberration, to have the aspherical function that the paraxial power is weakened progressively in going from the optical axis to the periphery.

In the second lens unit $G_2$, it is desirable, in view of correction for aberration, that a surface has an aspherical function that the paraxial power is strengthened progressively in going from the optical axis to the periphery. In the path bending optical system, the object-side surface of the cemented doublet of the second lens unit $G_2$ is designed to have this aspherical function.

In the image-side surface of the negative lens (the negative meniscus lens $L_{32}$) of the third lens unit $G_3$, it is desirable, in view of correction for aberration, to have the aspherical function that the paraxial power is strengthened progressively in going from the optical axis to the periphery in order to correct aberration. In the path bending optical system, this surface is designed to have paraxial power and reversed power in the most peripheral portion of the effective diameter.

In order to reduce the overall length of the lens system, it is desirable to satisfy a condition, maximum center lens thickness≦maximum image height×0.5. Further, it is desirable to satisfy a condition, minimum edge thickness of effective diameter≦maximum image height×0.5, in order to reduce the overall length of the lens system. Still further, it is desirable to satisfy a condition, minimum air spacing before or behind moving lens unit≦maximum image height×0.6, in order to reduce the overall length of the lens system.

When the imaging surface is rectangular like a CCD, the thickness of the imaging apparatus can be reduced by bending the optical axis to be parallel to the short side of the imaging surface (for example, when it is assumed that a lateral direction in the plane of the page in FIG. 1C is the direction of the short side of the imaging surface and a direction perpendicular to the plane of the page is the direction of the long side of the imaging surface, the depth dimension D1 of the prism and the depth dimension D2' of the optical system can be reduced). In this case, the effective diameter of a lens surface in the proximity of the imaging surface is particularly approximate to the shape to the imaging surface. Thus, when the lens contour is shaped not into a circle, with the optical axis as its center, but into a rectangle, the imaging optical system can be downsized.

In the above disclosure, it is favorable that when the first lens unit $G_1$ or the most image-side lens unit (the third lens unit) is provided with the aspherical surface, any lens or prism which has the aspherical surface is made of glass. In this case, it is desirable that its transition point Tg satisfies the following condition:

$$60^\circ \text{ C.} < Tg < 620^\circ \text{ C.} \tag{8}$$

It is difficult that the aspherical surface is shaped with accuracy by grinding. It is also difficult that a large number of aspherical surfaces are fabricated by grinding. In the case where the lens or prism which has the aspherical surface is made of glass such as to satisfy Condition (8), it can be fabricated by a glass molding method. Whereby, mass production can be facilitated. The optical system is thus reduced in cost.

When the first lens unit $G_1$ or the most image-side lens unit is provide with the aspherical surface, it is desirable that the lens or prism which has the aspherical surface is fabricated by the glass molding method.

When the first lens unit $G_1$ or the most image-side lens unit is provide with the aspherical surface, it is possible that the lens or prism which has the aspherical surface is constructed of organic-inorganic hybrid material.

The organic-inorganic hybrid material, as set forth in, for example, Japanese Patent Kokai No. Hei 7-90181, is such that the organic material is dispersed in the inorganic material or the inorganic material is dispersed in the organic material. In the hybrid material, its melting point is lower than that of glass, molding takes place at low temperature, and mass production can be facilitated. Thus, when this material is used, the optical system is reduced in cost. The hybrid material, in contrast with plastic, is capable of acquiring the optical properties of high refractive index and low dispersion and excels in heat resistance. Moreover, it hardly damages and can also be used for the front lens of the optical system, for instance. As such, it is desirable that such an organic-inorganic hybrid material is used for the lens or prism which has the aspherical surface.

When the first lens unit $G_1$ or the most image-side lens unit G4 is provided with the aspherical surface, it is possible that the lens or prism which has the aspherical surface is constructed of plastic.

The prism or lens, when constructed of plastic, can be produced by a plastic molding method. In this case, prisms or lenses which have aspherical surfaces can be produced with ease and in great quantities. Since material cost is low, inexpensive prisms and optical systems can be obtained. Plastic is lighter in weight than glass, and thus a lightweight design of the optical system is also achieved.

In this path-bending zoom optical system, the prism can be constructed of plastic.

The prism is larger in volume than the lens, and when the prism is made of light plastic, a special effect is brought about on the lightweight design. The prism is produced by the plastic molding method, and thereby a large amount of prisms can be easily produced. In addition, the material cost is low and hence inexpensive optical systems can be obtained.

In the path-bending zoom optical system, it is possible that any lens or prism is constructed of plastic.

By doing so, any lens or prism can be produced by the plastic molding method, and mass production can be facilitated. In addition, the material cost is low and hence inexpensive optical systems can be obtained.

Subsequently, numerical data of optical members constituting the path-bending optical system of the first embodiment are shown below.

In the numerical data, f denotes the focal length, 2ω denotes the angle of view, FNO denotes the F-number, WE denotes the wide-angle position, ST denotes the middle position, and TE denotes the telephoto position. Face-to-face spacing refers to the thickness of each of optical members or air spacing between them. Each of the refractive index and the Abbe's number refers to the d line. In FIG. 3B, $r_1$, $r_2$, . . . represent radii of curvature of surfaces of individual optical members and $d_1$, $d_2$, . . . represent thicknesses of individual optical members or air spacings between them.

Also, the Z axis is taken in the direction of the optical axis, the Y axis is taken in a direction perpendicular to the Z axis, and the X axis is taken in a direction perpendicular to the Z axis and the Y axis. When h denotes a distance from the optical axis Z, it is assumed that $h^2=x^2+y^2$. In this case, the configuration of a rotationally symmetrical aspherical surface is expressed by $$Z=ch^2/[1 +mt;epmrl;\sqrt{\{\mathbf{1}-(beginbold\mathbf{1}endbolditalk+kmed)\ italcmedsup\mathbf{2}resetitalhmedsup\mathbf{2}reset\}}rlxmx]+Ah^4+Bh^6+Ch^8$$

where c is the curvature of a vertex, k is a conic constant, A is a fourth order aspherical coefficient, B is a sixth order aspherical coefficient, C is an eighth order aspherical coefficient, and D is a tenth order aspherical coefficient.

A decentering surface is given by the shift of the vertex position of this surface (the directions of X, Y, and Z axes are denoted by X, Y, and Z, respectively) from the origin of the coordinate system and by the tilt (α,β, and γ (deg)) of the center axis of the surface, with the X, Y, and Z axes as centers. When a surface to be decentered is called a k surface, the origin of the coordinate system where decentration takes place is defined as a point shifted from the vertex position of a k−1 surface along the Z axis for face-to-face spacing. The decentration takes place in order of X shift, Y shift, Z shift, α tilt, β tilt, and γ tilt. In this case, the plus sign of each of α and β indicates a counterclockwise direction where each of the X axis and the Y axis is viewed from a minus side, and the plus sign of γ indicates a clockwise direction where the Z axis is viewed from a minus direction.

The above symbols are also used in individual embodiments to be described later.

Numerical Data 1

| Face number | Radius of curvature | Face-to-face spacing | Decentration | Refractive index | Abbe's number |
|---|---|---|---|---|---|
| Object surface | ∞ | 793.00 | | | |
| 1 | Aspherical surface [1] | 3.50 | | 1.8061 | 40.9 |
| 2 | ∞ (reflecting surface) | 3.50 | Decentration (1) | 1.8061 | 40.9 |
| 3 | ∞ | D3 | | | |
| 4 | Aspherical surface [2] | 0.70 | | 1.5673 | 42.8 |
| 5 | 3.37 | 1.44 | | 1.7552 | 27.5 |
| 6 | Aspherical surface [3] | D6 | | | |
| 7 | Stop surface | 0.00 | | | |
| 8 | Aspherical surface [4] | 4.20 | | 1.6204 | 60.3 |
| 9 | −3.17 | 0.70 | | 1.7552 | 27.5 |
| 10 | Aspherical surface [5] | D10 | | | |
| 11 | ∞ | 1.44 | | 1.5477 | 62.8 |
| 12 | ∞ | 0.20 | | | |
| 13 | ∞ | 0.60 | | 1.5163 | 64.1 |
| 14 | ∞ | 0.50 | | | |
| Image plane | ∞ | 0.00 | | | |

Aspherical surface [1]

Radius of curvature 7.67
k = 0
A = $-1.3290 \times 10^{-3}$ B = $2.0689 \times 10^{-5}$ C = $-7.1586 \times 10^{-7}$
D = $1.1383 \times 10^{-8}$ Aspherical surface [2]

Radius of curvature −56.78
k = 0
A = $-3.9348 \times 10^{-3}$ B = $2.9702 \times 10^{-5}$ C = $8.1543 \times 10^{-6}$ Aspherical surface [3]

Radius of curvature 8.78
k = 0
A = $-2.0495 \times 10^{-3}$ B = $1.5796 \times 10^{-4}$ C = $8.5496 \times 10^{-6}$ Aspherical surface [4]

Radius of curvature 3.45
k = 0
A = $-1.1833 \times 10^{-3}$ B = $-4.8921 \times 10^{-6}$ C = $-1.2371 \times 10^{-6}$ Aspherical surface [5]

Radius of curvature −22.46
k = 0
A = $5.3926 \times 10^{-3}$ B = $2.1493 \times 10^{-4}$ C = $1.1778 \times 10^{-4}$ Decentration [1]

| | | | | | |
|---|---|---|---|---|---|
| X = | 0.00 | Y = | 0.00 | Z = | 0.00 |
| α = | −45.00 | β = | 0.00 | γ = | 0.00 |

Zoom data (in focusing of infinite object point)

| | WE | ST | TE |
|---|---|---|---|
| f (mm) | 3.3330 | 4.4267 | 5.8903 |
| FNO | 2.7957 | 3.2263 | 3.7268 |
| 2ω (°) | 75.8 | 52.4 | 38.9 |
| D3 | 0.85000 | 3.43876 | 3.85723 |
| D6 | 6.75574 | 2.84989 | 0.85000 |
| D10 | 3.97303 | 5.29013 | 6.87154 |

Second Embodiment

Figure 4A:
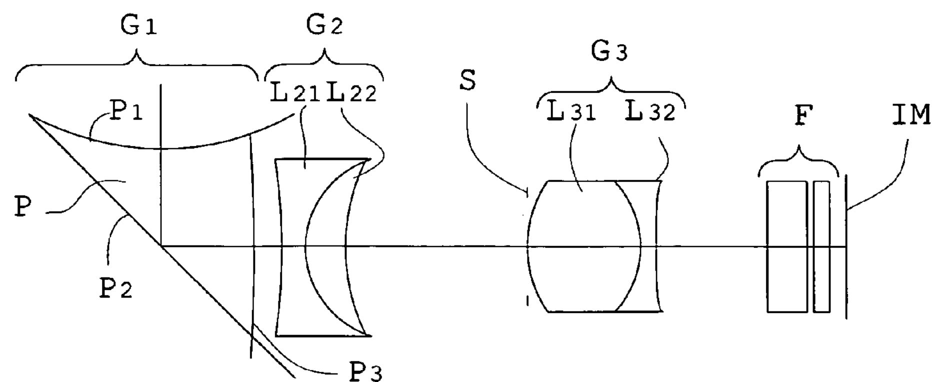
FIGS. 4A, 4B, and 4C are sectional views showing optical arrangements, developed along the optical axis, at wide-angle, middle, and telephoto positions, respectively, in focusing of an infinite object point, of a second embodiment of the path bending optical system according to the present invention.
Figure 4B:
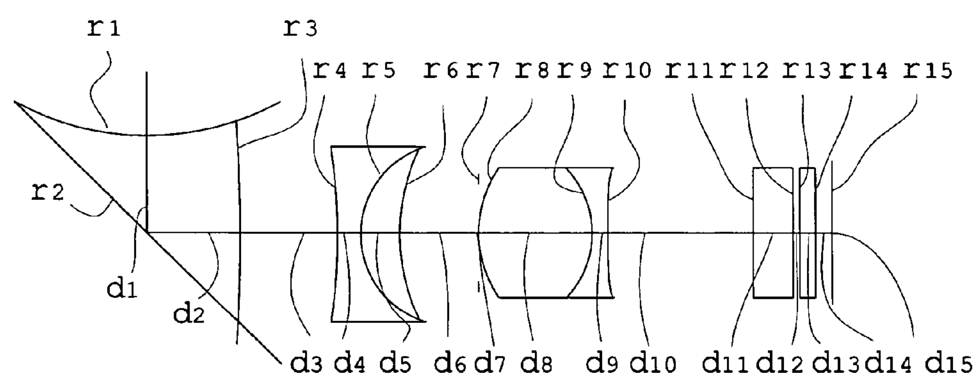
Figure 4C:
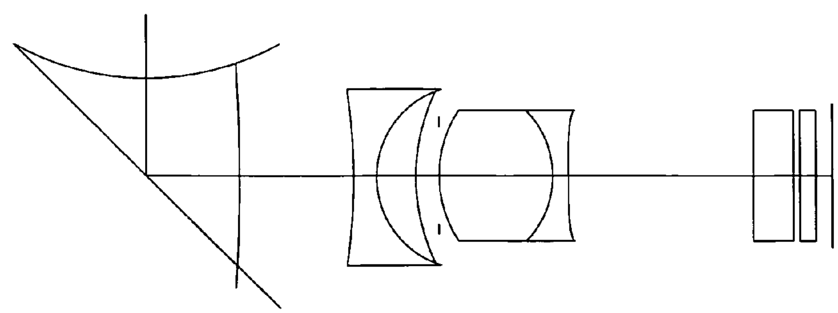

FIGS. 4A, 4B, and 4C show optical arrangements, developed along the optical axis, at wide-angle, middle, and telephoto positions, respectively, in focusing of an infinite object point, of the second embodiment of the path bending optical system according to the present invention.

The path bending optical system of the second embodiment includes, in order from the object side, the first lens unit $G_1$, the second lens unit $G_2$, the aperture stop S, and the third lens unit $G_3$. Also, in FIG. 4A, again reference symbol F represents plane-parallel plates such as a near-infrared cutoff filter, a low-pass filter, and the cover glass of a CCD which is the electronic image sensor, and IM represents an imaging surface.

The first lens unit $G_1$ is constructed with only the path bending prism P and has negative power as s whole. The path bending prism P includes the entrance surface $P_1$, the reflecting surface $P_2$ for bending the optical path, and the exit surface $P_3$. The entrance surface $P_1$ is configured as the curved surface with negative power which is rotationally symmetrical about the optical axis.

The second lens unit $G_2$ is constructed with the cemented doublet including, in order from the object side, the biconcave lens $L_{21}$ and the positive meniscus lens $L_{22}$ with a convex surface facing the object side, and has negative power as a whole.

The third lens unit $G_3$ is constructed with the cemented doublet including, in order from the object side, the biconvex lens $L_{31}$ and the negative lens $L_{32}$, and has positive power as a whole.

In the path bending optical system, when the magnification is changed in the range from the wide-angle position to the telephoto position, the first lens unit $G_1$ remains fixed. The second lens unit $G_2$ is moved toward the image side, and the third lens unit $G_3$ is moved toward the object side, together with the aperture stop S. At this time, the third lens unit $G_3$ is moved while narrowing spacing between the second lens unit $G_2$ and the third lens unit $G_3$. When the magnification is changed, the third lens unit $G_3$ and the aperture stop S are integrally moved, thereby minimizing the fluctuation of aberration caused by the magnification change.

In this path bending optical system, the image-side surface (the exit surface $P_3$) of the path bending prism P of the first embodiment is configured as a surface with positive power, and thereby correction for off-axis aberration, notably chromatic aberration of magnification, is improved. Although the image-side surface (the exit surface $P_3$) of the path bending prism P is configured as the surface with positive power, it may be designed as in the first embodiment. Specifically, the exit surface $P_3$ of the path bending prism P may be configured as a plane surface so that a lens with positive power is added on the image side of the prism P to construct the first lens unit $G_1$.

In the path bending optical system, the ratio of the focal length at the telephoto position to the focal length at the wide-angle position is 1.7. However, negative image distortion is produced at the wide-angle position and the ratio of the angle of view at the wide-angle position to the angle of view at the telephoto position is set to 2 to increase the magnification so that the image distortion is electronically corrected through an electronic correcting means, not shown.

The path bending optical system of the second embodiment is provided with five aspherical surfaces: the entrance surface $P_1$ of the path bending prism P in the first lens unit $G_1$, the most object-side surface and the most image-side surface in the second lens unit $G_2$, and the most object-side surface and the most image-side surface in the third lens unit $G_3$.

Other features of the arrangement, function, and effect of the path bending optical system are almost the same as in the first embodiment.

Subsequently, numerical data of optical members constituting the path-bending optical system of the second embodiment are shown below.

Numerical Data 2

| Face number | Radius of curvature | Face-to-face spacing | Decentration | Refractive index | Abbe's number |
|---|---|---|---|---|---|
| Object surface | ∞ | 793.00 | | | |
| 1 | Aspherical surface [1] | 3.50 | | 1.8061 | 40.9 |
| 2 | ∞ (reflecting surface) | 3.50 | Decentration (1) | 1.8061 | 40.9 |
| 3 | −43.68 | D3 | | | |
| 4 | Aspherical surface [2] | 0.86 | | 1.5673 | 42.8 |
| 5 | 3.31 | 1.48 | | 1.7552 | 27.5 |
| 6 | Aspherical surface [3] | D6 | | | |
| 7 | Stop surface | 0.00 | | | |
| 8 | Aspherical surface [4] | 4.12 | | 1.6204 | 60.3 |
| 9 | −3.22 | 0.70 | | 1.7552 | 27.5 |
| 10 | Aspherical surface [5] | D10 | | | |
| 11 | ∞ | 1.44 | | 1.5477 | 62.8 |
| 12 | ∞ | 0.20 | | | |
| 13 | ∞ | 0.60 | | 1.5163 | 64.1 |
| 14 | ∞ | 0.50 | | | |
| Image plane | ∞ | 0.00 | | | |

Aspherical surface [1]

Radius of curvature 6.75
k = 0
A = $-1.5585 \times 10^{-3}$ B = $2.0366 \times 10^{-5}$ C = $-7.5634 \times 10^{-7}$
D = $1.2964 \times 10^{-8}$ Aspherical surface [2]

Radius of curvature 59.08
k = 0
A = $-3.9315 \times 10^{-3}$ B = $2.2333 \times 10^{-6}$ C = $1.0373 \times 10^{-5}$ Aspherical surface [3]

Radius of curvature 6.77
k = 0
A = $-2.6595 \times 10^{-3}$ B = $1.3831 \times 10^{-4}$ C = $1.3943 \times 10^{-5}$ Aspherical surface [4]

Radius of curvature 3.45
k = 0
A = $-1.1893 \times 10^{-3}$ B = $-7.7499 \times 10^{-6}$ C = $6.3923 \times 10^{-7}$ Aspherical surface [5]

Radius of curvature −20.75
k = 0
A = $5.2402 \times 10^{-3}$ B = $2.0206 \times 10^{-4}$ C = $1.1566 \times 10^{-4}$ Decentration [1]

X = 0.00 Y = 0.00 Z = 0.00
α = −45.00 β = 0.00 γ = 0.00

Zoom data (in focusing of infinite object point)

| | WE | ST | TE |
|---|---|---|---|
| f (mm) | 3.3330 | 4.4012 | 5.7504 |
| FNO | 2.7957 | 3.2262 | 3.7269 |
| 2ω (°) | 77.9 | 53.2 | 40.0 |
| D3 | 0.85000 | 3.37989 | 3.98927 |
| D6 | 6.61252 | 2.86880 | 0.85000 |
| D10 | 3.86484 | 5.07867 | 6.48810 |

Third Embodiment

Figure 5A:
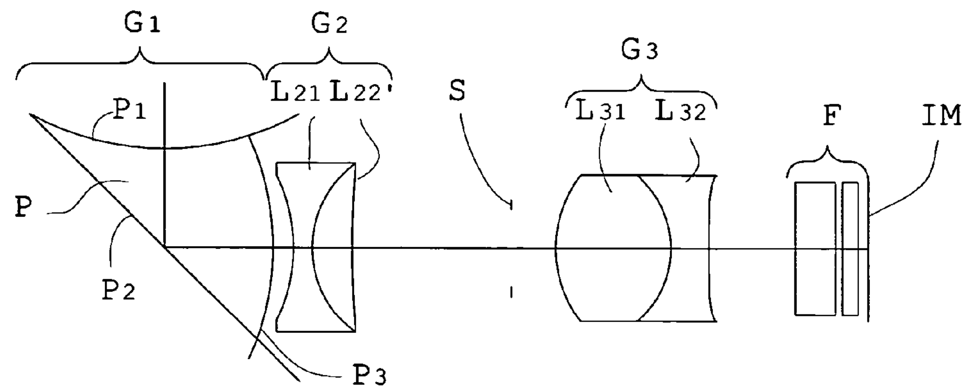
FIGS. 5A, 5B, and 5C are sectional views showing optical arrangements, developed along the optical axis, at wide-angle, middle, and telephoto positions, respectively, in focusing of an infinite object point, of a third embodiment of the path bending optical system according to the present invention.
Figure 5B:
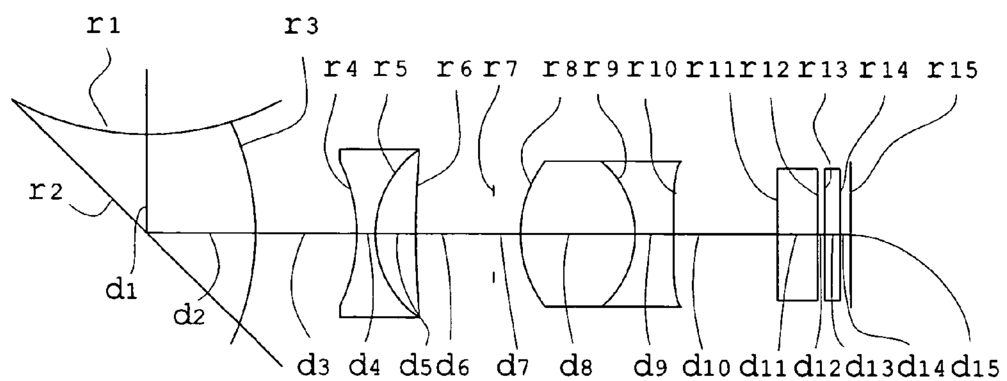
Figure 5C:
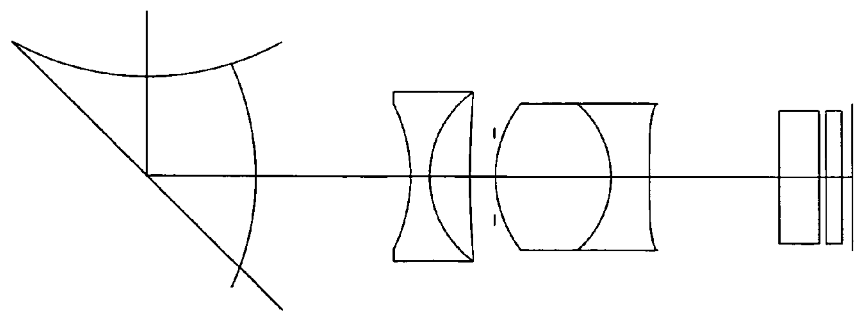

FIGS. 5A, 5B, and 5C show optical arrangements, developed along the optical axis, at wide-angle, middle, and telephoto positions, respectively, in focusing of an infinite object point, of the third embodiment of the path bending optical system according to the present invention.

The path bending optical system of the third embodiment includes, in order from the object side, the first lens unit $G_1$, the second lens unit $G_2$, the aperture stop S, and the third lens unit $G_3$. Also, in FIG. 5A, again reference symbol F represents plane-parallel plates such as a near-infrared cutoff filter, a low-pass filter, and the cover glass of a CCD which is the electronic image sensor, and IM represents an imaging surface.

The first lens unit $G_1$ is constructed with only the path bending prism P and has negative power as s whole. The path bending prism P includes the entrance surface $P_1$, the reflecting surface $P_2$ for bending the optical path, and the exit surface $P_3$. The entrance surface $P_1$ is configured as the curved surface with negative power which is rotationally symmetrical about the optical axis.

The second lens unit $G_2$ is constructed with a cemented doublet including, in order from the object side, the biconcave lens $L_{21}$ and a convex lens $L_{22}'$, and has negative power as a whole.

The third lens unit $G_3$ is constructed with the cemented doublet including, in order from the object side, the biconvex lens $L_{31}$ and the negative lens $L_{32}$, and has positive power as a whole.

In the path bending optical system, when the magnification is changed in the range from the wide-angle position to the telephoto position, the first lens unit $G_1$ remains fixed. The second lens unit $G_2$ is moved toward the image side, the aperture stop is fixed, and the third lens unit $G_3$ is moved toward the object side. Also, the third lens unit $G_3$ is moved while narrowing spacing between the second lens unit $G_2$ and the third lens unit $G_3$.

In the path bending optical system, the ratio of the focal length at the telephoto position to the focal length at the wide-angle position is 1.7. However, negative image distortion is produced at the wide-angle position and the ratio of the angle of view at the wide-angle position to the angle of view at the telephoto position is set to 1.9 to increase the magnification so that the image distortion is electronically corrected through an electronic correcting means, not shown.

The path bending optical system of the third embodiment is provided with six aspherical surfaces: the entrance surface $P_1$ and the exit surface $P_3$ of the path bending prism P in the first lens unit $G_1$, the most object-side surface and the most image-side surface in the second lens unit $G_2$, and the most object-side surface and the most image-side surface in the third lens unit $G_3$.

It is more desirable, in view of correction for aberration, that the entrance surface $P_1$ of the path bending prism P has the aspherical function that the paraxial power is weakened progressively in going from the optical axis to the periphery.

In the second lens unit $G_2$, it is desirable, in view of correction for aberration, that a surface has the aspherical function that the paraxial power is strengthened progressively in going from the optical axis to the periphery. The path bending optical system of the third embodiment is constructed so that the image-side surface of the cemented doublet of the second lens unit has this aspherical function and the paraxial power is reversed in the most peripheral portion of the effective diameter of the surface.

In the image-side surface of the negative lens (the negative lens $L_{32}$) of the third lens unit $G_3$, it is desirable, in view of correction for aberration, to have the aspherical function that the paraxial power is strengthened progressively in going from the optical axis to the periphery. In the path bending optical system, this surface is designed so that the paraxial power is reversed in the most peripheral portion of the effective diameter.

Other features of the arrangement, function, and effect of the path bending optical system are almost the same as in the first embodiment.

Subsequently, numerical data of optical members constituting the path-bending optical system of the third embodiment are shown below.

Numerical Data 3

| Face number | Radius of curvature | Face-to-face spacing | Decentration | Refractive index | Abbe's number |
|---|---|---|---|---|---|
| Object surface | ∞ | 793.00 | | | |
| 1 | Aspherical surface [1] | 3.50 | | 1.8061 | 40.9 |
| 2 | ∞ (reflecting surface) | 4.00 | Decentration (1) | 1.8061 | 40.9 |
| 3 | Aspherical surface [2] | D3 | | | |
| 4 | Aspherical surface [3] | 0.70 | | 1.6230 | 58.2 |
| 5 | 4.08 | 1.59 | | 1.7440 | 44.8 |
| 6 | Aspherical surface [4] | D6 | | | |
| 7 | Stop surface | D7 | | | |
| 8 | Aspherical surface [5] | 4.20 | | 1.6204 | 60.3 |
| 9 | −3.50 | 1.62 | | 1.7552 | 27.5 |
| 10 | Aspherical surface [6] | D10 | | | |
| 11 | ∞ | 1.44 | | 1.5477 | 62.8 |
| 12 | ∞ | 0.20 | | | |
| 13 | ∞ | 0.60 | | 1.5163 | 64.1 |
| 14 | ∞ | 0.50 | | | |
| Image plane | ∞ | 0.00 | | | |

Aspherical surface [1]

Radius of curvature 6.31
k = 0
A = $-1.5899 \times 10^{-3}$ B = $6.1847 \times 10^{-6}$ C = $-3.3333 \times 10^{-8}$
D = $-6.2797 \times 10^{-9}$ Aspherical surface [2]

Radius of curvature −9.81
k = 0
A = $4.7610 \times 10^{-4}$ B = $2.4854 \times 10^{-6}$ C = $-8.9182 \times 10^{-8}$ Aspherical surface [3]

Radius of curvature −5.10
k = 0
A = $1.5951 \times 10^{-3}$ B = $7.7248 \times 10^{-5}$ C = $-7.6218 \times 10^{-7}$ Aspherical surface [4]

Radius of curvature −49.37
k = 0
A = $9.6206 \times 10^{-4}$ B = $6.2865 \times 10^{-5}$ C = $-7.8818 \times 10^{-7}$ -continued Aspherical surface [5]

Radius of curvature 3.72
k = 0
A = $-9.5143 \times 10^{-4}$ B = $3.9724 \times 10^{-5}$ C = $-7.0827 \times 10^{-6}$ Aspherical surface [6]

Radius of curvature −24.79
k = 0
A = $4.7104 \times 10^{-3}$ B = $2.2455 \times 10^{-4}$ C = $7.5432 \times 10^{-5}$ Decentration [1]

| | | | | | |
|---|---|---|---|---|---|
| X = | 0.00 | Y = | 0.00 | Z = | 0.00 |
| α = | −45.00 | β = | 0.00 | γ = | 0.00 |

Zoom data (in focusing of infinite object point)

| | WE | ST | TE |
|---|---|---|---|
| f (mm) | 3.3330 | 4.3051 | 5.6108 |
| FNO | 2.7966 | 3.1175 | 3.6229 |
| 2ω (°) | 75.4 | 52.6 | 39.7 |
| D3 | 0.85000 | 3.91410 | 5.93345 |
| D6 | 5.93345 | 2.86935 | 0.85000 |
| D7 | 1.67330 | 0.96399 | 0.00000 |
| D10 | 3.15718 | 3.86649 | 4.83048 |

Fourth Embodiment

Figure 6A:
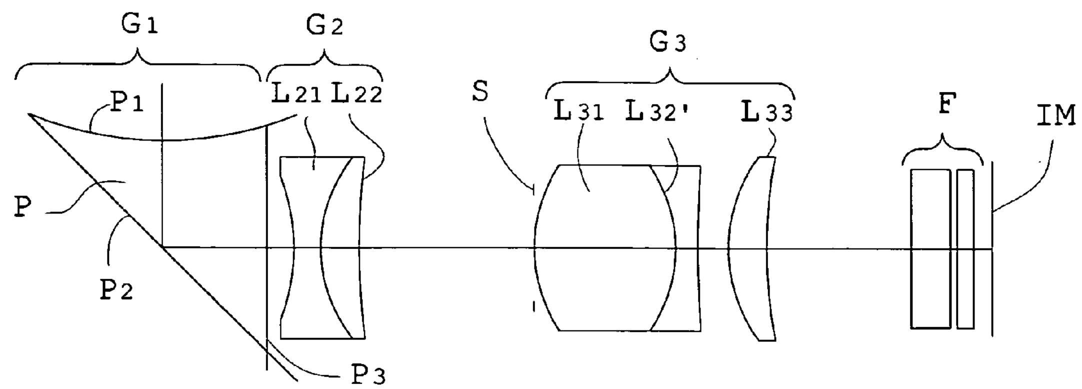
FIGS. 6A, 6B, and 6C are sectional views showing optical arrangements, developed along the optical axis, at wide-angle, middle, and telephoto positions, respectively, in focusing of an infinite object point, of a fourth embodiment of the path bending optical system according to the present invention.
Figure 6B:
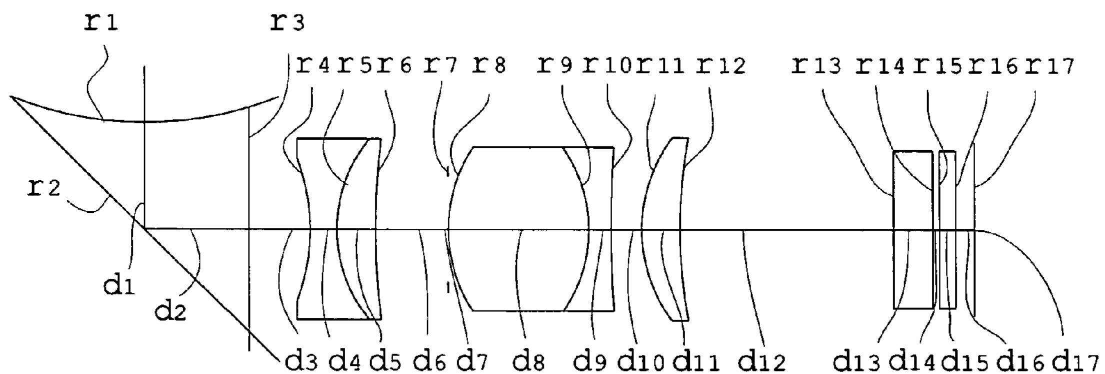
Figure 6C:
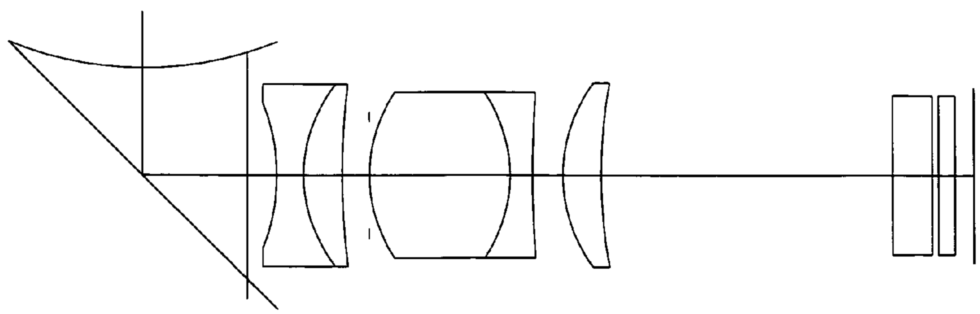

FIGS. 6A, 6B, and 6C show optical arrangements, developed along the optical axis, at wide-angle, middle, and telephoto positions, respectively, in focusing of an infinite object point, of the fourth embodiment of the path bending optical system according to the present invention.

The path bending optical system of the fourth embodiment includes, in order from the object side, the first lens unit $G_1$, the second lens unit $G_2$, the aperture stop S, and the third lens unit $G_3$. Also, in FIG. 6A, again reference symbol F represents plane-parallel plates such as a near-infrared cutoff filter, a low-pass filter, and the cover glass of a CCD which is the electronic image sensor, and IM represents an imaging surface.

The first lens unit $G_1$ is constructed with only the path bending prism P and has negative power as s whole. The path bending prism P includes the entrance surface $P_1$, the reflecting surface $P_2$ for bending the optical path, and the exit surface $P_3$. The entrance surface $P_1$ is configured as the curved surface with negative power which is rotationally symmetrical about the optical axis.

The second lens unit $G_2$ is constructed with the cemented doublet including, in order from the object side, the biconcave lens $L_{21}$ and the positive meniscus lens $L_{22}$ with a convex surface facing the object side, and has negative power as a whole.

The third lens unit $G_3$ includes, in order from the object side, a cemented doublet of the biconvex lens $L_{31}$ and a biconcave lens $L_{32}'$ and a positive meniscus lens $L_{33}$ with a convex surface facing the object side, and has positive power as a whole.

In the third lens unit $G_3$, it is necessary to converge divergent light from the first lens unit $G_1$ with negative power. In order to obtain a short focal length while ensuring good performance, therefore, it is desirable that the third lens unit $G_3$, like the path bending the optical system of the fourth embodiment, includes at least two lenses (the biconvex lens $L_{31}$ and the positive meniscus lens $L_{33}$ with a convex surface facing the object side), each with positive power. In this case, when the last surface of the third lens unit $G_3$, like the path bending optical system of the fourth embodiment, is configured as a concave surface directed toward the image side, the position of the principal point is shifted to the side of the second lens $G_2$ and the distance between the principal points of the second and third lens units $G_2$ and $G_3$ can be diminished so that the overall lens length is reduced and the magnification of the third lens unit $G_3$ can be increased. The amount of movement of the third lens unit $G_3$ caused by the magnification change can thus be decreased.

In the path bending optical system, when the magnification is changed in the range from the wide-angle position to the telephoto position, the first lens unit $G_1$ remains fixed. The second lens unit $G_2$, after being moved toward the image side, is moved so that it is U-turned to the original position on the object side. The third lens unit $G_3$ is moved toward the object side, together with the aperture stop S, while narrowing the spacing between the second lens unit $G_2$ and the third lens unit $G_3$.

In the path bending optical system, the ratio of the focal length at the telephoto position to the focal length at the wide-angle position is 2.1. However, negative image distortion is produced at the wide-angle position and the ratio of the angle of view at the wide-angle position to the angle of view at the telephoto position is set to 2.6 to increase the magnification so that the image distortion is electronically corrected through an electronic correcting means, not shown.

The path bending optical system of the fourth embodiment is provided with six aspherical surfaces: the entrance surface $P_1$ of the path bending prism P in the first lens unit $G_1$, the most object-side surface and the most image-side surface in the second lens unit $G_2$, and the most object-side surface and the most image-side surface of the cemented doublet and the most image-side surface (the image-side surface of the single lens) in the third lens unit $G_3$.

In this case, as a matter of course, when the power is imparted to the exit surface of the path bending optical system P, like the second and third embodiments, and the lens is added to the first lens unit $G_1$, off-axis aberrations including chromatic aberration of magnification can be favorably corrected. Alternatively, image distortion is intentionally produced and the wide angle of view can be constructed, which is favorably.

Other features of the arrangement, function, and effect of the path bending optical system are almost the same as in the first embodiment.

Subsequently, numerical data of optical members constituting the path-bending optical system of the fourth embodiment are shown below.

Numerical Data 4

| Face number | Radius of curvature | Face-to-face spacing | Decentration | Refractive index | Abbe's number |
|---|---|---|---|---|---|
| Object surface | ∞ | 793.00 | | | |
| 1 | Aspherical surface [1] | 3.50 | | 1.8061 | 40.9 |
| 2 | ∞(reflecting surface) | 3.50 | Decentration (1) | 1.8061 | 40.9 |
| 3 | ∞ | D3 | | | |
| 4 | Aspherical surface [2] | 0.91 | | 1.6385 | 55.4 |
| 5 | 4.66 | 1.28 | | 1.7552 | 27.5 |
| 6 | Aspherical surface [3] | D6 | | | |
| 7 | Stop surface | 0.00 | | | |
| 8 | Aspherical surface [4] | 4.72 | | 1.6204 | 60.3 |
| 9 | −4.88 | 0.70 | | 1.7552 | 27.5 |
| 10 | Aspherical surface [5] | 1.06 | | | |
| 11 | 4.94 | 1.21 | | 1.6204 | 60.3 |
| 12 | Aspherical surface [6] | D12 | | | |
| 13 | ∞ | 1.44 | | 1.5477 | 62.8 |
| 14 | ∞ | 0.20 | | | |
| 15 | ∞ | 0.60 | | 1.5163 | 64.1 |
| 16 | ∞ | 0.50 | | | |
| Image plane | ∞ | 0.00 | | | |

Aspherical surface [1]

Radius of curvature 9.98
k = 0
A = $-3.2903 \times 10^{-4}$ B = $9.6581 \times 10^{-7}$ C = $-3.0034 \times 10^{-8}$
D = $-2.9458 \times 10^{-9}$ Aspherical surface [2]

Radius of curvature −6.43
k = 0
A = $3.1382 \times 10^{-4}$ B = $5.7936 \times 10^{-5}$ C = $-7.3133 \times 10^{-6}$ Aspherical surface [3]

Radius of curvature 48.99
k = 0
A = $5.1928 \times 10^{-4}$ B = $4.5210 \times 10^{-5}$ C = $-4.8022 \times 10^{-6}$ Aspherical surface [4]

Radius of curvature 4.74
k = 0
A = $-4.5913 \times 10^{-4}$ B = $-8.3395 \times 10^{-6}$ C = $1.4671 \times 10^{-6}$ Aspherical surface [5]

Radius of curvature 41.78
k = 0
A = $7.3910 \times 10^{-4}$ B = $1.3508 \times 10^{-6}$ C = $9.9062 \times 10^{-6}$ Aspherical surface [6]

Radius of curvature 30.37
k = 0
A = $2.3409 \times 10^{-3}$ B = $2.3116 \times 10^{-5}$ C = $-2.0528 \times 10^{-6}$ Decentration [1]

X = 0.00 Y = 0.00 Z = 0.00
α = −45.00 β = 0.00 γ = 0.00

Zoom data (in focusing of infinite object point)

| | WE | ST | TE |
|---|---|---|---|
| f (mm) | 3.3330 | 4.8301 | 7.0274 |
| FNO | 2.7973 | 3.2368 | 3.7767 |
| 2ω (°) | 87.8 | 51.6 | 33.7 |
| D3 | 0.85000 | 1.95549 | 0.90306 |
| D6 | 5.82910 | 2.49387 | 0.85000 |
| D12 | 4.63987 | 6.86960 | 9.56590 |

Fifth Embodiment

Figure 7A:
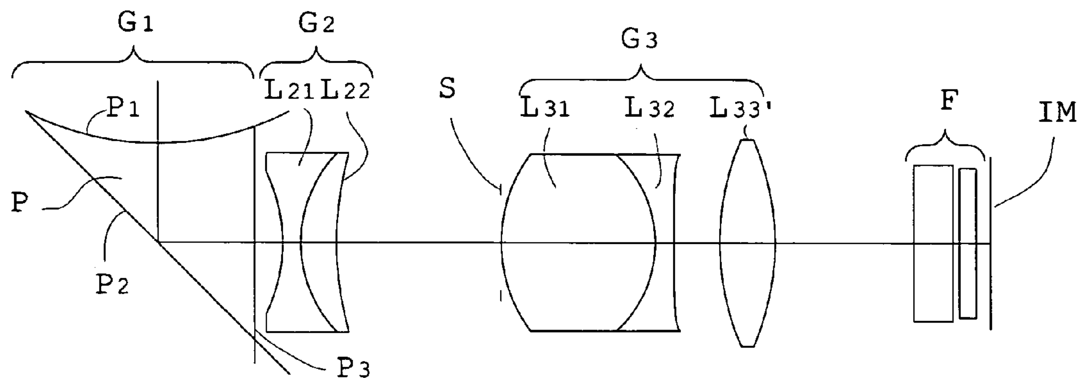
FIGS. 7A, 7B, and 7C are sectional views showing optical arrangements, developed along the optical axis, at wide-angle, middle, and telephoto positions, respectively, in focusing of an infinite object point, of a fifth embodiment of the path bending optical system according to the present invention.
Figure 7B:
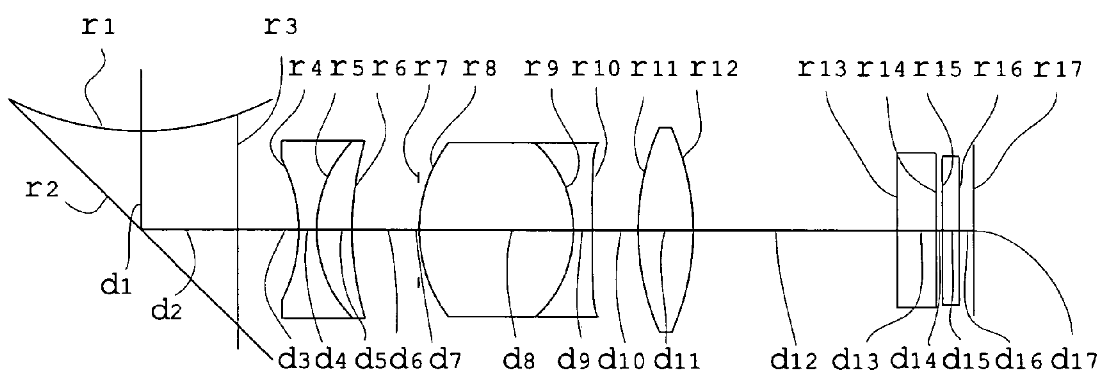
Figure 7C:
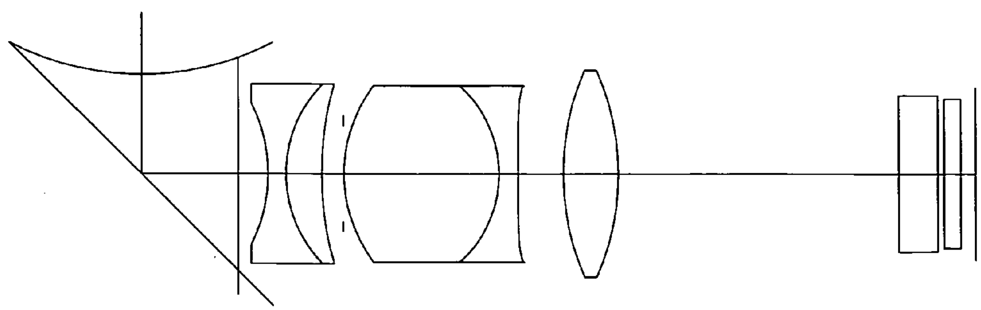

FIGS. 7A, 7B, and 7C show optical arrangements, developed along the optical axis, at wide-angle, middle, and telephoto positions, respectively, in focusing of an infinite object point, of the fifth embodiment of the path bending optical system according to the present invention.

The path bending optical system of the fifth embodiment includes, in order from the object side, the first lens unit $G_1$, the second lens unit $G_2$, the aperture stop S, and the third lens unit $G_3$. Also, in FIG. 7A, again reference symbol F represents plane-parallel plates such as a near-infrared cutoff filter, a low-pass filter, and the cover glass of a CCD which is the electronic image sensor, and IM represents an imaging surface.

The first lens unit $G_1$ is constructed with only the path bending prism P and has negative power as s whole. The path bending prism P includes the entrance surface $P_1$, the reflecting surface $P_2$ for bending the optical path, and the exit surface $P_3$. The entrance surface $P_1$ is configured as the curved surface with negative power which is rotationally symmetrical about the optical axis.

The second lens unit $G_2$ is constructed with the cemented doublet including, in order from the object side, the biconcave lens $L_{21}$ and the positive meniscus lens $L_{22}$ with a convex surface facing the object side, and has negative power as a whole.

The third lens unit $G_3$ includes, in order from the object side, the cemented doublet of the biconvex lens $L_{31}$ and the negative lens $L_{32}$ with a concave surface facing the object side and a biconvex lens $L_{33}'$, and has positive power as a whole.

In the path bending optical system, when the magnification is changed in the range from the wide-angle position to the telephoto position, the first lens unit $G_1$ remains fixed. The second lens unit $G_2$, after being moved toward the image side, is moved so that it is U-turned to the original position on the object side. The third lens unit $G_3$ is moved toward the object side, together with the aperture stop S, while narrowing the spacing between the second lens unit $G_2$ and the third lens unit $G_3$.

In the second lens unit $G_2$ is moved along the optical axis, and thereby focusing is performed.

In the path bending optical system, the ratio of the focal length at the telephoto position to the focal length at the wide-angle position is 2.0. However, negative image distortion is produced at the wide-angle position and the ratio of the angle of view at the wide-angle position to the angle of view at the telephoto position is set to 2.4 to increase the magnification so that the image distortion is electronically corrected through an electronic correcting means, not shown.

The path bending optical system of the fifth embodiment is provided with six aspherical surfaces: the entrance surface $P_1$ of the path bending prism P in the first lens unit $G_1$, the most object-side surface and the most image-side surface in the second lens unit $G_2$, and the most object-side surface and the most image-side surface of the cemented doublet and the most image-side surface (the image-side surface of the single lens) in the third lens unit $G_3$.

Other features of the arrangement, function, and effect of the path bending optical system are almost the same as in the first embodiment.

Subsequently, numerical data of optical members constituting the path-bending optical system of the fifth embodiment are shown below.

Numerical Data 5

| Face number | Radius of curvature | Face-to-face spacing | Decentration | Refractive index | Abbe's number |
|---|---|---|---|---|---|
| Object surface | ∞ | ∞ | | | |
| 1 | Aspherical surface [1] | 3.50 | | 1.8061 | 40.9 |
| 2 | ∞ (reflecting surface) | 3.50 | Decentration (1) | 1.8061 | 40.9 |
| 3 | ∞ | D3 | | | |
| 4 | Aspherical surface [2] | 0.70 | | 1.4875 | 70.2 |
| 5 | 4.48 | 1.22 | | 1.7552 | 27.5 |
| 6 | Aspherical surface [3] | D6 | | | |
| 7 | Stop surface | 0.00 | | | |
| 8 | Aspherical surface [4] | 5.43 | | 1.6385 | 55.4 |
| 9 | −4.32 | 0.70 | | 1.7552 | 27.5 |
| 10 | Aspherical surface [5] | 1.66 | | | |
| 11 | 8.88 | 1.72 | | 1.4875 | 70.2 |
| 12 | Aspherical surface [6] | D12 | | | |
| 13 | ∞ | 1.44 | | 1.5477 | 62.8 |
| 14 | ∞ | 0.20 | | | |
| 15 | ∞ | 0.60 | | 1.5163 | 64.1 |
| 16 | ∞ | 0.50 | | | |
| Image plane | ∞ | 0.00 | | | |

Aspherical surface [1]

Radius of curvature 8.48 k = 0

A = $-5.8839 \times 10^{-4}$ B = $-6.1279 \times 10^{-7}$ C = $8.9392 \times 10^{-9}$ D = $-2.5293 \times 10^{-9}$ Aspherical surface [2]

Radius of curvature −6.24 k = 0

A = $-7.8670 \times 10^{-4}$ B = $1.2664 \times 10^{-4}$ C = $-8.0838 \times 10^{-6}$ Aspherical surface [3]

Radius of curvature 12.64 k = 0

A = $2.6892 \times 10^{-4}$ B = $1.0456 \times 10^{-4}$ C = $-6.2492 \times 10^{-6}$ Aspherical surface [4]

Radius of curvature 5.46 k = 0

A = $-2.6880 \times 10^{-4}$ B = $1.3308 \times 10^{-5}$ C = $-1.5466 \times 10^{-7}$ Aspherical surface [5]

Radius of curvature −133.95 k = 0

A = $1.6666 \times 10^{-3}$ B = $3.0893 \times 10^{-5}$ C = $3.5494 \times 10^{-6}$ Aspherical surface [6]

Radius of curvature −10.25 k = 0

A = $-1.4223 \times 10^{-4}$ B = $3.5655 \times 10^{-6}$ C = $-3.0753 \times 10^{-8}$ Decentration [1]

X = 0.00 Y = 0.00 Z = 0.00

α = −45.00 β = 0.00 γ = 0.00

Zoom data (in focusing of infinite object point)

| | WE | ST | TE |
|---|---|---|---|
| f (mm) | 3.3330 | 4.6752 | 6.5574 |
| FNO | 2.8000 | 3.1177 | 3.4701 |
| 2ω (°) | 87.3 | 53.8 | 36.5 |
| D3 | 0.95034 | 1.99811 | 0.96841 |
| D6 | 5.86637 | 2.48455 | 0.85000 |
| D12 | 5.00517 | 7.33922 | 10.00347 |

Sixth Embodiment

Figure 8A:
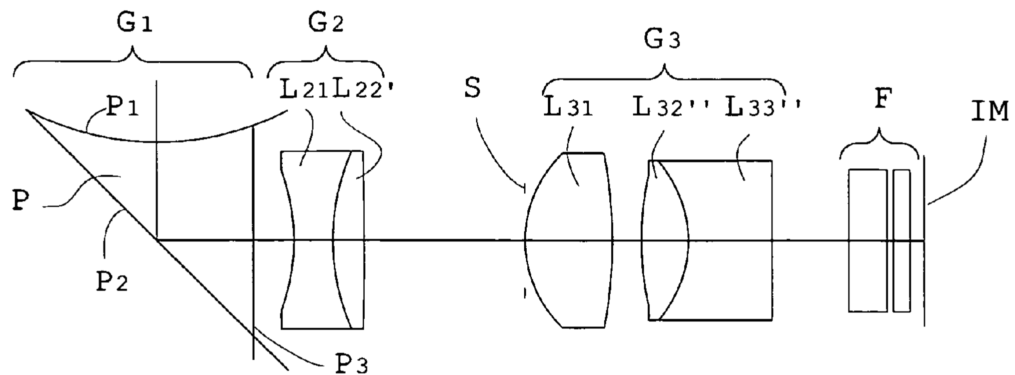
FIGS. 8A, 8B, and 8C are sectional views showing optical arrangements, developed along the optical axis, at wide-angle, middle, and telephoto positions, respectively, in focusing of an infinite object point, of a sixth embodiment of the path bending optical system according to the present invention.
Figure 8B:
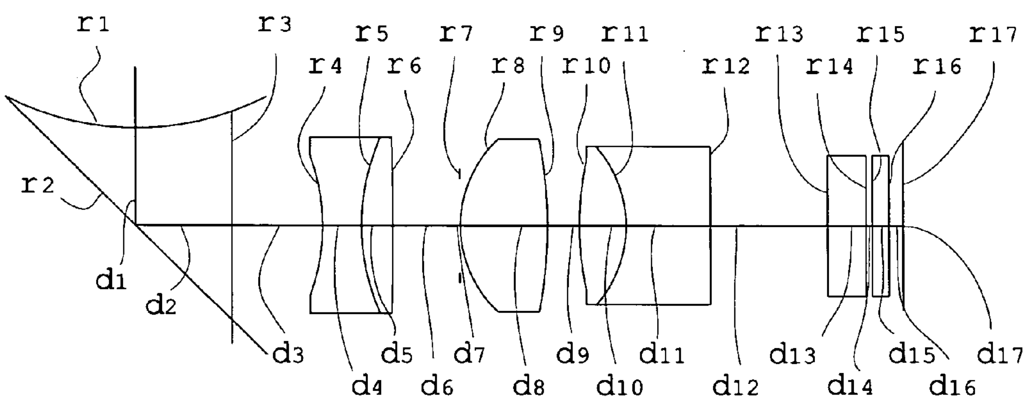
Figure 8C:
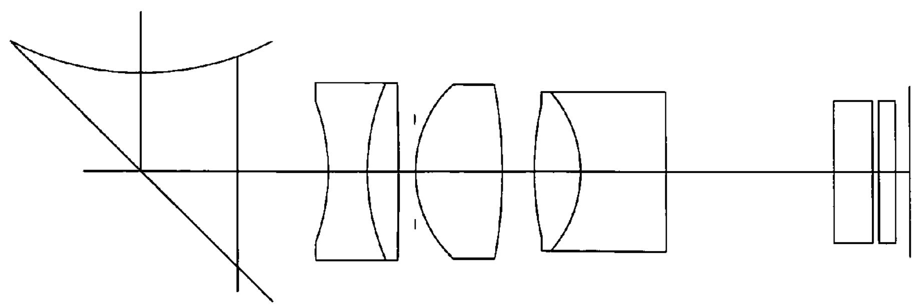

FIGS. 8A, 8B, and 8C show optical arrangements, developed along the optical axis, at wide-angle, middle, and telephoto positions, respectively, in focusing of an infinite object point, of the sixth embodiment of the path bending optical system according to the present invention.

The path bending optical system of the sixth embodiment includes, in order from the object side, the first lens unit $G_1$, the second lens unit $G_2$, the aperture stop S, and the third lens unit $G_3$. Also, in FIG. 8A, again reference symbol F represents plane-parallel plates such as a near-infrared cutoff filter, a low-pass filter, and the cover glass of a CCD which is the electronic image sensor, and IM represents an imaging surface.

The first lens unit $G_1$ is constructed with only the path bending prism P and has negative power as s whole. The path bending prism P includes the entrance surface $P_1$, the reflecting surface $P_2$ for bending the optical path, and the exit surface $P_3$. The entrance surface $P_1$ is configured as the curved surface with negative power which is rotationally symmetrical about the optical axis.

The second lens unit $G_2$ is constructed with the cemented doublet including, in order from the object side, the biconcave lens $L_{21}$ and the convex lens $L_{22}$', and has negative power as a whole.

The third lens unit $G_3$ includes, in order from the object side, the biconvex lens $L_{31}$ and a cemented doublet of a convex lens $L_{32}$" and a negative lens $L_{33}$", and has positive power as a whole.

In the path bending optical system, when the magnification is changed in the range from the wide-angle position to the telephoto position, the first lens unit $G_1$ remains fixed. The second lens unit $G_2$, after being moved toward the image side, is moved so that it is slightly returned to the object side. The third lens unit $G_3$ is moved toward the object side, together with the aperture stop S, while narrowing the spacing between the second lens unit $G_2$ and the third lens unit $G_3$.

In the path bending optical system, the ratio of the focal length at the telephoto position to the focal length at the wide-angle position is 1.8. However, negative image distortion is produced at the wide-angle position and the ratio of the angle of view at the wide-angle position to the angle of view at the telephoto position is set to 2.1 to increase the magnification so that the image distortion is electronically corrected through an electronic correcting means, not shown.

The path bending optical system of the fifth embodiment is provided with five aspherical surfaces: the entrance surface $P_1$ of the path bending prism P in the first lens unit $G_1$, the object-side surface of the cemented doublet in the second lens unit $G_2$, and the most object-side surface (the object-side surface of the single lens) and the most object-side surface and the most image-side surface of the cemented doublet in the third lens unit $G_3$.

Other features of the arrangement, function, and effect of the path bending optical system are almost the same as in the first embodiment.

Subsequently, numerical data of optical members constituting the path-bending optical system of the sixth embodiment are shown below.

Numerical Data 6

| Face number | Radius of curvature | Face-to-face spacing | Decentration | Refractive index | Abbe's number |
|---|---|---|---|---|---|
| Object surface | ∞ | 793.00 | | | |
| 1 | Aspherical surface [1] | 3.50 | | 1.8061 | 40.9 |
| 2 | ∞ (reflecting surface) | 3.50 | Decentration (1) | 1.8061 | 40.9 |
| 3 | ∞ | D3 | | | |
| 4 | Aspherical surface [2] | 1.34 | | 1.5891 | 61.1 |
| 5 | 7.31 | 1.11 | | 1.7552 | 27.5 |
| 6 | 79.63 | D6 | | | |
| 7 | Stop surface | 0.10 | | | |
| 8 | Aspherical surface [3] | 3.00 | | 1.4875 | 70.2 |
| 9 | −36.76 | 1.14 | | | |
| 10 | Aspherical surface [4] | 1.62 | | 1.6204 | 60.3 |
| 11 | −3.96 | 3.00 | | 1.7400 | 28.3 |
| 12 | Aspherical surface [5] | D12 | | | |
| 13 | ∞ | 1.44 | | 1.5477 | 62.8 |
| 14 | ∞ | 0.20 | | | |
| 15 | ∞ | 0.60 | | 1.5163 | 64.1 |
| 16 | ∞ | 0.50 | | | |
| Image plane | ∞ | 0.00 | | | |

Aspherical surface [1]

Radius of curvature 8.21

| | | | | | |
|---|---|---|---|---|---|
| k = | 0 | | | | |
| A = | $-6.0691 \times 10^{-4}$ | B = | $2.3148 \times 10^{-6}$ | C = | $-2.2461 \times 10^{-7}$ |
| D = | $1.5913 \times 10^{-9}$ | | | | |

Aspherical surface [2]

Radius of curvature −8.02

| | | | | | |
|---|---|---|---|---|---|
| k = | 0 | | | | |
| A = | $5.9404 \times 10^{-4}$ | B = | $-1.0800 \times 10^{-5}$ | C = | $-2.0430 \times 10^{-6}$ |

Aspherical surface [3]

Radius of curvature 3.96

| | | | | | |
|---|---|---|---|---|---|
| k = | 0 | | | | |
| A = | $-9.3671 \times 10^{-4}$ | B = | $-1.4229 \times 10^{-5}$ | C = | $-4.4263 \times 10^{-6}$ |

Aspherical surface [4]

Radius of curvature 8.53

| | | | | | |
|---|---|---|---|---|---|
| k = | 0 | | | | |
| A = | $-2.2694 \times 10^{-3}$ | B = | $-9.8246 \times 10^{-5}$ | C = | $-2.1362 \times 10^{-5}$ |

Aspherical surface [5]

Radius of curvature 69.04

| | | | | | |
|---|---|---|---|---|---|
| k = | 0 | | | | |
| A = | $1.5047 \times 10^{-4}$ | B = | $-1.1013 \times 10^{-4}$ | C = | $7.5910 \times 10^{-6}$ |

Decentration [1]

| | | | | | |
|---|---|---|---|---|---|
| X = | 0.00 | Y = | 0.00 | Z = | 0.00 |
| α = | −45.00 | β = | 0.00 | γ = | 0.00 |

Zoom data (in focusing of infinite object point)

| | WE | ST | TE |
|---|---|---|---|
| f (mm) | 3.3330 | 4.4270 | 5.8802 |
| FNO | 2.7964 | 3.2051 | 3.6695 |
| 2ω (°) | 85.1 | 56.4 | 40.5 |
| D3 | 1.44628 | 3.13706 | 3.06590 |
| D6 | 5.77777 | 2.55314 | 0.85000 |
| D12 | 2.72369 | 4.25753 | 6.03184 |

Seventh Embodiment

Figure 9A:
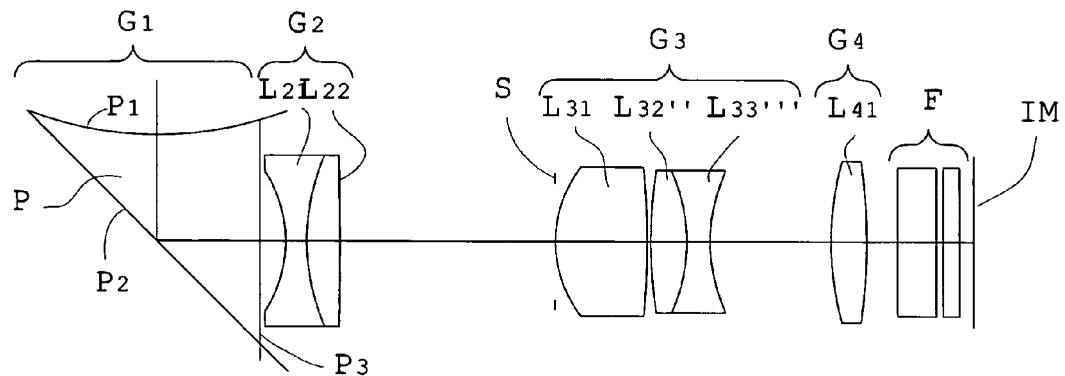
FIGS. 9A, 9B, and 9C are sectional views showing optical arrangements, developed along the optical axis, at wide-angle, middle, and telephoto positions, respectively, in focusing of an infinite object point, of a seventh embodiment of the path bending optical system according to the present invention.
Figure 9B:
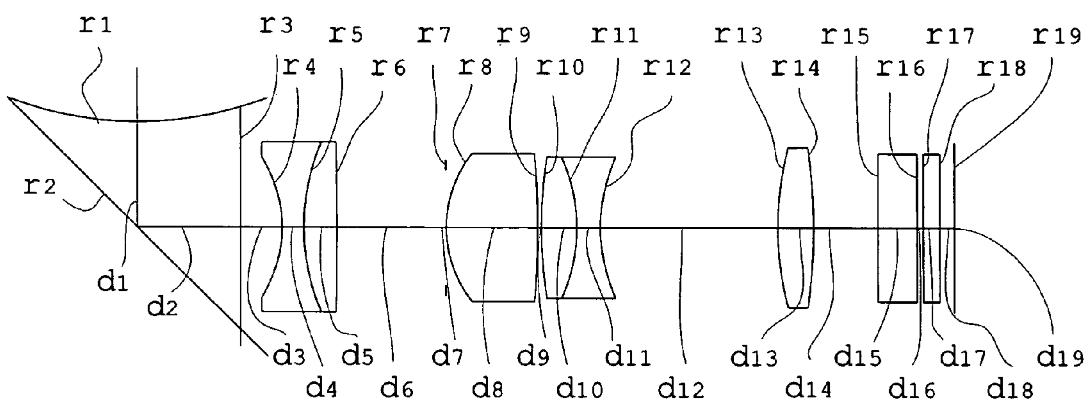
Figure 9C:
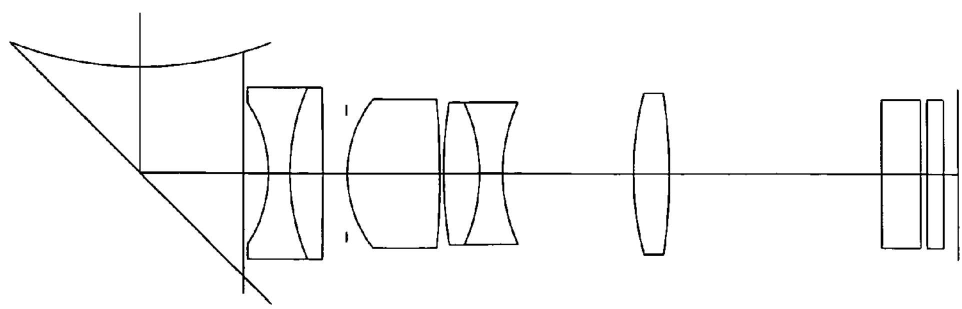

FIGS. 9A, 9B, and 9C show optical arrangements, developed along the optical axis, at wide-angle, middle, and telephoto positions, respectively, in focusing of an infinite object point, of the seventh embodiment of the path bending optical system according to the present invention.

The path bending optical system of the seventh embodiment includes, in order from the object side, the first lens unit $G_1$, the second lens unit $G_2$, the aperture stop S, the third lens unit $G_3$, and a fourth lens unit $G_4$. Also, in FIG. 9A, again reference symbol F represents plane-parallel plates such as a near-infrared cutoff filter, a low-pass filter, and the cover glass of a CCD which is the electronic image sensor, and IM represents an imaging surface.

The first lens unit $G_1$ is constructed with only the path bending prism P and has negative power as s whole. The path bending prism P includes the entrance surface $P_1$, the reflecting surface $P_2$ for bending the optical path, and the exit surface $P_3$. The entrance surface $P_1$ is configured as the curved surface with negative power which is rotationally symmetrical about the optical axis.

The second lens unit $G_2$ is constructed with the cemented doublet including, in order from the object side, the biconcave lens $L_{21}$ and the convex lens $L_{22}'$, and has negative power as a whole.

The third lens unit $G_3$ includes, in order from the object side, the biconvex lens $L_{31}$ and a cemented doublet of the convex lens $L_{32}''$ and a biconcave lens $L_{33}'''$, and has positive power as a whole.

The fourth lens unit $G_4$ is constructed with a biconvex lens $L_{41}$ and has positive power as a whole.

In the path bending optical system, when the magnification is changed in the range from the wide-angle position to the telephoto position, the first lens unit $G_1$ remains fixed. The second lens unit $G_2$, after being moved toward the image side, is moved so that it is U-turned to the original position on the object side. The third lens unit $G_3$ is moved toward the object side, together with the aperture stop S, while narrowing the spacing between the second lens unit $G_2$ and the third lens unit $G_3$. The fourth lens unit $G_4$, after being moved to widen spacing between the third lens unit $G_3$ and the fourth lens unit $G_4$, is moved toward the object side to narrow the spacing. The fourth lens unit $G_4$ is moved along the optical axis, and thereby focusing is performed.

In the third lens unit $G_3$, it is necessary to converge divergent light from the second lens unit $G_2$ with negative power. In order to ensure good performance, it is desirable that the third lens unit $G_3$ includes at least two positive lenses. In this case, it is desirable that the third lens unit $G_3$, like this path bending optical system, includes, in order from the object side, the positive lens (the biconvex lens $L_{31}$) and the cemented doublet of the positive lens (the biconvex lens $L_{32}''$) and the negative lens (the biconcave lens $L_{33}'''$). When the cemented doublet is used as mentioned above, decentering and spacing errors become hard to occur and the mechanical structure is simplified. In this case, when the cemented doublet including, in order from the object side, the biconvex lens and the biconcave lens is configured into the shape of a meniscus lens with a concave surface facing the image side, the position of the principal point of the third lens unit $G_3$ is shifted to the side of the second lens unit $G_2$ and the distance between the principal points of the second and third lens units $G_2$ and $G_3$ can be diminished. This leads to a reduction of the overall lens length. In addition, when the third lens unit $G_3$ is constructed as described above, the magnification of the third lens unit $G_3$ can be increased, and thus the amount of movement of the third lens unit $G_3$ caused by the magnification change can be reduced. Since the negative power can be strengthened, chromatic aberration produced in the third lens unit $G_3$ can be favorably corrected. Consequently, the fluctuation of chromatic aberration due to the magnification change can be suppressed.

In the path bending optical system, the ratio of the focal length at the telephoto position to the focal length at the wide-angle position is 2.3. However, negative image distortion is produced at the wide-angle position and the ratio of the angle of view at the wide-angle position to the angle of view at the telephoto position is set to 2.5 to increase the magnification so that the image distortion is electronically corrected through an electronic correcting means, not shown.

In order to facilitate the design of the wide angle of view and high magnification, each of the second lens unit $G_2$ and the third lens unit $G_3$ is constructed as a retrofocus system. By adding the fourth lens unit $G_4$ with positive power to the optical system, the image-side telecentricity and focusing can be easily ensured.

The path bending optical system of the seventh embodiment is provided with seven aspherical surfaces: the entrance surface $P_1$ of the path bending prism P in the first lens unit $G_1$, the most object-side surface and the most image-side surface in the second lens unit $G_2$, the most object-side surface (the object-side surface of the single lens) and the most object-side surface and the most image-side surface of the cemented doublet in the third lens unit $G_3$, and the most image-side surface in the fourth lens unit $G_4$.

It is more desirable, in view of correction for aberration, that the image-side surface of the negative lens of the third lens unit $G_3$ has the aspherical function that the paraxial power is strengthened progressively in going from the optical axis to the periphery.

Figure 2:
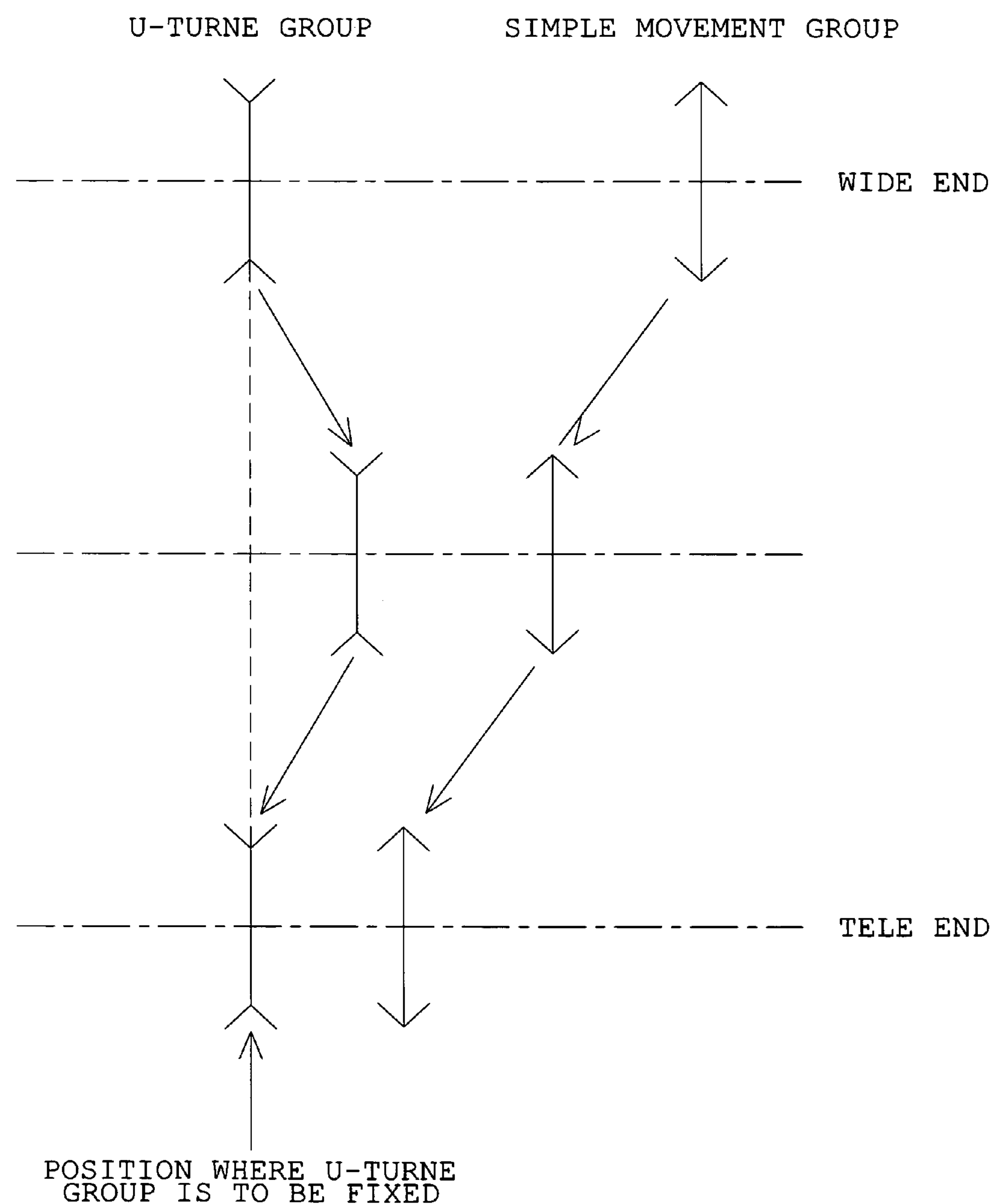
FIG. 2 is an explanatory view showing the positional relationship between a U-turn group and a simple movement group when the changeover from the wide-angle position to the telephoto position is made in one aspect of the path bending optical system of the present invention.

The seventh embodiment is designed so that favorable correction for aberration is made in the whole range from the wide-angle position to the telephoto position. Here, as shown in FIG. 2, the second lens unit $G_2$ may be fixed in the same location at the wide-angle and telephoto positions so that the third lens unit $G_3$ and fourth lens unit $G_4$ are moved to thereby bring about states of the wide-angle and telephoto positions. By doing so, the number of moving lens units is reduced and the mechanical mechanism is simplified. As a result, the optical system can be downsized. Since the optical system is used at the wide-angle and telephoto positions, the moving lens units may be moved by the manual operation to the wide-angle and telephoto positions. This is favorable because the actuator becomes unnecessary.

The second lens unit $G_2$ is located independently of the stop at the wide-angle position. It is desirable that such lenses are configures not into circles, but into rectangles, to make the lens unit light in weight because the load of the actuator is lessened.

Other features of the arrangement, function, and effect of the path bending optical system are almost the same as in the first embodiment.

Subsequently, numerical data of optical members constituting the path-bending optical system of the seventh embodiment are shown below.

Numerical Data 7

| Face number | Radius of curvature | Face-to-face spacing | Decentration | Refractive index | Abbe's number |
|---|---|---|---|---|---|
| Object surface | ∞ | ∞ | | | |
| 1 | Aspherical surface [1] | 3.50 | | 1.8061 | 40.9 |
| 2 | ∞ (reflecting surface) | 3.50 | Decentration (1) | 1.8061 | 40.9 |

-continued

| | | | | |
|---|---|---|---|---|
| 3 | ∞ | 0.85 | | |
| 4 | Aspherical surface [2] | 0.70 | 1.5225 | 59.8 |
| 5 | 7.15 | 1.12 | 1.7552 | 27.5 |
| 6 | Aspherical surface [3] | 7.24 | | |
| 7 | Stop surface | 0.00 | | |
| 8 | Aspherical surface [4] | 3.11 | 1.4875 | 70.2 |
| 9 | −16.84 | 0.10 | | |
| 10 | Aspherical surface [5] | 1.26 | 1.6204 | 60.3 |
| 11 | −5.19 | 0.79 | 1.6668 | 33.1 |
| 12 | Aspherical surface [6] | 4.06 | | |
| 13 | 11.96 | 1.17 | 1.4875 | 70.2 |
| 14 | Aspherical surface [7] | 0.85 | | |
| 15 | ∞ | 1.44 | 1.5477 | 62.8 |
| 16 | ∞ | 0.20 | | |
| 17 | ∞ | 0.60 | 1.5163 | 64.1 |
| 18 | ∞ | 0.50 | | |
| Image plane | ∞ | 0.00 | | |

Aspherical surface [1]

Radius of curvature 9.05
k = 0
A = $-1.0584 \times 10^{-3}$ B = $4.4786 \times 10^{-6}$ C = $1.7925 \times 10^{-7}$
D = $-7.6439 \times 10^{-9}$ Aspherical surface [2]

Radius of curvature −4.10
k = 0
A = $1.3994 \times 10^{-4}$ B = $8.8418 \times 10^{-5}$ C = $6.4611 \times 10^{-6}$ Aspherical surface [3]

Radius of curvature −48.26
k = 0
A = $6.1311 \times 10^{-4}$ B = $2.2561 \times 10^{-5}$ C = $1.5375 \times 10^{-6}$ Aspherical surface [4]

Radius of curvature 3.97
k = 0
A = $-4.3056 \times 10^{-4}$ B = $-2.4122 \times 10^{-5}$ C = $1.3567 \times 10^{-6}$ Aspherical surface [5]

Radius of curvature 6.81
k = 0
A = $-2.1140 \times 10^{-3}$ B = $-1.4321 \times 10^{-4}$ C = $-3.1103 \times 10^{-5}$ Aspherical surface [6]

Radius of curvature 5.46
k = 0
A = $1.7698 \times 10^{-3}$ B = $-7.4120 \times 10^{-5}$ C = $-4.2967 \times 10^{-6}$ Aspherical surface [7]

Radius of curvature −22.20
k = 0
A = $-5.3803 \times 10^{-4}$ B = $-1.3411 \times 10^{-5}$ C = $2.6546 \times 10^{-7}$ Decentration [1]

X = 0.00 Y = 0.00 Z = 0.00
α = −45.00 β = 0.00 γ = 0.00

Zoom data (in focusing of infinite object point)

| | WE | ST | TE |
|---|---|---|---|
| f (mm) | 3.3330 | 5.0871 | 7.7641 |
| FNO | 2.8000 | 3.4207 | 3.9293 |
| 2ω (°) | 76.9 | 46.9 | 30.2 |
| D3 | 0.85000 | 1.38531 | 0.85000 |
| D6 | 7.24461 | 3.68070 | 0.85000 |
| D12 | 4.06009 | 5.83130 | 4.34776 |
| D14 | 0.85000 | 2.10737 | 6.95693 |

Eighth Embodiment

Figure 10A:
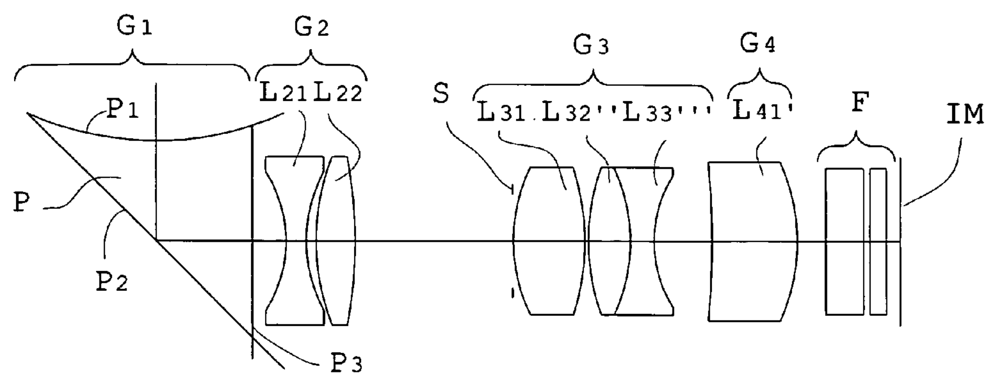
FIGS. 10A, 10B, and 10C are sectional views showing optical arrangements, developed along the optical axis, at wide-angle, middle, and telephoto positions, respectively, in focusing of an infinite object point, of an eighth embodiment of the path bending optical system according to the present invention.
Figure 10B:
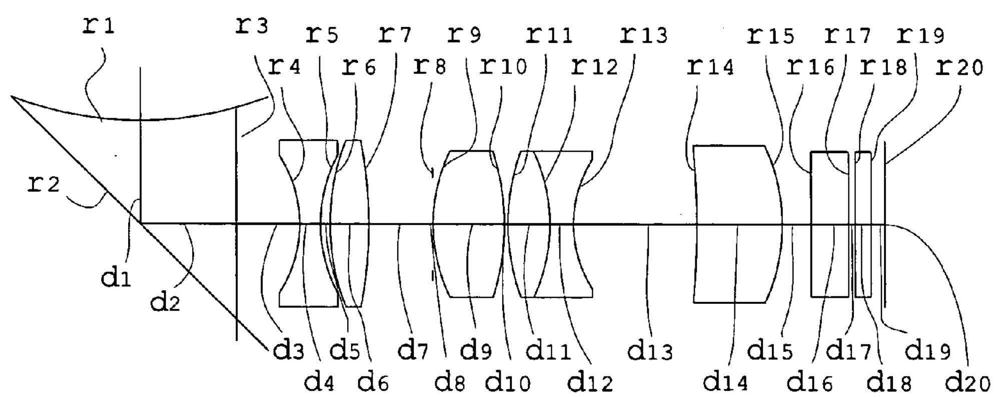
Figure 10C:
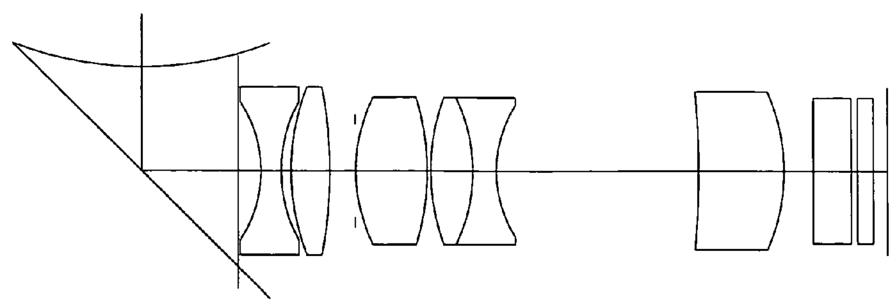

FIGS. 10A, 10B, and 10C show optical arrangements, developed along the optical axis, at wide-angle, middle, and telephoto positions, respectively, in focusing of an infinite object point, of the eighth embodiment of the path bending optical system according to the present invention.

The path bending optical system of the eighth embodiment includes, in order from the object side, the first lens unit $G_1$, the second lens unit $G_2$, the aperture stop S, the third lens unit $G_3$, and the fourth lens unit $G_4$. Also, in FIG. 10A, again reference symbol F represents plane-parallel plates such as a near-infrared cutoff filter, a low-pass filter, and the cover glass of a CCD which is the electronic image sensor, and IM represents an imaging surface.

The first lens unit $G_1$ is constructed with only the path bending prism P and has negative power as s whole. The path bending prism P includes the entrance surface $P_1$, the reflecting surface $P_2$ for bending the optical path, and the exit surface $P_3$. The entrance surface $P_1$ is configured as the curved surface with negative power which is rotationally symmetrical about the optical axis.

The second lens unit $G_2$ includes, in order from the object side, the biconcave lens $L_{21}$ and the biconvex lens $L_{22}'$, and has negative power as a whole.

The third lens unit $G_3$ includes, in order from the object side, the biconvex lens $L_{31}$ and the cemented doublet of the biconvex lens $L_{32}''$ and the biconcave lens $L_{33}'''$, and has positive power as a whole.

The fourth lens unit $G_4$ is constructed with a positive meniscus lens $L_{41}'$ with a concave surface facing the object side, and has positive power as a whole.

In the path bending optical system, when the magnification is changed in the range from the wide-angle position to the telephoto position, the first lens unit $G_1$ remains fixed. The second lens unit $G_2$, after being moved toward the image side, is moved so that it is U-turned to the original position on the object side. The third lens unit $G_3$ is moved toward the object side, together with the aperture stop S, while narrowing the spacing between the second lens unit $G_2$ and the third lens unit $G_3$. The fourth lens unit $G_4$ is slightly moved toward the object side while widening the spacing between the third lens unit $G_3$ and the fourth lens unit $G_4$.

As mentioned above, this path bending optical system is such that when the magnification is changed in the range from the wide-angle position to the telephoto position, the distance of movement of the fourth lens unit $G_4$ is not very long. This is favorable because the load of the actuator of the fourth lens unit $G_4$ is lessened.

In the path bending optical system, the ratio of the focal length at the telephoto position to the focal length at the wide-angle position is 2.2. However, negative image distortion is produced at the wide-angle position and the ratio of the angle of view at the wide-angle position to the angle of view at the telephoto position is set to 2.6 to increase the magnification so that the image distortion is electronically corrected through an electronic correcting means, not shown.

The path bending optical system of the eighth embodiment is provided with six aspherical surfaces: the entrance surface $P_1$ of the path bending prism P in the first lens unit $G_1$, the most object-side surface (the object-side surface of the biconcave lens) and the most image-side surface (the image-side surface of the biconvex lens) in the second lens unit $G_2$, the most object-side surface (the object-side surface of the single lens) and the most image-side surface (the image-side surface of the cemented doublet) in the third lens unit $G_3$, and the most image-side surface in the fourth lens unit $G_4$.

Other features of the arrangement, function, and effect of the path bending optical system are almost the same as in the first embodiment.

Subsequently, numerical data of optical members constituting the path-bending optical system of the eighth embodiment are shown below.

Numerical Data 8

| Face number | Radius of curvature | Face-to-face spacing | Decentration | Refractive index | Abbe's number |
|---|---|---|---|---|---|
| Object surface | ∞ | ∞ | | | |
| 1 | Aspherical surface [1] | 3.50 | | 1.8061 | 40.9 |
| 2 | ∞ (reflecting surface) | 3.50 | Decentration (1) | 1.8061 | 40.9 |
| 3 | ∞ | D3 | | | |
| 4 | Aspherical surface [2] | 0.85 | | 1.5317 | 48.8 |
| 5 | 5.19 | 0.20 | | | |
| 6 | 7.27 | 1.46 | | 1.7552 | 27.5 |
| 7 | Aspherical surface [3] | D7 | | | |
| 8 | Stop surface | 0.00 | | | |
| 9 | Aspherical surface [4] | 2.48 | | 1.6204 | 60.3 |
| 10 | −10.99 | 0.10 | | | |
| 11 | 7.19 | 1.49 | | 1.6204 | 60.3 |
| 12 | −6.76 | 0.85 | | 1.7552 | 27.5 |
| 13 | Aspherical surface [5] | D13 | | | |
| 14 | −27.68 | 3.12 | | 1.6204 | 60.3 |
| 15 | Aspherical surface [6] | D15 | | | |
| 16 | ∞ | 1.44 | | 1.5477 | 62.8 |
| 17 | ∞ | 0.20 | | | |
| 18 | ∞ | 0.60 | | 1.5163 | 64.1 |
| 19 | ∞ | 0.50 | | | |
| Image plane | ∞ | 0.00 | | | |

Aspherical surface [1]

Radius of curvature 10.45
k = 0
A = $-2.3347 \times 10^{-4}$ B = $1.3484 \times 10^{-7}$ C = $-1.6555 \times 10^{-7}$ Aspherical surface [2]

Radius of curvature −4.35
k = 0
A = $3.0497 \times 10^{-3}$ B = $-1.2895 \times 10^{-4}$ C = $3.7020 \times 10^{-6}$ Aspherical surface [3]

Radius of curvature −18.95
k = 0
A = $3.4589 \times 10^{-4}$ B = $-6.3116 \times 10^{-5}$ C = $-2.0139 \times 10^{-6}$ Aspherical surface [4]

Radius of curvature 5.13
k = 0
A = $-9.0134 \times 10^{-4}$ B = $-3.0104 \times 10^{-5}$ C = $2.6988 \times 10^{-7}$ Aspherical surface [5]

Radius of curvature 5.38
k = 0
A = $3.0206 \times 10^{-3}$ B = $9.5433 \times 10^{-5}$ C = $1.7108 \times 10^{-5}$ Aspherical surface [6]

Radius of curvature −5.66
k = 0
A = $1.5012 \times 10^{-3}$ B = $-5.2996 \times 10^{-5}$ C = $1.5048 \times 10^{-6}$ -continued Decentration [1]

| | | | | | |
|---|---|---|---|---|---|
| X = | 0.00 | Y = | 0.00 | Z = | 0.00 |
| α = | −45.00 | β = | 0.00 | γ = | 0.00 |

Zoom data (in focusing of infinite object point)

| | WE | ST | TE |
|---|---|---|---|
| f (mm) | 3.3330 | 4.9499 | 7.3516 |
| FNO | 2.8000 | 3.4853 | 4.3128 |
| 2ω (°) | 82.1 | 48.5 | 31.5 |
| D3 | 1.17677 | 2.15103 | 0.71190 |
| D7 | 5.62503 | 2.28536 | 0.85000 |
| D13 | 2.04722 | 4.39828 | 7.24757 |
| D15 | 0.85000 | 0.86436 | 0.88956 |

Ninth Embodiment

Figure 11A:
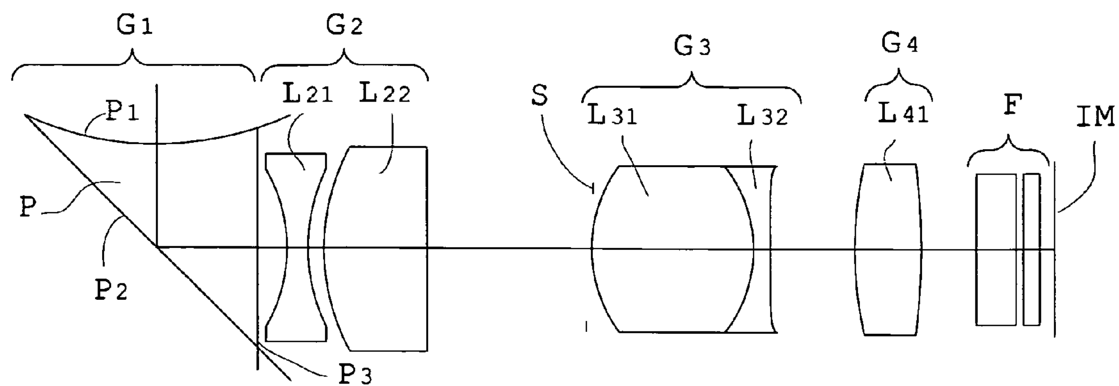
FIGS. 11A, 11B, and 11C are sectional views showing optical arrangements, developed along the optical axis, at wide-angle, middle, and telephoto positions, respectively, in focusing of an infinite object point, of a ninth embodiment of the path bending optical system according to the present invention.
Figure 11B:
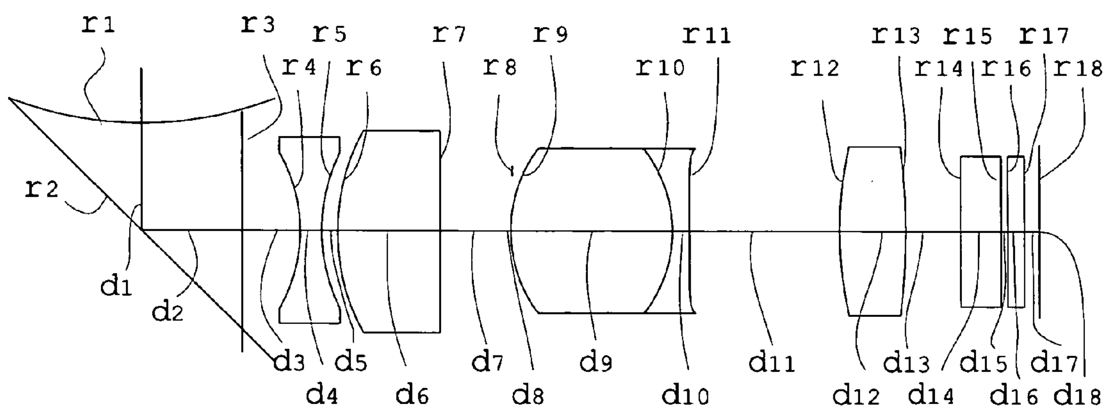
Figure 11C:
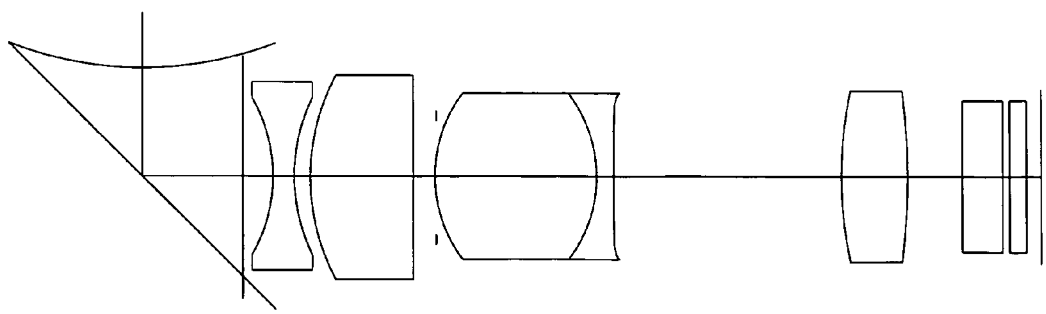

FIGS. 11A, 11B, and 11C show optical arrangements, developed along the optical axis, at wide-angle, middle, and telephoto positions, respectively, in focusing of an infinite object point, of the ninth embodiment of the path bending optical system according to the present invention.

The path bending optical system of the ninth embodiment includes, in order from the object side, the first lens unit $G_1$, the second lens unit $G_2$, the aperture stop S, the third lens unit $G_3$, and the fourth lens unit $G_4$. Also, in FIG. 11A, again reference symbol F represents plane-parallel plates such as a near-infrared cutoff filter, a low-pass filter, and the cover glass of a CCD which is the electronic image sensor, and IM represents an imaging surface.

The first lens unit $G_1$ is constructed with only the path bending prism P and has negative power as s whole. The path bending prism P includes the entrance surface $P_1$, the reflecting surface $P_2$ for bending the optical path, and the exit surface $P_3$. The entrance surface $P_1$ is configured as the curved surface with negative power which is rotationally symmetrical about the optical axis.

The second lens unit $G_2$ includes, in order from the object side, the biconcave lens $L_{21}$ and the convex lens $L_{22}'$, and has negative power as a whole.

The third lens unit $G_3$ is constructed with the cemented doublet including, in order from the object side, the biconvex lens $L_{31}$ and the negative lens $L_{32}$, and has positive power as a whole.

The fourth lens unit $G_4$ is constructed with the biconvex lens $L_{41}$ and has positive power as a whole.

In the path bending optical system, when the magnification is changed in the range from the wide-angle position to the telephoto position, the first lens unit $G_1$ remains fixed. The second lens unit $G_2$, after being moved toward the image side, is moved so that it is U-turned to the original position on the object side. The third lens unit $G_3$ is moved toward the object side, together with the aperture stop S, while narrowing the spacing between the second lens unit $G_2$ and the third lens unit $G_3$. The fourth lens unit $G_4$ remains fixed.

The path bending optical system is constructed by a pan-focus design, with a hyper-focal distance h in each of states (such as wide-angle, middle, and telephoto positions) as the position of the object point in each state. In this case, the distance of h/2 (the near point) from infinity (the far point) is within the depth of focus. The hyper-focal distance h can be expressed by $$\text{Hyper-focal distance } h = f^2/(FNO \times \delta')$$

Where f is a focal length, FNO is an F-number, and δ' is the diameter of allowable blurring.

In the path bending optical system, the ratio of the focal length at the telephoto position to the focal length at the wide-angle position is 1.8. However, negative image distortion is produced at the wide-angle position and the ratio of the angle of view at the wide-angle position to the angle of view at the telephoto position is set to 2.1 to increase the magnification so that the image distortion is electronically corrected through an electronic correcting means, not shown.

The path bending optical system of the eighth embodiment is provided with six aspherical surfaces: the entrance surface $P_1$ of the path bending prism P in the first lens unit $G_1$, the most object-side surface (the object-side surface of the biconcave lens) and the most image-side surface (the image-side surface of the convex lens) in the second lens unit $G_2$, the most object-side surface and the most image-side surface of the cemented doublet in the third lens unit $G_3$, and the most image-side surface in the fourth lens unit $G_4$.

Other features of the arrangement, function, and effect of the path bending optical system are almost the same as in the first embodiment.

Subsequently, numerical data of optical members consituting the path-bending optical system of the ninth embodiment are shown below.

Numerical Data 8

| Face number | Radius of curvature | Face-to-face spacing | Decentration | Refractive index | Abbe's number |
|---|---|---|---|---|---|
| Object surface | ∞ | 793.00 | | | |
| 1 | Aspherical surface [1] | 3.50 | | 1.8061 | 40.9 |
| 2 | ∞ (reflecting surface) | 3.50 | Decentration (1) | 1.8061 | 40.9 |
| 3 | ∞ | D3 | | | |
| 4 | Aspherical surface [2] | 0.70 | | 1.5481 | 45.8 |
| 5 | 4.88 | 0.66 | | | |
| 6 | 6.35 | 3.46 | | 1.7552 | 27.5 |
| 7 | Aspherical surface [3] | D7 | | | |
| 8 | Stop surface | 0.00 | | | |
| 9 | Aspherical surface [4] | 5.50 | | 1.6204 | 60.3 |
| 10 | −3.80 | 0.70 | | 1.7552 | 27.5 |
| 11 | Aspherical surface [5] | D11 | | | |
| 12 | 14.14 | 2.31 | | 1.4875 | 70.2 |
| 13 | Aspherical surface [6] | 1.72 | | | |
| 14 | ∞ | 1.44 | | 1.5477 | 62.8 |
| 15 | ∞ | 0.20 | | | |
| 16 | ∞ | 0.60 | | 1.5163 | 64.1 |
| 17 | ∞ | 0.50 | | | |
| Image plane | ∞ | 0.00 | | | |

Aspherical surface [1]

Radius of curvature 9.24
k = 0
A = $-5.1925 \times 10^{-4}$ B = $8.6387 \times 10^{-6}$ C = $-1.9647 \times 10^{-7}$
D = $1.1057 \times 10^{-9}$ Aspherical surface [2]

Radius of curvature −6.42
k = 0
A = $1.3671 \times 10^{-3}$ B = $8.1771 \times 10^{-5}$ C = $-3.6217 \times 10^{-6}$ -continued Aspherical surface [3]

Radius of curvature −197.62
k = 0
A = $4.3065 \times 10^{-4}$ B = $2.6013 \times 10^{-5}$ C = $-2.0824 \times 10^{-6}$ Aspherical surface [4]

Radius of curvature 4.66
k = 0
A = $-4.1184 \times 10^{-4}$ B = $1.1206 \times 10^{-5}$ C = $-4.1289 \times 10^{-7}$ Aspherical surface [5]

Radius of curvature −28.86
k = 0
A = $2.1294 \times 10^{-3}$ B = $8.6703 \times 10^{-5}$ C = $1.0081 \times 10^{-5}$ Aspherical surface [6]

Radius of curvature −18.38
k = 0
A = $-6.2678 \times 10^{-4}$ B = $-3.8823 \times 10^{-5}$ C = $1.1370 \times 10^{-6}$ Decentration [1]

X = 0.00 Y = 0.00 Z = 0.00
α = −45.00 β = 0.00 γ = 0.00

Zoom data (in focusing of infinite object point)

| | WE | ST | TE |
|---|---|---|---|
| f (mm) | 3.3330 | 4.5076 | 6.0963 |
| FNO | 2.7978 | 3.2800 | 3.8098 |
| 2ω (°) | 83.2 | 55.5 | 39.6 |
| D3 | 0.85000 | 1.85271 | 0.85000 |
| D7 | 5.68455 | 2.37694 | 0.85000 |
| D11 | 2.66687 | 4.97177 | 7.50142 |

Tenth Embodiment

Figure 12A:
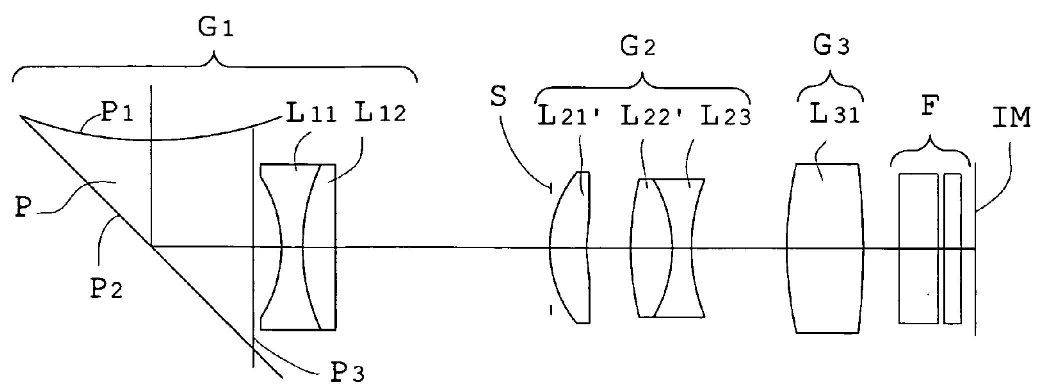
FIGS. 12A, 12B, and 12C are sectional views showing optical arrangements, developed along the optical axis, at wide-angle, middle, and telephoto positions, respectively, in focusing of an infinite object point, of a tenth embodiment of the path bending optical system according to the present invention.
Figure 12B:
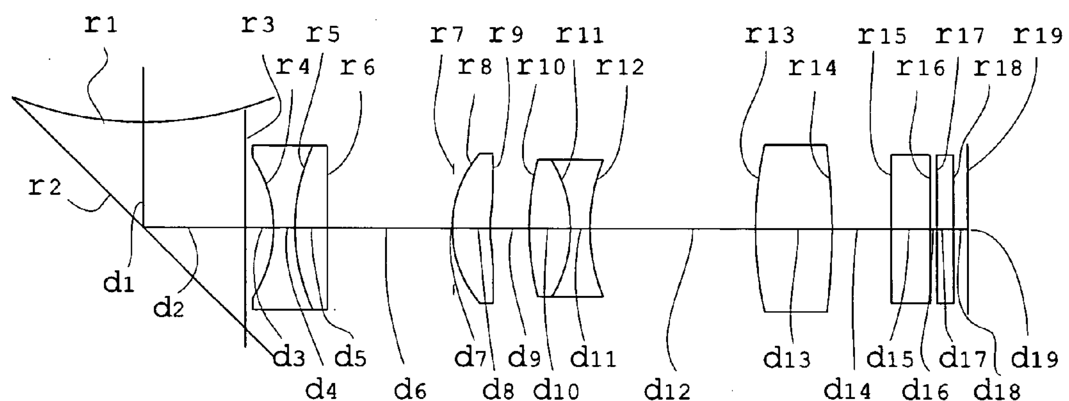
Figure 12C:
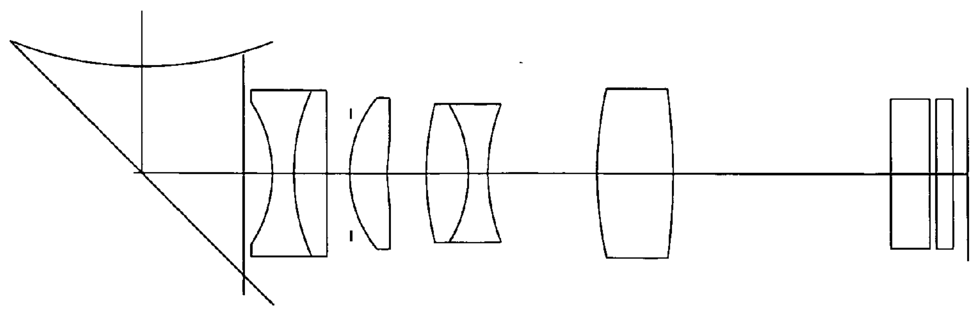

FIGS. 12A, 12B, and 12C show optical arrangements, developed along the optical axis, at wide-angle, middle, and telephoto positions, respectively, in focusing of an infinite object point, of the tenth embodiment of the path bending optical system according to the present invention.

The path bending optical system of the tenth embodiment includes, in order from the object side, the first lens unit $G_1$, the second lens unit $G_2$, the aperture stop S, and the third lens unit $G_3$. Also, in FIG. 12A, again reference symbol F represents plane-parallel plates such as a near-infrared cutoff filter, a low-pass filter, and the cover glass of a CCD which is the electronic image sensor, and IM represents an imaging surface.

The first lens unit $G_1$ includes, in order from the object side, the path bending prism P and a cemented doublet of a biconcave lens $L_{11}$ and a biconvex lens $L_{12}$, and has negative power as s whole. The path bending prism P has the entrance surface $P_1$, the reflecting surface $P_2$ for bending the optical path, and the exit surface $P_3$. The entrance surface $P_1$ is configured as the curved surface with negative power which is rotationally symmetrical about the optical axis.

The second lens unit $G_2$ includes, in order from the object side, a positive meniscus lens $L_{21}'$ with a convex surface facing the object side and a cemented doublet of the biconvex lens $L_{22}'$ and a biconcave lens $L_{23}$, and has negative power as a whole.

The third lens unit $G_3$ is constructed with the biconvex lens $L_{31}$ and has positive power as a whole.

In this path bending optical system, an arrangement is made for three lens units with negative, positive, and positive powers in such a way that the second lens unit with negative power in the arrangement of four lens units with negative, negative, positive, and positive powers is fixed in the magnification change and constitutes one lens unit, together with the path bending prism P.

In the path bending optical system, when the magnification is changed in the range from the wide-angle position to the telephoto position, the first lens unit $G_1$ remains fixed. The second lens unit $G_2$ is moved, together with the aperture stop S, toward the object side. The third lens unit $G_3$, after widening once spacing between the second lens unit $G_2$ and the third lens unit $G_3$, is moved toward the object side, while narrowing the spacing.

Third lens unit G3 is such as to perform focusing.

In the path bending optical system, the ratio of the focal length at the telephoto position to the focal length at the wide-angle position is 2.3. However, negative image distortion is produced at the wide-angle position and the ratio of the angle of view at the wide-angle position to the angle of view at the telephoto position is set to 2.5 to increase the magnification so that the image distortion is electronically corrected through an electronic correcting means, not shown.

The path bending optical system of the tenth embodiment is provided with seven aspherical surfaces: the entrance surface $P_1$ of the path bending prism P and the most object-side surface and the most image-side surface of the cemented doublet in the first lens unit $G_1$, the most object-side surface (the object-side surface of the single lens) and the most object-side surface and the most image-side surface of the cemented doublet in the second lens unit $G_2$, and the most object-side surface (the object-side surface of the single lens) and the object-side surface in the third lens unit $G_3$.

Subsequently, numerical data of optical members constituting the path-bending optical system of the tenth embodiment are shown below.

Numerical Data 10

| Face number | Radius of curvature | Face-to-face spacing | Decentration | Refractive index | Abbe's number |
|---|---|---|---|---|---|
| Object surface | ∞ | ∞ | | | |
| 1 | Aspherical surface [1] | 3.50 | | 1.8061 | 40.9 |
| 2 | ∞ (reflecting surface) | 3.50 | Decentration (1) | 1.8061 | 40.9 |
| 3 | ∞ | 0.85 | | | |
| 4 | Aspherical surface [2] | 0.70 | | 1.4875 | 70.2 |
| 5 | 8.18 | 1.05 | | 1.7552 | 27.5 |
| 6 | Aspherical surface [3] | 7.30 | | | |
| 7 | Stop surface | 0.00 | | | |
| 8 | Aspherical surface [4] | 1.24 | | 1.4875 | 70.2 |
| 9 | 153.51 | 1.39 | | | |
| 10 | Aspherical surface [5] | 1.35 | | 1.6204 | 60.3 |
| 11 | −4.54 | 0.70 | | 1.6477 | 33.8 |
| 12 | Aspherical surface [6] | 3.15 | | | |
| 13 | 13.19 | 2.55 | | 1.4875 | 70.2 |
| 14 | Aspherical surface [7] | 1.00 | | | |
| 15 | ∞ | 1.44 | | 1.5477 | 62.8 |
| 16 | ∞ | 0.20 | | | |
| 17 | ∞ | 0.60 | | 1.5163 | 64.1 |
| 18 | ∞ | 0.50 | | | |

-continued

| | | |
|---|---|---|
| Image plane | ∞ | 0.00 |

Aspherical surface [1]

Radius of curvature 8.74
k = 0
A = $-1.1766 \times 10^{-3}$ B = $4.8617 \times 10^{-6}$ C = $3.3372 \times 10^{-7}$
D = $-1.2244 \times 10^{-8}$ Aspherical surface [2]

Radius of curvature −4.36
k = 0
A = $-1.0748 \times 10^{-3}$ B = $7.6963 \times 10^{-5}$ C = $8.2193 \times 10^{-6}$ Aspherical surface [3]

Radius of curvature −120.52
k = 0
A = $1.5654 \times 10^{-4}$ B = $3.2747 \times 10^{-5}$ C = $1.9473 \times 10^{-6}$ Aspherical surface [4]

Radius of curvature 3.93
k = 0
A = $1.8044 \times 10^{-4}$ B = $-1.7714 \times 10^{-5}$ C = $3.8209 \times 10^{-6}$ Aspherical surface [5]

Radius of curvature 5.74
k = 0
A = $-2.6367 \times 10^{-3}$ B = $-1.8042 \times 10^{-4}$ C = $-4.7846 \times 10^{-5}$ Aspherical surface [6]

Radius of curvature 5.83
k = 0
A = $2.0298 \times 10^{-3}$ B = $-1.9021 \times 10^{-4}$ C = $-1.3554 \times 10^{-5}$ Aspherical surface [7]

Radius of curvature −17.08
k = 0
A = $-4.1699 \times 10^{-4}$ B = $-1.0364 \times 10^{-5}$ C = $-3.3037 \times 10^{-9}$ Decentration [1]

| | | | | | |
|---|---|---|---|---|---|
| X = | 0.00 | Y = | 0.00 | Z = | 0.00 |
| α = | −45.00 | β = | 0.00 | γ = | 0.00 |

Zoom data (in focusing of infinite object point)

| | WE | ST | TE |
|---|---|---|---|
| f (mm) | 3.3330 | 5.0941 | 7.7859 |
| FNO | 2.8000 | 3.4517 | 3.9352 |
| 2ω (°) | 76.3 | 46.9 | 30.0 |
| D6 | 7.29784 | 4.16653 | 0.85000 |
| D12 | 3.14566 | 5.54896 | 3.56699 |
| D14 | 1.00104 | 1.72905 | 7.02754 |

Eleventh Embodiment

Figure 13A:
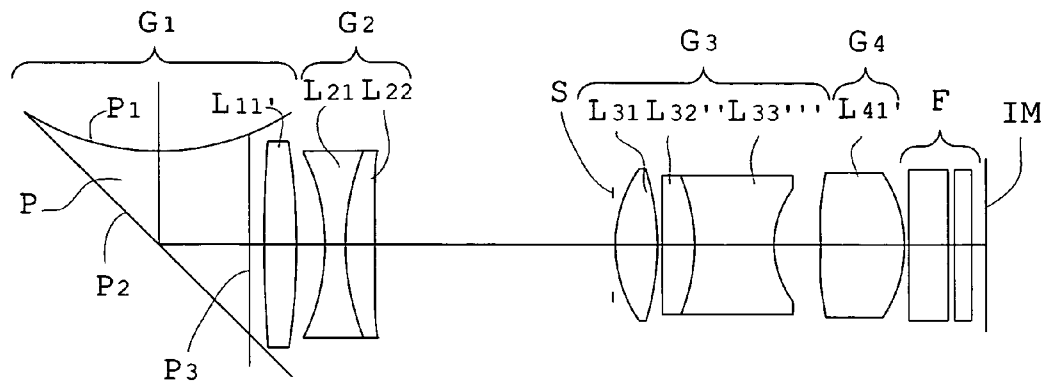
FIGS. 13A, 13B, and 13C are sectional views showing optical arrangements, developed along the optical axis, at wide-angle, middle, and telephoto positions, respectively, in focusing of an infinite object point, of an eleventh embodiment of the path bending optical system according to the present invention.
Figure 13B:
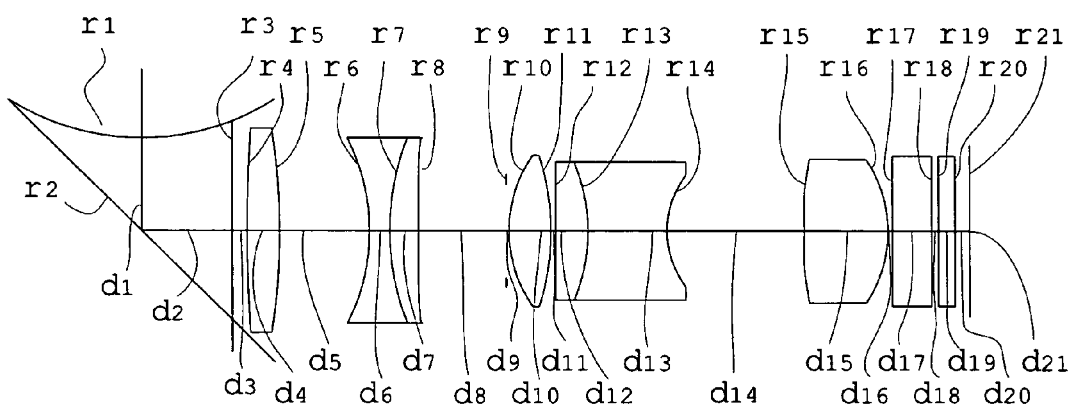
Figure 13C:
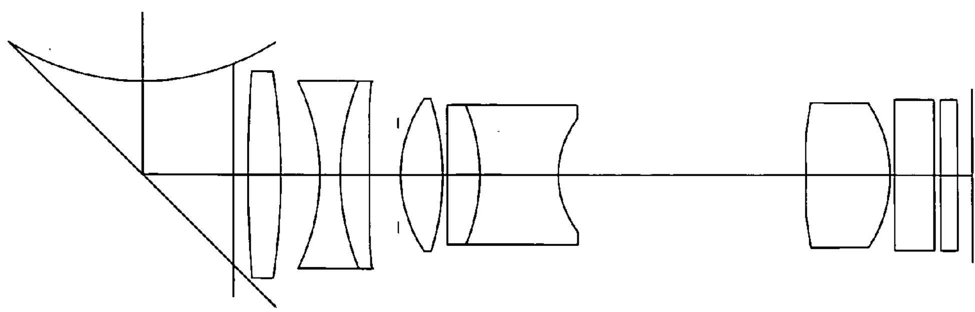

FIGS. 13A, 13B, and 13C show optical arrangements, developed along the optical axis, at wide-angle, middle, and telephoto positions, respectively, in focusing of an infinite object point, of the eleventh embodiment of the path bending optical system according to the present invention.

The path bending optical system of the eleventh embodiment includes, in order from the object side, the first lens unit $G_1$, the second lens unit $G_2$, the aperture stop S, the third lens unit $G_3$, and the fourth lens unit $G_4$. Also, in FIG. 13A, again reference symbol F represents plane-parallel plates such as a near-infrared cutoff filter, a low-pass filter, and the cover glass of a CCD which is the electronic image sensor, and IM represents an imaging surface.

The first lens unit $G_1$ includes, in order from the object side, the path bending prism P and a biconvex lens $L_{11}'$, and has negative power as s whole. The path bending prism P has the entrance surface $P_1$, the reflecting surface $P_2$ for bending the optical path, and the exit surface $P_3$. The entrance surface $P_1$ is configured as the curved surface with negative power which is rotationally symmetrical about the optical axis.

The second lens unit $G_2$ is constructed with a cemented doublet including, in order from the object side, the biconcave lens $L_{21}$ and the positive meniscus lens $L_{22}$ with a convex surface facing the object side, and has negative power as a whole.

The third lens unit $G_3$ includes, in order from the object side, the biconvex lens $L_{31}$ and the cemented doublet of the biconvex lens $L_{32}$" and the biconcave lens $L_{33}$'", and has positive power as a whole.

The fourth lens unit $G_4$ is constructed with the positive meniscus lens $L_{41}$' with a concave surface facing the object side.

In the path bending optical system, when the magnification is changed in the range from the wide-angle position to the telephoto position, the first lens unit $G_1$ remains fixed. The second lens unit $G_2$, after being moved toward the image side, is returned to a position different from the original position on the object side. The third lens unit $G_3$ is moved toward the object side, together with the aperture stop S, while narrowing the spacing between the second lens unit $G_2$ and the third lens unit $G_3$. The fourth lens unit $G_4$ remains fixed, together with the filters F. The second lens unit G2 is such as to perform focusing.

In the path bending optical system, the ratio of the focal length at the telephoto position to the focal length at the wide-angle position is 2.7. However, negative image distortion is produced at the wide-angle position and the ratio of the angle of view at the wide-angle position to the angle of view at the telephoto position is set to 3.0 to increase the magnification so that the image distortion is electronically corrected through an electronic correcting means, not shown.

The path bending optical system of the eleventh embodiment is provided with eleven aspherical surfaces: the entrance surface $P_1$ of the path bending prism P and both surfaces of the positive lens in the first lens unit $G_1$, the object-side surface and the image-side surface of the cemented doublet in the second lens unit $G_2$, both surface of the positive lens and the object-side surface and the image-side surface of the cemented doublet in the third lens unit $G_3$, and both surfaces of the positive lens in the fourth lens unit $G_4$.

Subsequently, numerical data of optical members constituting the path-bending optical system of the eleventh embodiment are shown below.

Numerical Data 11

| Face number | Radius of curvature | Face-to-face spacing | Decentration | Refractive index | Abbe's number |
|---|---|---|---|---|---|
| Object surface | ∞ | 793.00 | | | |
| 1 | Aspherical surface [1] | 3.50 | | 1.8061 | 40.9 |
| 2 | ∞ (reflecting surface) | 3.50 | Decentration (1) | 1.8061 | 40.9 |
| 3 | ∞ | 0.47 | | | |
| 4 | Aspherical surface [2] | 1.20 | | 1.7620 | 40.1 |
| 5 | Aspherical surface [3] | 1.13 | | | |
| 6 | Aspherical surface [4] | 0.85 | | 1.4875 | 70.2 |
| 7 | 12.24 | 1.18 | | 1.7552 | 27.5 |
| 8 | Aspherical surface [5] | 8.76 | | | |
| 9 | Stop surface | 0.10 | | | |
| 10 | Aspherical surface [6] | 1.68 | | 1.6204 | 60.3 |
| 11 | Aspherical surface [7] | 0.10 | | | |
| 12 | Aspherical surface [8] | 1.30 | | 1.7440 | 44.8 |
| 13 | −6.12 | 2.90 | | 1.7215 | 29.2 |
| 14 | Aspherical surface [9] | 1.30 | | | |
| 15 | Aspherical surface [10] | 3.01 | | 1.4875 | 70.2 |
| 16 | Aspherical surface [11] | 0.11 | | | |
| 17 | ∞ | 1.44 | | 1.5477 | 62.8 |
| 18 | ∞ | 0.20 | | | |
| 19 | ∞ | 0.60 | | 1.5163 | 64.1 |
| 20 | ∞ | 0.50 | | | |
| Image plane | ∞ | 0.00 | | | |

Aspherical surface [1]

Radius of curvature 6.28
k = 0
A = $-1.5287 \times 10^{-3}$ B = $1.2472 \times 10^{-5}$ C = $-5.4883 \times 10^{-7}$ Aspherical surface [2]

Radius of curvature 38.81
k = 0
A = $-8.1458 \times 10^{-4}$ B = $2.3177 \times 10^{-5}$ C = $1.6322 \times 10^{-6}$ Aspherical surface [3]

Radius of curvature −20.94
k = 0
A = $-4.7517 \times 10^{-4}$ B = $2.2207 \times 10^{-5}$ C = $1.8789 \times 10^{-6}$ Aspherical surface [4]

Radius of curvature −7.08
k = 0
A = $3.1788 \times 10^{-4}$ B = $-1.0775 \times 10^{-5}$ C = $-5.5304 \times 10^{-8}$ Aspherical surface [5]

Radius of curvature 169.86
k = 0
A = $1.8445 \times 10^{-4}$ B = $-1.5848 \times 10^{-5}$ C = $1.3933 \times 10^{-6}$ Aspherical surface [6]

Radius of curvature 5.05
k = 0
A = $-4.6799 \times 10^{-4}$ B = $-7.1673 \times 10^{-6}$ C = $4.9509 \times 10^{-6}$ Aspherical surface [7]

Radius of curvature −8.69
k = 0
A = $1.6257 \times 10^{-3}$ B = $7.1053 \times 10^{-6}$ C = $-8.9714 \times 10^{-6}$ Aspherical surface [8]

Radius of curvature 34.00
k = 0
A = $-6.0984 \times 10^{-4}$ B = $6.3349 \times 10^{-5}$ C = $-2.5095 \times 10^{-5}$ Aspherical surface [9]

Radius of curvature 3.67
k = 0
A = $-4.0945 \times 10^{-4}$ B = $2.3153 \times 10^{-4}$ C = $-1.8233 \times 10^{-5}$ Aspherical surface [10]

Radius of curvature −73.57
k = 0
A = $-1.8969 \times 10^{-3}$ B = $4.6283 \times 10^{-4}$ C = $2.0204 \times 10^{-6}$ Aspherical surface [11]

Radius of curvature −3.20
k = 0
A = $1.0353 \times 10^{-2}$ B = $-2.0638 \times 10^{-4}$ C = $7.7290 \times 10^{-5}$ -continued

| Decentration [1] | | | | | |
|---|---|---|---|---|---|
| X = | 0.00 | Y = | 0.00 | Z = | 0.00 |
| α = | −45.00 | β = | 0.00 | γ = | 0.00 |

Zoom data (in focusing of infinite object point)

| | WE | ST | TE |
|---|---|---|---|
| f(mm) | 3.3330 | 5.7422 | 9.0614 |
| FNO | 2.8000 | 3.7473 | 5.1198 |
| 2ω (°) | 69.6 | 36.9 | 23.2 |
| D5 | 1.13294 | 3.42982 | 1.57338 |
| D8 | 8.76455 | 3.08141 | 0.85000 |
| D14 | 1.29551 | 4.68177 | 8.76961 |

Twelfth Embodiment

Figure 14A:
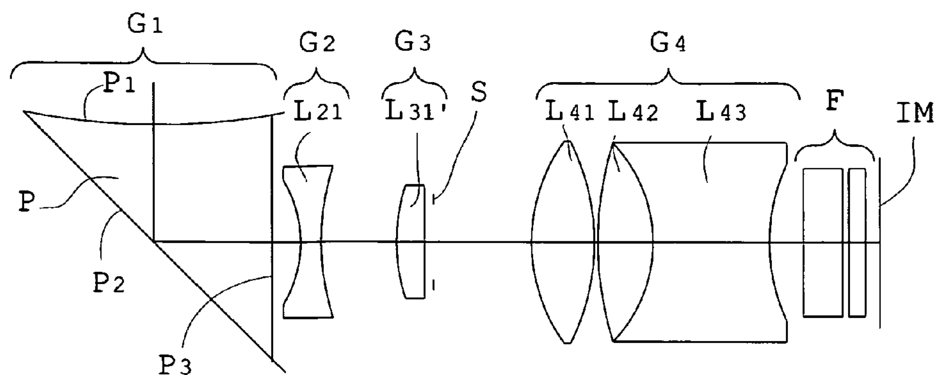
FIGS. 14A, 14B, and 14C are sectional views showing optical arrangements, developed along the optical axis, at wide-angle, middle, and telephoto positions, respectively, in focusing of an infinite object point, of a twelfth embodiment of the path bending optical system according to the present invention.
Figure 14B:
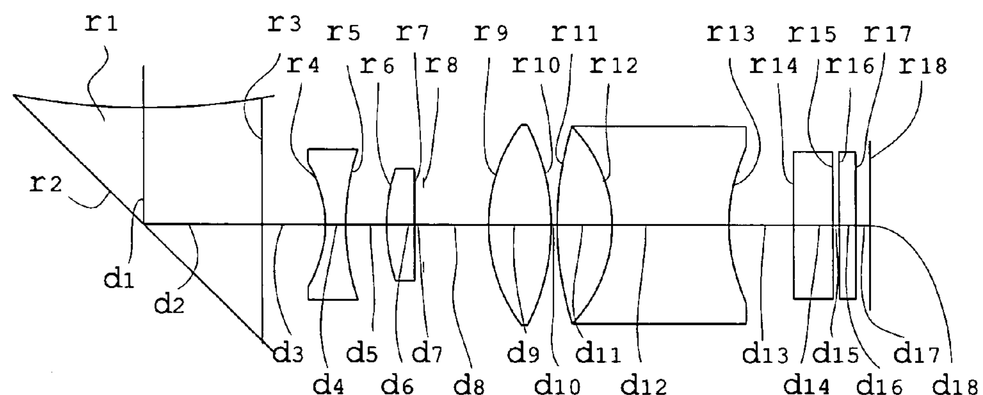
Figure 14C:
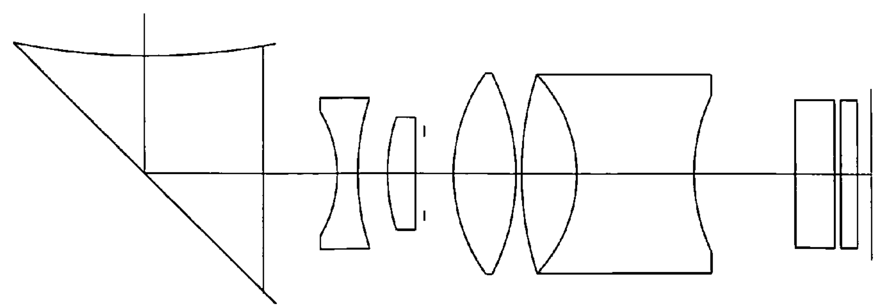

FIGS. 14A, 14B, and 14C show optical arrangements, developed along the optical axis, at wide-angle, middle, and telephoto positions, respectively, in focusing of an infinite object point, of the twelfth embodiment of the path bending optical system according to the present invention.

The path bending optical system of the twelfth embodiment includes, in order from the object side, the first lens unit $G_1$, the second lens unit $G_2$, the aperture stop S, the third lens unit $G_3$, and the fourth lens unit $G_4$. Also, in FIG. 14A, again reference symbol F represents plane-parallel plates such as a near-infrared cutoff filter, a low-pass filter, and the cover glass of a CCD which is the electronic image sensor, and IM represents an imaging surface.

The first lens unit $G_1$ is constructed with only the path bending prism P and has negative power as s whole. The path bending prism P has the entrance surface $P_1$, the reflecting surface $P_2$ for bending the optical path, and the exit surface $P_3$. The entrance surface $P_1$ is configured as the curved surface with negative power which is rotationally symmetrical about the optical axis.

The second lens unit $G_2$ is constructed with the biconcave lens $L_{21}$ and has negative power as a whole.

The third lens unit $G_3$ is constructed with a biconvex lens $L_{31}'$ with a convex surface facing the object side, and has positive power as a whole.

The fourth lens unit $G_4$ includes, in order from the object side, the biconvex lens $L_{41}$ and a cemented doublet of a biconvex lens $L_{42}$ and a biconcave lens $L_{43}$, and has positive power as a whole.

In the path bending optical system, when the magnification is changed in the range from the wide-angle position to the telephoto position, the first lens unit $G_1$ remains fixed. The second lens unit $G_2$ is moved toward the image side. The third lens unit $G_3$ remained fixed, together with the aperture stop S. The fourth lens unit $G_4$ is moved toward the object side.

In the path bending optical system, the ratio of the focal length at the telephoto position to the focal length at the wide-angle position is 1.7. However, negative image distortion is produced at the wide-angle position and the ratio of the angle of view at the wide-angle position to the angle of view at the telephoto position is set to 1.9 to increase the magnification so that the image distortion is electronically corrected through an electronic correcting means, not shown.

The path bending optical system of the twelfth embodiment is provided with five aspherical surfaces: the entrance surface $P_1$ of the path bending prism P in the first lens unit $G_1$, the object-side surface of the negative lens in the second lens unit $G_2$, the image-side surface of the positive lens in the third lens unit $G_3$, and the most object-side surface (the object-side surface of the positive lens) and the image-side of the cemented doublet in the fourth lens unit $G_4$.

Subsequently, numerical data of optical members constituting the path-bending optical system of the twelfth embodiment are shown below.

Numerical Data 12

| Face number | Radius of curvature | Face-to-face spacing | Decentration | Refractive index | Abbe's number |
|---|---|---|---|---|---|
| Object surface | ∞ | 793.00 | | | |
| 1 | Aspherical surface [1] | 3.50 | | 1.8061 | 40.9 |
| 2 | ∞ (reflecting surface) | 3.50 | Decentration (1) | 1.8061 | 40.9 |
| 3 | ∞ | D3 | | | |
| 4 | Aspherical surface [2] | 0.70 | | 1.4875 | 70.2 |
| 5 | 9.93 | D5 | | | |
| 6 | 8.01 | 0.79 | | 1.7552 | 27.5 |
| 7 | Aspherical surface [3] | 0.25 | | | |
| 8 | Stop surface | D8 | | | |
| 9 | Aspherical surface [4] | 1.89 | | 1.4875 | 70.2 |
| 10 | −6.73 | 0.10 | | | |
| 11 | 9.09 | 1.75 | | 1.6204 | 60.3 |
| 12 | −4.35 | 3.47 | | 1.7552 | 27.5 |
| 13 | Aspherical surface [5] | D13 | | | |
| 14 | ∞ | 1.44 | | 1.5477 | 62.8 |
| 15 | ∞ | 0.20 | | | |
| 16 | ∞ | 0.60 | | 1.5163 | 64.1 |
| 17 | ∞ | 0.50 | | | |
| Image plane | ∞ | 0.00 | | | |

Aspherical surface [1]

Radius of curvature 18.07

| | | | | | |
|---|---|---|---|---|---|
| k = | 0 | | | | |
| A = | $-1.7242 \times 10^{-4}$ | B = | $-2.8354 \times 10^{-6}$ | C = | $1.4378 \times 10^{-7}$ |
| D = | $-3.2083 \times 10^{-9}$ | | | | |

Aspherical surface [2]

Radius of curvature −4.27

| | | | | | |
|---|---|---|---|---|---|
| k = | 0 | | | | |
| A = | $1.8964 \times 10^{-3}$ | B = | $-3.5849 \times 10^{-5}$ | C = | $1.9017 \times 10^{-5}$ |

Aspherical surface [3]

Radius of curvature 48.23

| | | | | | |
|---|---|---|---|---|---|
| k = | 0 | | | | |
| A = | $7.1223 \times 10^{-4}$ | B = | $1.4077 \times 10^{-4}$ | C = | $-2.3581 \times 10^{-5}$ |

Aspherical surface [4]

Radius of curvature 4.77

| | | | | | |
|---|---|---|---|---|---|
| k = | 0 | | | | |
| A = | $-2.2441 \times 10^{-3}$ | B = | $2.7904 \times 10^{-5}$ | C = | $-3.6935 \times 10^{-6}$ |

Aspherical surface [5]

Radius of curvature 9.44

| | | | | | |
|---|---|---|---|---|---|
| k = | 0 | | | | |
| A = | $3.7428 \times 10^{-3}$ | B = | $2.6500 \times 10^{-4}$ | C = | $-6.5423 \times 10^{-6}$ |

| Decentration [1] | | | | | |
|---|---|---|---|---|---|
| x = | 0.00 | Y = | 0.00 | z = | 0.00 |
| a = | −45.00 | B = | 0.00 | y = | 0.00 |

Zoom data (in focusing of infinite object point)

-continued

| | WE | ST | TE |
|---|---|---|---|
| f(mm) | 3.3330 | 4.3319 | 5.6306 |
| FNO | 2.7962 | 3.3153 | 4.1024 |
| 2ω (°) | 77.9 | 55.0 | 41.0 |
| D3 | 0.85000 | 1.82902 | 2.28639 |
| D5 | 2.34353 | 1.36450 | 0.90714 |
| D8 | 3.03923 | 2.00769 | 0.85000 |
| D13 | 0.85000 | 1.88154 | 3.03923 |

Thirteenth Embodiment

Figure 15A:
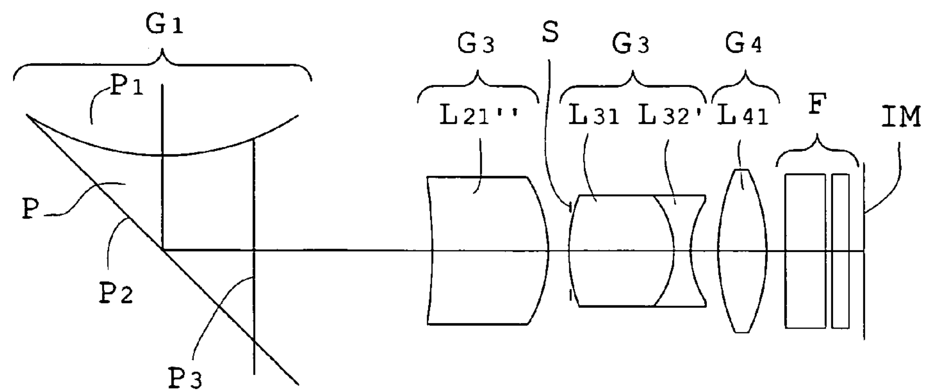
FIGS. 15A, 15B, and 15C are sectional views showing optical arrangements, developed along the optical axis, at wide-angle, middle, and telephoto positions, respectively, in focusing of an infinite object point, of a thirteenth embodiment of the path bending optical system according to the present invention.
Figure 15B:
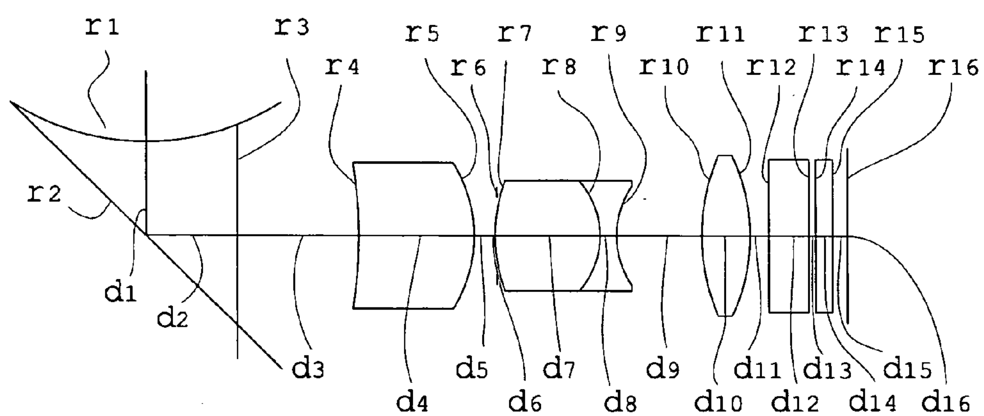
Figure 15C:
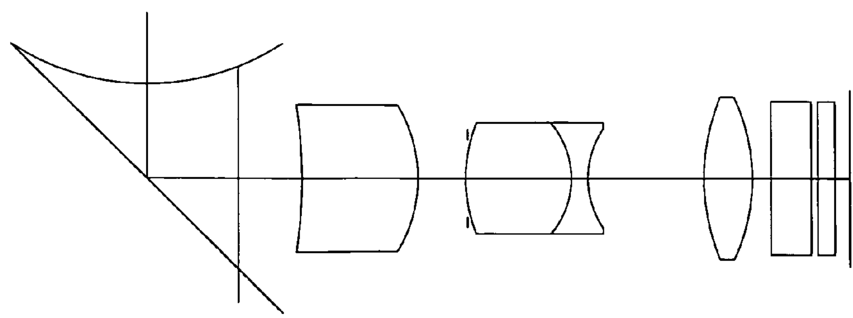

FIGS. 15A, 15B, and 15C show optical arrangements, developed along the optical axis, at wide-angle, middle, and telephoto positions, respectively, in focusing of an infinite object point, of the thirteenth embodiment of the path bending optical system according to the present invention.

The path bending optical system of the thirteenth embodiment includes, in order from the object side, the first lens unit $G_1$, the second lens unit $G_2$, the aperture stop S, the third lens unit $G_3$, and the fourth lens unit $G_4$. Also, in FIG. 15A, again reference symbol F represents plane-parallel plates such as a near-infrared cutoff filter, a low-pass filter, and the cover glass of a CCD which is the electronic image sensor, and IM represents an imaging surface.

The first lens unit $G_1$ is constructed with only the path bending prism P and has negative power as s whole. The path bending prism P has the entrance surface $P_1$, the reflecting surface $P_2$ for bending the optical path, and the exit surface $P_3$. The entrance surface $P_1$ is configured as the curved surface with negative power which is rotationally symmetrical about the optical axis.

The second lens unit $G_2$ is constructed with a convex lens $L_{21}$" and has positive power as a whole.

The third lens unit $G_3$ is constructed with a cemented doublet including, in order from the object side, the biconvex lens $L_{31}$ and the biconcave lens $L_{32}$', and has negative power as a whole.

The fourth lens unit $G_4$ is constructed with the biconvex lens $L_{41}$ and has positive power as a whole.

In this path bending optical system, when the magnification is changed in the range from the wide-angle position to the telephoto position, the first lens unit $G_1$ remains fixed. The second lens unit $G_2$ is moved toward the object side. The third lens unit $G_3$ is moved toward the object side, together with the aperture stop S, while widening the spacing between the second lens unit $G_2$ and the third lens unit $G_3$. The fourth lens unit $G_4$ remains fixed, together with the filters F. In the path bending optical system, the first lens unit $G_1$ has the negative power. Hence, the image point of the first lens unit $G_1$ (namely, the object point of the second lens unit $G_2$) is formed at a position appreciably shifted from the second lens unit $G_2$ toward the object side. In order to reduce the overall lens length, it is necessary to shorten the combined focal length of the second and third lens units $G_2$ and $G_3$. On the other hand, in order to ensure the range of movement of the second and third lens units $G_2$ and $G_3$ due to the magnification change, the spacing between the first and second lens units $G_1$ and $G_2$ must be ensured to some degree. Consequently, it becomes difficult that a reduction in the overall lens length (a reduction in the focal length of the second and third lens units $G_2$ and $G_3$) is compatible with the acquirement of spacing for zooming. However, when the second lens unit $G_2$ has the positive power and the third lens unit $G_3$ has the negative power, the position of the principal point of a combined optical system of the second and third lens units $G_2$ and $G_3$ projects into the object side (the side of the first lens unit $G_1$). Thus, a distance between the principal points of the first lens unit $G_1$ and the combined optical system of the second and third lens units $G_2$ and $G_3$ can be reduced. Whereby, the magnification of the second lens unit $G_2$ can be increased. As a result, the amount of movement of the second lens unit $G_2$ caused by the magnification change can be decreased. In addition, the focal length of the second and third lens units $G_2$ and $G_3$ can also be reduced. Thus, the reduction of the overall lens length (the reduction of the focal length of the second and third lens units $G_2$ and $G_3$) and the acquirement of spacing for the magnification change and of high magnification can be achieved at the same time.

In the path bending optical system, the ratio of the focal length at the telephoto position to the focal length at the wide-angle position is 1.8. However, negative image distortion is produced at the wide-angle position and the ratio of the angle of view at the wide-angle position to the angle of view at the telephoto position is set to 2.0 to increase the magnification so that the image distortion is electronically corrected through an electronic correcting means, not shown.

The path bending optical system of the thirteenth embodiment is provided with six aspherical surfaces: the entrance surface $P_1$ of the path bending prism P in the first lens unit $G_1$, both surfaces of the positive lens in the second lens unit $G_2$, the object-side surface and the image-side surface of the cemented doublet in the third lens unit $G_3$, and the image-side surface in the fourth lens unit $G_4$.

Subsequently, numerical data of optical members constituting the path-bending optical system of the thirteenth embodiment are shown below.

Numerical Data 13

| Face number | Radius of curvature | Face-to-face spacing | Decentration | Refractive index | Abbe's number |
|---|---|---|---|---|---|
| Object surface | ∞ | 793.00 | | | |
| 1 | Aspherical surface [1] | −3.50 | | 1.8061 | 40.9 |
| 2 | ∞ (reflecting surface) | 3.50 | Decentration (1) | 1.8061 | 40.9 |
| 3 | ∞ | D3 | | | |
| 4 | Aspherical surface [2] | 4.33 | | 1.7440 | 44.8 |
| 5 | Aspherical surface [3] | D5 | | | |
| 6 | Stop surface | 0.00 | | | |
| 7 | Aspherical surface [4] | 4.00 | | 1.6204 | 60.3 |
| 8 | −3.25 | 0.70 | | 1.7552 | 27.5 |
| 9 | Aspherical surface [5] | D9 | | | |
| 10 | 9.05 | 1.63 | | 1.6204 | 60.3 |
| 11 | Aspherical surface [6] | 0.85 | | | |
| 12 | ∞ | 1.44 | | 1.5477 | 62.8 |
| 13 | ∞ | 0.20 | | | |
| 14 | ∞ | 0.60 | | 1.5163 | 64.1 |
| 15 | ∞ | 0.50 | | | |
| Image plane | ∞ | 0.00 | | | |

-continued

| Aspherical surface [1] | | | | | |
|---|---|---|---|---|---|
| Radius of curvature 6.10 | | | | | |
| k = | 0 | | | | |
| A = | $-1.0205 \times 10^{-3}$ | B = | $-2.3832 \times 10^{-5}$ | C = | $1.1154 \times 10^{-6}$ |
| D = | $-3.7041 \times 10^{-8}$ | | | | |
| **Aspherical surface [2]** | | | | | |
| Radius of curvature 364.30 | | | | | |
| k = | 0 | | | | |
| A = | $-2.7833 \times 10^{-3}$ | B = | $-1.4240 \times 10^{-4}$ | C = | $-8.5589 \times 10^{-6}$ |
| **Aspherical surface [3]** | | | | | |
| Radius of curvature −5.64 | | | | | |
| k = | 0 | | | | |
| A = | $-1.8564 \times 10^{-4}$ | B = | $-8.7746 \times 10^{-5}$ | C = | $5.9383 \times 10^{-6}$ |
| **Aspherical surface [4]** | | | | | |
| Radius of curvature 7.09 | | | | | |
| k = | 0 | | | | |
| A = | $1.0193 \times 10^{-3}$ | B = | $-5.2543 \times 10^{-5}$ | C = | $6.9508 \times 10^{-6}$ |
| **Aspherical surface [5]** | | | | | |
| Radius of curvature 3.84 | | | | | |
| k = | 0 | | | | |
| A = | $1.7133 \times 10^{-3}$ | B = | $-9.2876 \times 10^{-5}$ | C = | $-3.4357 \times 10^{-5}$ |
| **Aspherical surface [6]** | | | | | |
| Radius of curvature −7.51 | | | | | |
| k = | 0 | | | | |
| A = | $-6.5926 \times 10^{-4}$ | B = | $5.2580 \times 10^{-6}$ | C = | $3.3478 \times 10^{-6}$ |

| Decentration [1] | | | | | |
|---|---|---|---|---|---|
| X = | 0.00 | Y = | 0.00 | Z = | 0.00 |
| α = | −45.00 | β = | 0.00 | γ = | 0.00 |

Zoom data (in focusing of infinite object point)

| | WE | ST | TE |
|---|---|---|---|
| f(mm) | 3.3823 | 4.6042 | 6.2138 |
| FNO | 2.7961 | 3.4423 | 3.8966 |
| 2ω (°) | 78.9 | 54.4 | 39.6 |
| D3 | 6.84942 | 4.63537 | 2.38995 |
| D5 | 0.88683 | 0.97827 | 1.87262 |
| D9 | 1.09699 | 3.24055 | 4.59993 |

Subsequently, values relating to Conditions (1)-(7) in individual embodiments are shown below.

| | Condition (1) | Condition (2) | Condition (3) | Condition (4) | Condition (5) | Condition (6) | Condition (7) |
|---|---|---|---|---|---|---|---|
| 1st embodiment | −2.15 | 1.00 | −6.07 | 0.35 | 0.96 | 1.30 | 1.30 |
| 2nd embodiment | −2.47 | 1.00 | −5.91 | 0.42 | 0.84 | 1.31 | 1.31 |
| 3rd embodiment | −112.41 | 1.00 | −3.13 | 35.90 | 0.33 | 1.46 | 1.46 |
| 4th embodiment | −2.56 | 1.00 | −2.30 | 1.11 | 4.46 | 1.34 | 1.34 |
| 5th embodiment | −2.25 | 1.00 | −2.72 | 0.83 | 4.77 | 1.55 | 1.55 |
| 6th embodiment | −2.30 | 1.00 | −3.78 | 0.61 | 1.82 | 1.39 | 1.39 |
| 7th embodiment | −2.21 | 1.00 | −2.60 | 0.85 | 11.95 | 1.62 | 3.17 |
| 8th embodiment | −2.62 | 1.00 | −2.99 | 0.87 | 3.64 | 1.94 | 2.20 |
| 9th embodiment | −2.54 | 1.00 | −3.84 | 0.66 | 4.82 | 1.95 | 3.72 |
| 10th embodiment | — | — | — | — | — | 1.69 | 0.00 |
| 11th embodiment | −4.70 | 0.30 | −3.58 | 1.31 | 3.25 | 4.49 | 1.23 |
| 12th embodiment | −5.18 | 1.00 | −1.39 | 3.72 | 0.00 | 0.95 | 1.23 |
| 13th embodiment | −1.65 | 1.00 | 1.64 | −1.01 | 0.79 | −2.301 | 1.50 |

Figure 16:
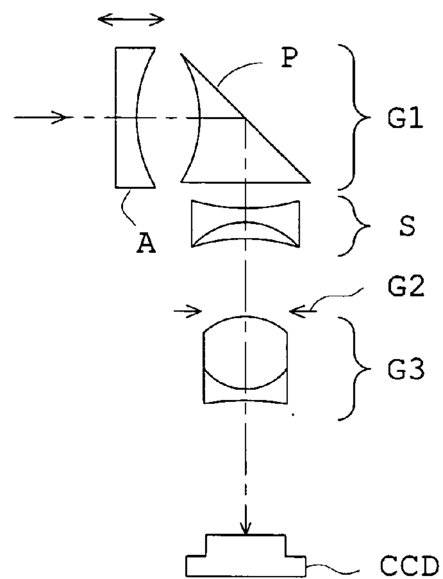
FIG. 16 is a schematic view showing a modified example of a primary element located at the most object-side position of the optical system in each of the embodiments of the present invention.

In most of the above embodiments, the path bending prism P is constructed so that only the entrance surface is aspherical, but the exit surface may be aspherical. In any of the above embodiments, the prism P is used as the primary element located at the most object-side position of the optical system. However, as shown schematically in FIG. 16, a lens unit A may be placed ahead of (on the object side of) the prism P. The lens unit A may be constructed with a single lens or a plurality of lenses. The lens unit A may also be moved along the optical axis to perform focusing or zooming.

Now, the path bending optical system of the present invention described above can be used in the imaging apparatus in which an object image is formed by an imaging optical system such as a zoom lens and this image is received by an imaging element, such as the CCD or a silver halide film, to photograph. The imaging apparatuses refer to digital cameras and video cameras in particular; personal computers, telephones, and personal digital assistants which are examples of information processing apparatuses; and mobile phones which are handy to carry. Their embodiments are shown below.

Figure 17:
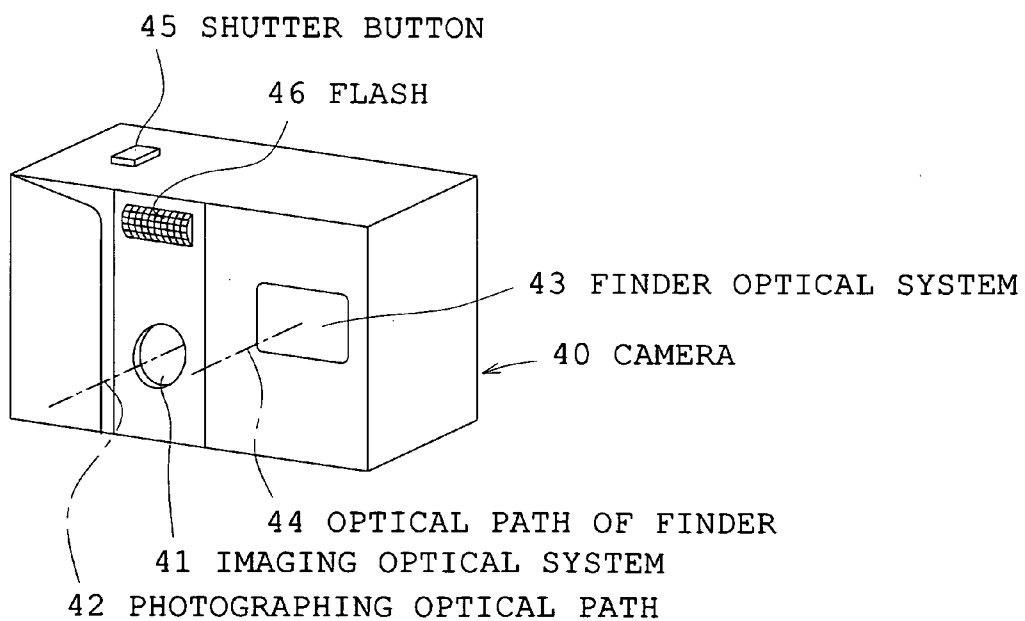
FIG. 17 is a perspective front view showing the appearance of a digital camera incorporating the zoom optical system of the present invention in the photographing optical system of the digital camera.
Figure 18:
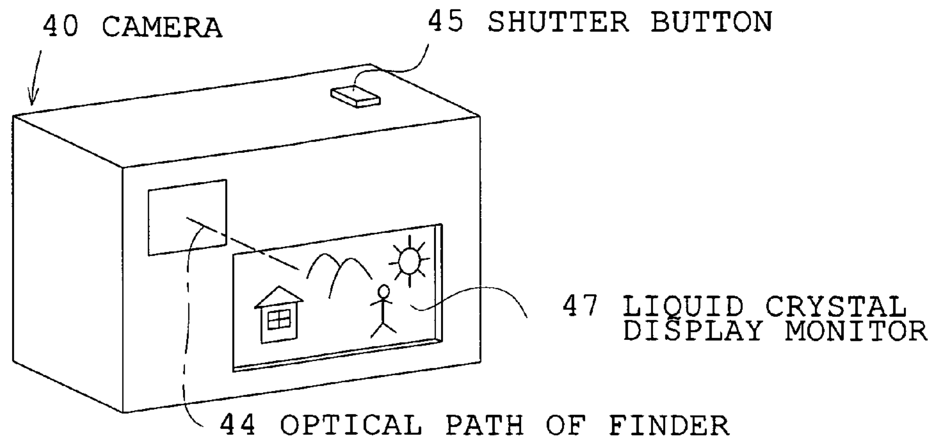
FIG. 18 is a perspective rear view showing the digital camera of FIG. 17.
Figure 19:
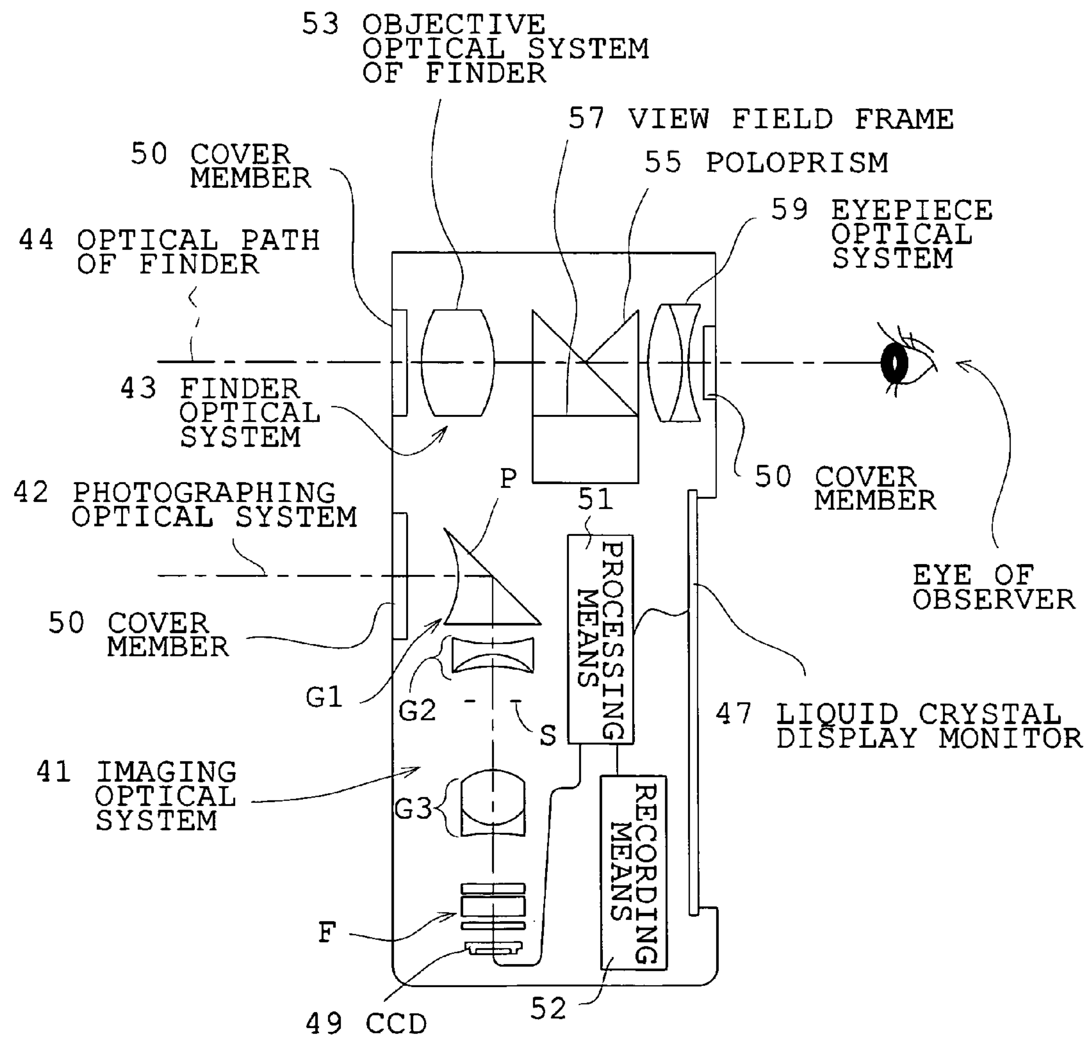
FIG. 19 is a sectional view showing the optical arrangement of the digital camera of FIG. 17.

FIGS. 17–19 show a digital camera in which the zoom optical system of the present invention is incorporated in a photographing optical system 41.

A digital camera 40, in this example, includes the photographing optical system 41 having a photographing optical path 42, a finder optical system 43 having a finder optical path 44, a shutter button 45, a flash lamp 46, and a liquid crystal display monitor 47.

When the shutter button 45 is pushed by a photographer, photographing is performed through the photographing optical system 41, for example, the path-bending zoom optical system of the first embodiment.

An object image formed by the photographing optical system 41 is placed on the imaging surface of a CCD 49. At this time, image formation is achieved through the near-infrared cutoff filter and the optical low-pass filter in the plane-parallel plate unit F. The object image received by the CCD 49 is displayed as an electronic image on the liquid crystal display monitor 47 through a processing means 51. The liquid crystal display monitor 47 is provided on the back face of the camera. A recording means 52 is connected to the processing means 51 and a photographed electronic image can be recorded. Also, the recording means 52 may be provided to be independent of the processing means 51. Alternatively, it may be constructed so that the image is electronically recorded and written by a floppy disk, memory card, or MO. A silver halide film camera using a silver halide film instead of the CCD 49 may be employed.

A finder objective optical system 53 is located on the finder optical path 44. An object image is formed by the finder objective optical system 53. The object image is provided on a field frame 57 of a Porro prism 55. Here, the Porro prism 55 functions as an image erecting member.

Behind the Porro prism 55, an eyepiece optical system 59 introducing an erect image into an observer's eye E is located. Also, cover members 50 are placed on the entrance sides of the photographing optical system 41 and the finder objective optical system 53. Similarly, the cover member 50 is located on the exit side of the eyepiece optical system 59.

In this example, the photographing optical system 41 is a zoom lens which has a wide angle of view and a high variable magnification ratio, is favorable for correction for aberration and bright, and is provided with a long back focal distance that the filters can be placed. Thus, in the digital camera 40 constructed as mentioned above, high performance and a cost reduction can be achieved.

In FIG. 19, plane-parallel plates are used as the cover members 50, but lenses with powers may be used.

Figure 20:
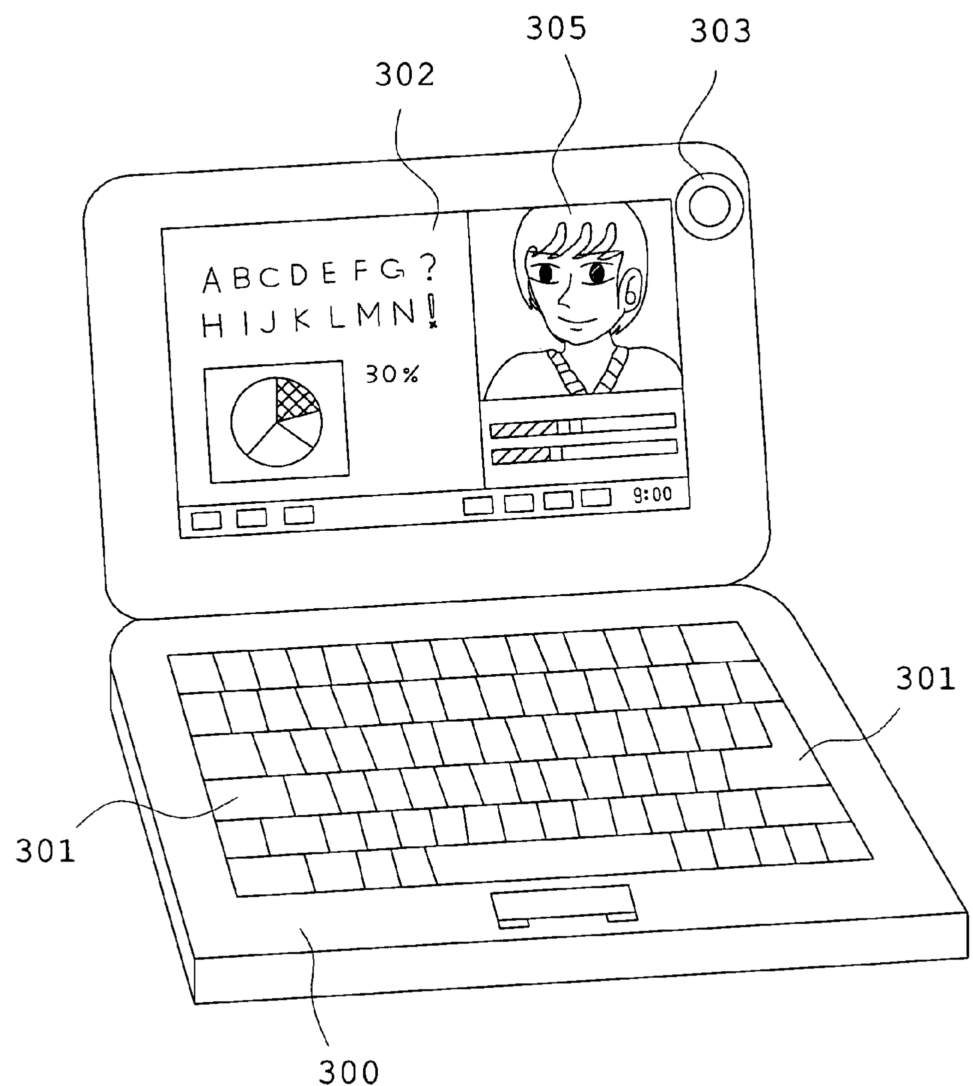
FIG. 20 is a perspective front view showing a personal computer as an example of an information processing apparatus in which the zoom optical system of the present invention is incorporated as an objective optical system.
Figure 21:
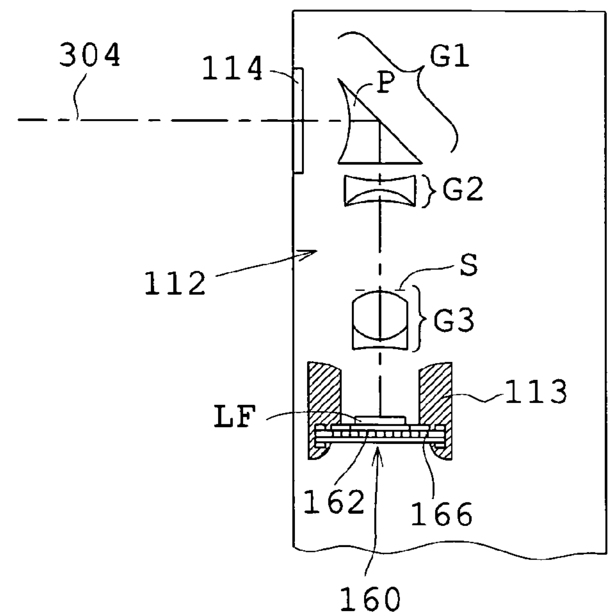
FIG. 21 is a sectional view showing the photographing optical system incorporated in the personal computer of FIG. 20.
Figure 22:
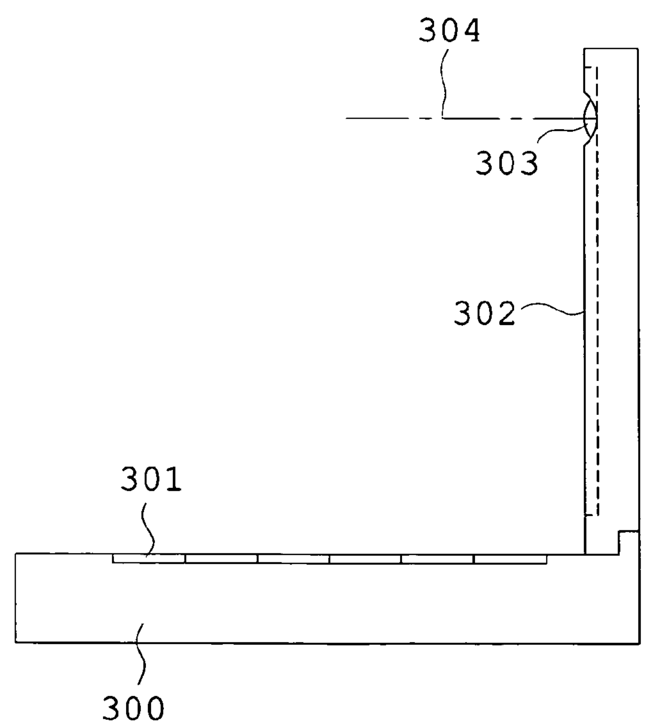
FIG. 22 is a side view showing the personal computer of FIG. 20.

Subsequently, FIGS. 20–22 show an example of an information processing apparatus in which the zoom optical system of the present invention is used. Here, the information processing apparatus refers to a personal computer. The personal computer incorporates the zoom optical system of the present invention as the objective optical system.

As shown in FIGS. 20–22, a personal computer 300 has a keyboard 301; an information processing means or recording means, not shown; a monitor 302; and an photographing optical system 303. The keyboard 301 is provided to input information from the exterior by an operator. The monitor 302 is to display information for the operator. The photographing optical system 303 is to photograph the operator himself or surrounding images.

Here, the monitor 302 may be a liquid crystal display element or a CRT display. The liquid crystal display element refers to a transmission-type liquid crystal display element illuminated with backlight, not shown, from the back face, or a reflection-type liquid crystal display element reflecting light from the front for display. In these figures, the photographing optical system 303 is housed in the monitor 302 upper-right, but it may be located at any place, such as the periphery of the monitor 302 or of the keyboard 301.

The photographing optical system 303 has an objective lens 112 including the path-bending zoom optical system of the present invention and an imaging element chip 162 receiving an image. These are housed in the personal computer 300.

Here, an optical low-pass filter LF is additionally cemented to the chip 162. These are integrally constructed as an imaging unit 160, which is fitted into the rear end of a lens frame 113 of the objective lens 112 and can be mounted in a single operation. Therefore, the alignment of the objective lens 112 and the chip 162 and the adjustment of face-to-face spacing are not required. That is, assembly is simplified.

At the top (not shown) of the lens frame 113, a cover glass 114 for protecting the objective lens 112 is placed. Also, the driving mechanism of the zoom lens in the lens frame 113 is not shown in the figure.

An object image received by the chip 162 is input into the processing means of the personal computer 300 through a terminal 166 and is displayed as an electronic image on the monitor 302. In FIG. 20, a photographed image 305 of the operator is shown as an example. The image 305 can also be displayed on the personal computer of his communication mate from a remote place, by the processing means, through the internet or the telephone.

Figure 23A:
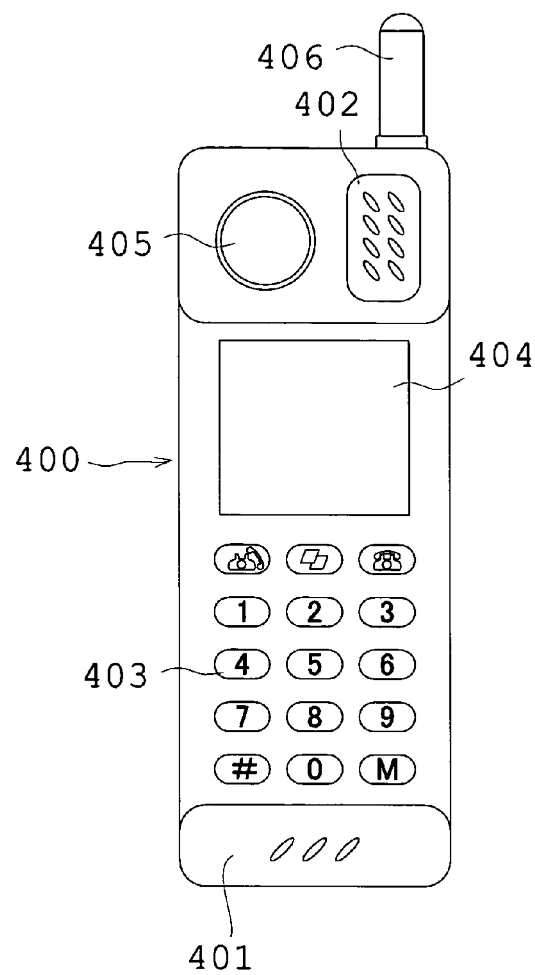
FIG. 23A is a front view showing a telephone, notably a mobile phone which is handy to carry, of an example of the information processing apparatus in which the zoom optical system of the present invention is incorporated as the photographing optical system.
Figure 23B:
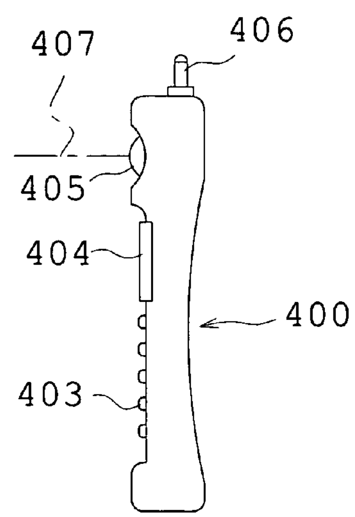
FIG. 23B is a side view showing the mobile phone of FIG. 23A.
Figure 23C:
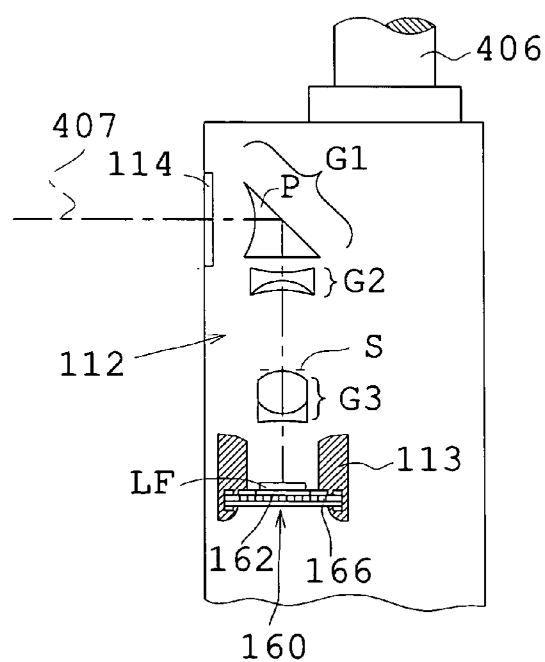
FIG. 23C is a sectional view showing the photographing optical system of the mobile phone of FIG. 23A.

FIGS. 23A–23C show another example of the information processing apparatus in which the zoom optical system of the present invention is housed. Here, the information processing apparatus refers to a telephone, notably a mobile phone which is handy to carry. The mobile phone uses the zoom optical system as the photographing optical system.

A mobile phone 400, as shown in FIGS. 23A–23C, includes a microphone section 401, a speaker section 402, input dials 403, a monitor 404, a photographing optical system 405, an antenna 406, and a processing means (not shown). The microphone section 401 is used to input an operator's voice as information. The speaker section 402 transmits the voice of a communication mate. The input dials 403 are used for the purpose that an operator inputs information. The monitor 404 displays information, such as photographing images of the operator himself and the communication mate, and telephone numbers. The antenna 406 is used to transmit and receive electric waves for communication with the photographing optical system 405. The processing means processes image information, communication information, and an input signal.

Here, the monitor 404 is a liquid crystal display element. In these figures, the arrangement of individual parts is not limited to the above description. The photographing optical system 405 has the objective lens 112 and the imaging element chip 162 on a photographing optical path 407. The objective lens 112 is the path bending zoom optical system (not shown) of the present invention. The chip 162 receives the object image. These are incorporated in the mobile phone 400.

Here, the optical low-pass filter LF is additionally cemented to the chip 162, and these are integrally constructed as the imaging unit 160, which is fitted into the rear end of the lens frame 113 of the objective lens 112 and can be mounted in a single operation.

Therefore, the alignment of the objective lens 112 and the chip 162 and the adjustment of face-to-face spacing are not required. Consequently, assembly is simplified. At the top (not shown) of the lens frame 113, the cover glass 114 for protecting the objective lens 112 is placed. Also, the driving mechanism of the zoom lens in the lens frame 113 is not shown in the figure.

An object image received by the chip 162 is input into the processing means, not shown, through the terminal 166 and is displayed as the electronic image on either the monitor 404 or the monitor of the communication mate, or both. Also, the processing means includes a signal processing function that when the image is transmitted to the communication mate, the information of the object image is converted into a transmittable signal.

What is claimed is:

1. An optical path bending optical system comprising, in order from an object side:

a first lens unit with negative power;

a second lens unit with negative power;

and at least one lens unit with positive power, the lens unit with positive power being moved along an optical axis when a magnification of the optical system is changed in a range from a wide-angle position to a telephoto position, and the first lens unit including an optical path bending element for bending an optical path.

2. An optical path bending optical system according to claim 1, wherein the optical path bending element is constructed as a prism including at least one reflecting surface, an entrance surface, and an exit surface, and at least one of the entrance surface and the exit surface of the prism is configured as a curved surface which is rotationally symmetrical with respect to the optical axis.

3. An optical path bending optical system according to claim 2, wherein the curved surface which is rotationally symmetrical has negative power.

4. An optical path bending optical system according to claim 1, wherein at least two lens units, each with positive power, are located on an image side of the second lens unit.

5. An optical path bending optical system according to claim 1, wherein lens units located on an image side of the optical path bending element or a part of lenses of the lens units located on the image side of the optical path bending element is movable along the optical axis.

6. An optical path bending optical system according to claim 1, wherein when the magnification is changed in the range from the wide-angle position to the telephoto position, the first lens unit remains fixed.

7. An optical path bending optical system according to claim 2, wherein the first lens unit includes only the optical path bending element.

8. An optical path bending optical system according to claim 2, wherein the entrance surface of the prism is configured as a concave surface facing the object side.

9. An optical path bending optical system according to claim 1, wherein the first lens unit has at least one aspherical surface.

10. An optical path bending optical system according to claim 2, wherein the at least one of the entrance surface and the exit surface of the prism is configured as an aspherical surface.

11. An optical path bending optical system according to claim 1, satisfying the following condition:

$$[[-1000<f1/\sqrt{(fW\times fT)}<-0.2]]-1000<f_1/\sqrt{(f_W\times f_T)}<-0.2$$

where $f_1$ is a focal length of the first lens unit, $f_W$ is a focal length of an entire system under a condition where an infinite object point is in focus at the wide-angle position, and $f_T$ is a focal length of the entire system under a condition where the infinite object point is in focus at the telephoto position.

12. An optical path bending optical system according to claim 1, satisfying the following condition:

$$0.2<f_p/f_1<7$$

where $f_p$, is a focal length of the optical path bending element and $f_1$ is a focal length of the first lens unit.

13. An optical path bending optical system according to claim 1, wherein the second lens unit includes a lens with positive power and a lens with negative power.

14. An optical path bending optical system according to claim 1, satisfying the following condition:

$$[[-20<f\mathbf{2}/\sqrt{(fW\times fT)}<-0.2]]-20<f_2/\sqrt{(f_W\times f_T)}<-0.2$$

where $f_2$ is a focal length of the second lens unit, $f_w$ is a focal length of an entire system under a condition where an infinite object point is in focus at the wide-angle position, and $f_T$ is a focal length of the entire system under a condition where the infinite object point is in focus at the telephoto position.

15. An optical path bending optical system according to claim 1, satisfying the following condition:

$$0.1<f_1/f_2<50$$

where $f_1$ is a focal length of the first lens unit and $f_2$ is a focal length of the second lens unit.

16. An optical path bending optical system according to claim 1, wherein the lens unit with positive power includes a lens with positive power and a lens with negative power.

17. An optical path bending optical system according to claim 1, wherein the lens unit with positive power includes at least two positive lenses and a single negative lens.

18. An optical path bending optical system according to claim 1, wherein the lens unit with positive power has at least one aspherical surface.

19. An optical path bending optical system according to claim 1, wherein a most image-side lens unit has at least one aspherical surface.

20. An optical path bending optical system according to claim 1, satisfying the following condition:

$$0.2<M3/M2<15$$

where M2 is a range of movement of the second lens unit with negative power and M3 is a range of movement of the lens unit with positive power.

21. An optical path bending optical system according to claim 1, satisfying the following condition:

$$[[1.1<f3/\sqrt{(fW\times fT)}<10\ ]]1.1<f_3/\sqrt{(f_W\times f_T)}<10$$

where $f_3$ is a focal length of the lens unit with positive power, $f_w$ is a focal length of an entire system under a condition where an infinite object point is in focus at the wide-angle position, and $f_T$ is a focal length of the entire system under a condition where the infinite object point is in focus at the telephoto position.

22. An optical path bending optical system according to claim 4, satisfying the following condition:

$$[[0.5<f4/\sqrt{(fW\times fT)}<7]]0.5<f_4/\sqrt{(f_W\times f_T)}<7$$

where f4 is a focal length of a most image-side lens unit, $f_w$ is a focal length of an entire system under a condition where an infinite object point is in focus at the wide-angle position, and $f_T$ is a focal length of the entire system of under a condition where the infinite object point is in focus at the telephoto position.

23. An optical path bending optical system according to claim 4, wherein the two lens units, each with positive power, are a third lens unit with positive power and a fourth lens unit with positive power, and a stop is interposed between the third lens unit and the fourth lens unit.

24. An optical path bending optical system according to claim 1, further comprising an image sensor, wherein the optical axis is bent parallel to a short side of an imaging surface of the image sensor.

25. An optical path bending optical system according to claim 1, comprising a U-turn lens unit, which is returned to the object side after being moved toward an image side while the magnification is changed from the wide-angle position through the telephoto position, and a simple moving lens unit, which moves toward the object side while the magnification is changed from the wide-angle position through the telephoto position, and a magnification change between the wide-angle position and the telephoto position is performed by moving only the simple moving lens unit while keeping the U-turn lens unit fixed at a position for the wide-angle position or for the telephoto position.

26. An electronic imaging apparatus comprising:

an optical path bending optical system according to claim 1; and a correcting circuit electronically correcting image distortion.

27. An information processing apparatus comprising:

an optical path bending optical system according to claim 1;

an electronic image sensor located at an image plane of the optical path bending optical system;

processing means processing an electronic signal that is photoelectrically converted by the electronic image sensor;

an input section for inputting an information signal into the processing means;

a display element displaying an output from the processing means; and a recording medium recording the output from the processing means.

28. An information processing apparatus according to claim 27, wherein the input section is constructed with a keyboard, and the optical path bending optical system and the electronic image sensor are incorporated in a periphery of the display element or of the keyboard.

29. A telephone apparatus comprising:

an optical path bending zoom optical system according to claim 1;

an electronic image sensor located at an image plane of the optical path bending optical system;

an antenna for transmitting and receiving a telephone signal;

an input section for inputting information; and processing means processing an object image received by the electronic image sensor.

30. An electronic camera comprising:

an optical path bending optical system according to claim 1;

an electronic image sensor located at an image plane of the optical path bending optical system;

processing means processing an electronic signal that is photoelectrically converted by the electronic image sensor; and a display element displaying an object image in accordance with the electronic signal from the processing means.

* * * * *

UNITED STATES PATENT AND TRADEMARK OFFICE
CERTIFICATE OF CORRECTION

PATENT NO. : 7,085,072 B2
APPLICATION NO. : 10/852607
DATED : August 1, 2006
INVENTOR(S) : Kuba It is certified that error appears in the above-identified patent and that said Letters Patent is hereby corrected as shown below:

Column 53, line 32, change
"[[$-1000<f1\sqrt{\ }\ (fW \times fT) < -0.2$]] $-1000<f_1\sqrt{\ }\ (f_w \times f_T) < -0.2$" to -- $-1000<f_1/\sqrt{(f_w \times f_T)} < -0.2$ --;

Column 53, line 51, change
"[[$-20<f2/\sqrt{(fW \times fT)} < -0.2$]] $-20<f_2/\sqrt{(f_w \times f_T)} < -0.2$" to -- $-20<f_2/\sqrt{(f_w \times f_T)} < -0.2$ --;

Column 54, line 19, change
"[[$1.1<f3/\sqrt{(fW \times fT)} < 10$]] $1.1<f_3/\ \sqrt{(f_w \times f_T)} < -10$" to -- $1.1<f_3/\sqrt{(f_w \times f_T)} < 10$ --; and Column 54, line 29, change
"[[$0.5<f4/\sqrt{(fW \times fT)} < 7$]] $0.5<f_4/\sqrt{(f_w \times f_T)} < 7$" to -- $0.5<f_4/\sqrt{(f_w \times f_T)} < 7$ --.

Signed and Sealed this

Fourth Day of December, 2007

JON W. DUDAS
*Director of the United States Patent and Trademark Office*